(12) United States Patent
Nakagawa et al.

(10) Patent No.: US 8,934,782 B2
(45) Date of Patent: Jan. 13, 2015

(54) TRANSMISSION METHOD, RECEPTION METHOD, TRANSMITTER APPARATUS, AND RECEIVER DEVICE

(75) Inventors: Tadao Nakagawa, Yokosuka (JP); Etsushi Yamazaki, Yokosuka (JP); Koichi Ishihara, Yokosuka (JP); Takayuki Kobayashi, Yokosuka (JP); Riichi Kudo, Yokosuka (JP); Yasushi Takatori, Yokosuka (JP); Munehiro Matsui, Yokosuka (JP); Yutaka Miyamoto, Yokosuka (JP); Akihide Sano, Yokosuka (JP); Eiji Yoshida, Yokosuka (JP); Masato Mizoguchi, Yokosuka (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 127 days.

(21) Appl. No.: 13/576,902
(22) PCT Filed: Feb. 3, 2011
(86) PCT No.: PCT/JP2011/052271
§ 371 (c)(1),
(2), (4) Date: Aug. 2, 2012
(87) PCT Pub. No.: WO2011/096488
PCT Pub. Date: Aug. 11, 2011

(65) Prior Publication Data
US 2012/0315043 A1    Dec. 13, 2012

(30) Foreign Application Priority Data

Feb. 4, 2010    (JP) .................................. 2010-023498
Dec. 9, 2010    (JP) .................................. 2010-274920

(51) Int. Cl.
*H04B 10/00*    (2013.01)
*H04J 14/06*    (2006.01)
(Continued)

(52) U.S. Cl.
CPC .......... *H04B 10/5053* (2013.01); *H04B 10/532* (2013.01); *H04B 10/60* (2013.01);
(Continued)

(58) Field of Classification Search
CPC .................................................... H04B 10/2572
See application file for complete search history.

(56) References Cited

U.S. PATENT DOCUMENTS 5,327,511 A * 7/1994 Heismann et al. ................. 385/1
6,650,846 B1 * 11/2003 Ito ................................. 398/184
(Continued)

FOREIGN PATENT DOCUMENTS

CN    1815930 A    8/2006
CN    101479967 A    7/2009
(Continued)

OTHER PUBLICATIONS

Mehmood et al., Communications Infrastructure:Systems and Applications in Europe, 2009, Springer, p. 93.*
(Continued)

*Primary Examiner* — Ken Vanderpuye
*Assistant Examiner* — Jai Lee
(74) *Attorney, Agent, or Firm* — Harness, Dickey & Pierce, P.L.C.

(57) ABSTRACT

A polarization state of a transmission signal can be changed at a high speed based on a symbol-rate By switching a first switch, a second switch, and a third switch with time, one of an X-polarized wave_I-signal as a Y-polarized wave_I-signal, a signal caused by performing logical inversion for an X-polarized wave_I-signal, an X-polarized wave_Q-signal and a signal caused by logical inversion for an X-polarized wave_Q-signal is input to a second modulator. Further, by switching the first switch, the second switch and the third switch with time, the second modulator is input one of the X-polarized wave_I-signal as the Y-polarized wave_Q-signal, the X-polarized wave_I-signal, the signal caused by performing logical inversion for the X-polarized wave_I-signal, the X-polarized wave_Q-signal and the signal caused by performing logical inversion for the X-polarized wave_Q-signal. Thereby, a polarization state of a transmission signal can be changed at high speed based on a symbol-rate speed.

22 Claims, 36 Drawing Sheets

(51) Int. Cl.
*H04B 10/532* (2013.01)
*H04B 10/50* (2013.01)
*H04B 10/60* (2013.01)
*G02F 1/01* (2006.01)

(52) U.S. Cl.
CPC ............. G02F 1/0136 (2013.01); H04J 14/06 (2013.01)
USPC ............. 398/158; 398/159; 398/152; 398/65

(56) References Cited

U.S. PATENT DOCUMENTS

| | | | |
|---|---|---|---|
| 2006/0013590 | A1* | 1/2006 | Hueda et al. ................ 398/149 |
| 2009/0245816 | A1* | 10/2009 | Liu et al. ...................... 398/208 |
| 2009/0317075 | A1* | 12/2009 | Mandai et al. ................ 398/25 |
| 2010/0111531 | A1* | 5/2010 | Tanimura et al. ............. 398/65 |
| 2010/0178065 | A1 | 7/2010 | Nishihara et al. |
| 2010/0260504 | A1 | 10/2010 | Takahara |
| 2011/0002689 | A1 | 1/2011 | Sano et al. |

FOREIGN PATENT DOCUMENTS

| | | |
|---|---|---|
| EP | 2 109 233 A1 | 10/2009 |
| JP | 07-013112 A | 1/1995 |
| JP | 2005-123934 A | 5/2005 |
| JP | 2008-35319 A | 2/2008 |
| JP | 2009-253972 A | 10/2009 |
| WO | 2004/054138 A2 | 6/2004 |
| WO | WO-2009/104758 A1 | 8/2009 |

OTHER PUBLICATIONS

Search Report, European Patent Application No. 11739836.2, Oct. 11, 2013.

Sano, A., et al., "13.4-Tb/s (134×111-Gb/s/ch) No-Guard-Interval Coherent OFDM Transmission over 3,600 km of SMF with 19-ps average PMD," 34th European Conference on Optical Communication, Brussels, Belgium, Sep. 21-25, 2008, Th.3.E.1, vol. 7, pp. 25-26.

Notice of Reasons for Rejection, Japanese Patent Application No. 2011-552824, May 7, 2013.

Akihide Sano et al., "13.4 Tb/s (134×111 Gb/s/ch) no-guard-interval PDM CO-OFDM transmission over 3,600 km of SMF", Proceedings of the 2009 IEICE General Conference 2, Mar. 4, 2009, p. 365, B-10-46 (with partial English translation).

Eiichi Yamada et al., "No-guard-interval PDM CO-OFDM transmission in 4.1 Tb/s (50×88.8-Gb/s) DWDM link over 800km SMF including 50-GHz spaced ROADM nodes", 2008 Nen IEICE Communications Society Conference Koen Ronbunshu 2, Sep. 2, 2008, p. 216, B-10-73 (with partial English translation).

H. Masuda, et al., "13.5-Tb/s (135×111-Gb/s/ch) No-Guard-Interval Coherent OFDM Transmission over 6,248 km using SNR Maximized Second-order DRA in the Extended L-band," OSA/OFC/NFOEC 2009, PDPB5 (in English).

Jianjun Yu et al., "17 Tb/s (161×114 Gb/s) PolMux-RZ-8PSK transmission over 662 km of ultra-low loss fiber using C-band EDFA amplification and digital coherent detection," ECOC 2008, Th.3.E.2, Brussels, Belgium, Sep. 21-25, 2008 (in English).

L. Liu et al., "Initial Tap Setup of Constant Modulus Algorithm for Polarization De-mulitplexing in Optical Coherent Receivers," OSA/OFC/NFOEC 2009, OMT2 (in English).

First Office Action, Chinese Patent Application No. 201180007987.4, Oct. 29, 2014.

* cited by examiner

FIG. 2

| | 101 | 102 | 103 | 104 |
|---|---|---|---|---|
| X-POLARIZED WAVE_I-SIGNAL (X_I) | FIRST INFORMATION SYMBOL | SECOND INFORMATION SYMBOL | THIRD INFORMATION SYMBOL | FOURTH INFORMATION SYMBOL |
| | 105 | 106 | 107 | 108 |
| X-POLARIZED WAVE_Q-SIGNAL (X_Q) | FIFTH INFORMATION SYMBOL | SIXTH INFORMATION SYMBOL | SEVENTH INFORMATION SYMBOL | EIGHTH INFORMATION SYMBOL |
| | 101 | 106 | 109 | 110 |
| Y-POLARIZED WAVE_I-SIGNAL | FIRST INFORMATION SYMBOL (X_I) | SIXTH INFORMATION SYMBOL (X_Q) | NINTH INFORMATION SYMBOL (X_I) | TENTH INFORMATION SYMBOL ($\overline{X\_Q}$) |
| | 105 | 111 | 112 | 104 |
| Y-POLARIZED WAVE_Q-SIGNAL | FIFTH INFORMATION SYMBOL (X_Q) | ELEVENTH INFORMATION SYMBOL ($\overline{X\_I}$) | TWELFTH INFORMATION SYMBOL ($\overline{X\_Q}$) | FOURTH INFORMATION SYMBOL (X_I) |
| | (1) | (2) | (3) | (4) |
| POLARIZATION STATE | ↗↙ | ↻ | ↖↘ | ↺ |

FIG. 28 (PRIOR ART)
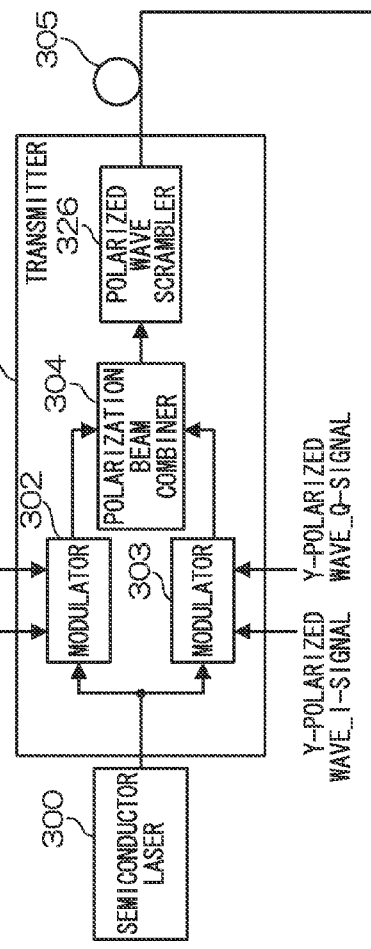
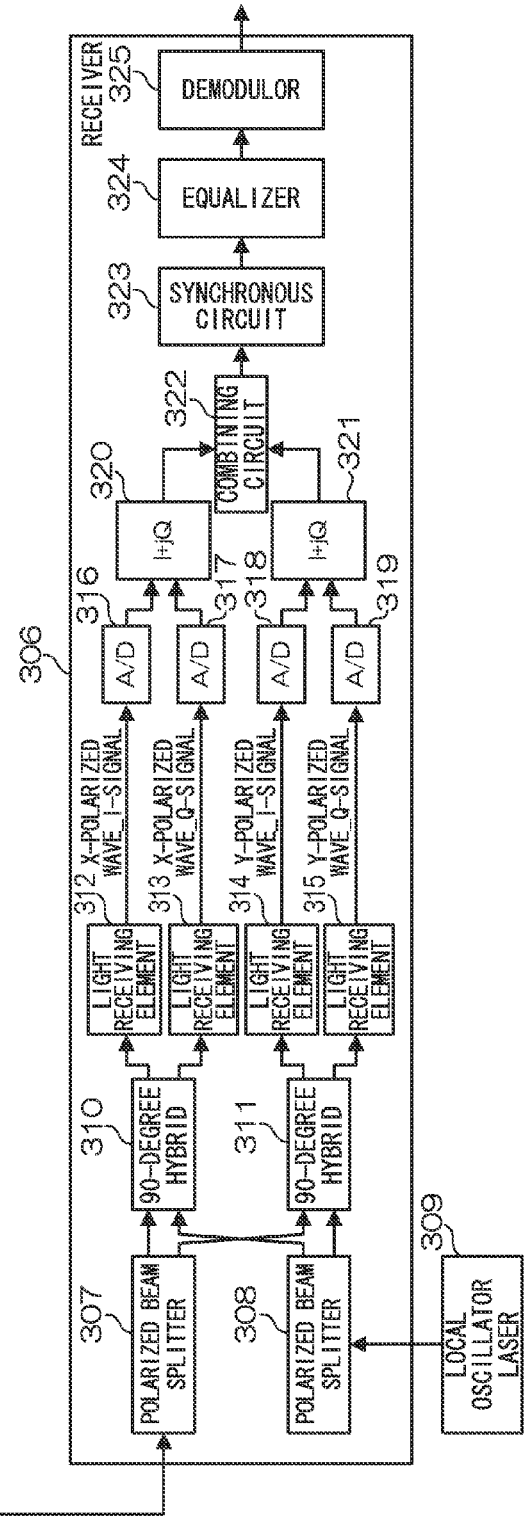

TRANSMISSION METHOD, RECEPTION METHOD, TRANSMITTER APPARATUS, AND RECEIVER DEVICE

CROSS-REFERENCE TO RELATED APPLICATIONS

This application is a U.S. National Stage of International Application No. PCT/JP2011/052271, filed on Feb. 3, 2011 and published in Japanese as WO/2011/096488 A1 on Aug. 11, 2011. This application claims the benefit of Japanese Application No. 2010-023498, filed on Feb. 4, 2010 and Japanese Application No. 2010-274920, filed on Dec. 9, 2010. The disclosures of the above applications are incorporated herein by reference.

TECHNICAL FIELD

The present invention relates to a transmission method, a reception method, a transmission apparatus, and a receiver apparatus.

Priority is claimed on Japanese Patent Applications No. 2010-023498 filed Feb. 4, 2010, and No. 2010-274920 filed Dec. 9, 2010, the contents of which are incorporated herein by reference.

BACKGROUND ART

In the field of optical communications, digital coherent communication systems, which are based on a combination of a synchronous detection method and digital signal processing, are attractive for rapidly improving the frequency usage efficiency. It is known that, when compared with the system constructed with direct signal detections, the digital coherent communication systems can better improve the receiver sensitivity, by receiving signals as digital signals, and compensate the distortion of transmission signals owing to chromatic dispersion caused by optical fiber transmission and polarization mode dispersion (PMD). Thus, the digital coherent communication systems are considered as the next generation optical communication technology and being developed for introduction.

Today, the long-distance transmission of optical communications is performed by multiple connections of optical fiber amplifiers. It is known, in such communication systems, that the data transmission characteristics degrade with the polarization dependence caused by the polarization hole burning (PHB) effect of optical fiber amplifiers. The polarization hole burning is a phenomenon that amplification factors in the direction of signal light propagation and the orthogonal direction to the signal light propagation become different from each other when signal light is incident to an optical fiber amplifier. This degrades the signal-to-noise ratio (S/N ratio) because spontaneous light (amplified spontaneous emission: ASE) in the orthogonal direction is amplified to a higher power level than the other directions for natural light.

A polarization wave scrambler that actively changes the polarization of signal light on the transmission side is proposed as a technique that reduces the polarization hole burning effect, which is, for example, described in patent document 1.

FIG. 27 is a perspective diagram that illustrates an example of the construction of a conventional polarization scrambler. In FIG. 27, a crystal substrate 1 is made from lithium niobate providing an electric-optical effect that changes its refractive index according to the applied voltage. An optical waveguide 2 and electrodes 3 and 4 are formed on the crystal substrate 1. The state of polarization of incident light is changed into linear polarization by use of a polarizer 4, and introduced to the optical waveguide 2 at a 45-degree inclined angle to the cross-section axis of the optical wave guide 2. S1 indicates the state of polarization of the incident light.

As refractive indexes of the horizontal and vertical components of the optical waveguide 2 change according to the applied voltage to the electrodes 3, the propagation speed of the horizontal and vertical components of the linear polarization light in the optical waveguide 2 change according to the applied voltage to the electrodes 3, so that a phase difference between the horizontal and vertical components of signal light changes according to the applied voltage. Thereby, when the applied voltage is varied with time, the state of polarization of the signal light can be randomized. Further, the signal light is transmitted through a polarizer 5. In the figure, S2 indicates the state of polarization of the output light.

FIG. 28 is a block diagram that illustrates an example of the construction of a conventional transmitter/receiver apparatus for conventional optical communications. FIG. 28 shows a semiconductor laser 300, a transmitter 301, an optical fiber 305, a receiver 306, and a local oscillation laser 309. The transmitter 301 includes a first modulator 302, a second modulator 303, a polarization beam combiner 304, and a polarization scrambler 326. Accordingly, the transmitter 301 includes the polarization scrambler 326.

The receiver 306 includes a first polarization beam splitter 307, a second polarization beam splitter 308, a first 90 degree hybrid 310, a second 90 degree hybrid 311, a first light receiving element 312, a second light receiving element 313, a third light receiving element 314, a fourth light receiving element 315, a first AD converter 316, a second AD converter 317, a third AD converter 318, a fourth AD converter 319, a first complex adding circuit 320, a second complex adding circuit 321, a combining circuit 322, a synchronous circuit 323, an equalizer 324, and a demodulor 325.

In the transmitter 301, a signal is modulated through the first modulator 302 and second modulator 303, polarization multiplexing is performed for the signal with the polarization beam combiner 304, and the signal is input to the polarization scrambler 326. After the state of polarization of signal light is randomized by the polarization scrambler 326, the signal light is input to the optical fiber 305 for transmission. In the receiver 306, the signal light is split into I-signal and Q-signal that are two orthogonal polarized waves through the first and second polarization beam splitters 307 and 308 and the first and second 90 degree hybrids 310 and 311, and then after the I-signal and Q-signal are converted to digital signals through the first, second, third and fourth AD converters 316, 317, 318 and 319, the digital signals are converted into complex signals, I+jQ, by use of the complex adding circuits 320 and 321 for each of polarized waves. The obtained complex signals are combined for each of polarized waves with the combining circuit 322 as polarization diversity. Further, the mixed signal is demodulated through the synchronous circuit 323, the equalizer 324, and the demodulator 325, and then the demodulated signals are output.

Next, another example of the construction of a conventional transmitter/receiver apparatus for optical communications will be described below.

The digital coherent method described in non-patent documents 1, 2 and 3 compensates a quasi-static wave dispersion with a fixed digital filter (e.g. for 28 Gbaud signals, the dispersion is 2000 ps/nm with 2048 taps), and the digital coherent method compensates polarization mode dispersion with fluctuations by an adaptive filter with a small number of taps (e.g. 10-12 taps for polarization mode dispersion of 50 ps) based on a blind algorithm.

In a coherent receiver/transmitter system using digital signal processing, wave distortions added in the transmission line are compensated by the digital signal processing of the receiving end. The amount of wave dispersion added through a transmission line greatly varies depending on the conditions of the transmission line. For example, the cumulative amount of wave dispersion increases in proportion to the length of a transmission line fiber in which the signal light has propagated, such that the amount of dispersion varies with the transmission distance. Further, even if the length of the transmission line fiber is known, since there are different types of transmission line fibers that include a single mode fiber, a dispersion shift fiber, a non-zero dispersion shift fiber or the like, dispersion per a unit length is different.

In some cases, optical dispersion compensators are used in the repeaters in the transmission systems, and the amount of residual dispersion is varied by the amount of compensation of the dispersion. In submarine system, dispersion compensation fibers can be used as transmission lines. In addition, since chromatic dispersion coefficients are varied with the carrier wavelength of signal light, the amount of cumulative dispersion depends on the wavelength of signal light.

According to the reasons above, with respect to the amount of dispersion compensation in the chromatic dispersion compensation circuit at a receiving end, the coefficient of dispersion compensation filters should be adjusted in response to the cumulative amount of chromatic dispersion which the signals have received. For this, a mechanism is required to estimate the cumulative amount of chromatic dispersion which the signals have received. For example, there is a method that estimates the amount of chromatic dispersion by use of a known signal at the receiving end in which the known signal is incorporated in the transmission signal light.

Further, the state of dispersion of the transmission line is random, and since the state varies with time, it is required to use an adaptive equalizer filter for separating polarized multiple signals, in which the coefficient of the filter needs to be properly adjusted. In addition, the coefficient of the adaptive equalizer filter needs adaptive control because the wave distortion due to the polarization mode dispersion varies with time. There is a method to control the coefficient of the adaptive equalizer filter, in which the pattern of the known signal is periodically inserted in the transmission data.

In general, the degradation of wave forms caused by an optical device impairment in a transmission line depends on the polarization of waves. For example, when there are polarization dependent loss, polarization mode dispersion, and polarization dependent gain, the degree of wave form degradation is changed. In some cases, there is a phenomenon that the amount of wave degradation due to non-linear distortion of an optical fiber waveguide changes depending upon the state of polarization of a neighboring channel. In other words, the wave form degradation depends on the relation between the polarization state of signal light and the principle state of polarization (PSP) of a medium having the polarization dependence. For example, there is a phenomenon that the wave degradation of polarization signals in one side becomes greater than that in the other side.

When a known pattern is inserted at a transmitting end and the coefficients of the dispersion compensation filter and the adaptive equalizer filter are controlled based on estimations by use of a known pattern at a receiving end, both X-polarization and Y-polarization become certain known patterns. Thereby, the optical electric field after combining an X-polarized wave and a Y-polarized wave takes a certain state of polarization. In this case, if the state of polarization after combination of the polarized waves corresponds to the polarization state of a large wave distortion at a transmission line, the wave distortion at part of the known pattern becomes remarkably large, so that a wrong estimation result is output for the channel estimation. Therefore, if the coefficients of the dispersion compensation filter and the adaptive equalizer filter are controlled based on the wrong estimation result, a wrong signal processing operation is performed in the compensation process of wave distortion, and the performance of wave distortion compensation is remarkably degraded.

In order to solve the problems described above, there is a technique that varies the polarization state of signal light with time at a transmission side by use of an optical polarization scrambler. The technique used a polarization scrambler having optical connectors as input/output. As the polarization scrambler affects variations of polarization for the whole data, the cycle of the polarization scrambler needs to be increased when it is used.

FIG. 29 is a block diagram that illustrates the construction of a transmitter/receiver apparatus for conventional optical communications. FIG. 29 shows a semiconductor laser 300, a transmitter 301, an optical fiber 305, a receiver 306, and a local oscillator 309. The transmitter 301 consists of a first modulator 302, a second modulator 303, and a polarization beam combiner 304.

The receiver 306 includes a first polarization beam splitter 307, a second polarization beam splitter 308, a first 90 degree hybrid 310, a second 90 degree hybrid 311, a first light receiving element 312, a second light receiving element 313, a third light receiving element 314, a fourth light receiving element 315, a first AD converter 316, a second AD converter 317, a third AD converter 318, a fourth AD converter 319, a first complex addition circuit 320, a second complex addition circuit 321, a combining circuit 322, a synchronous circuit 323, an equalizer 324, and a demodulator 325.

In the transmitter 301, a signal is modulated through the first modulator 302 and second modulator 303. After polarization multiplexing is performed for the signal with the polarization beam combiner 304, the signal is input to the optical fiber 305 for transmission. In the receiver 306, the signal light is split into I-signal and Q-signal that are two orthogonal polarized waves through the first and second polarization beam splitters 307 and 308 and the first and second 90 degree hybrids 310 and 311, and then after the I-signal and Q-signal are converted to digital signals through the first, second, third and fourth AD converters 316, 317, 318 and 319, the digital signals are converted into complex signals, I+jQ, by use of the complex adding circuits 320 and 321 for each of polarized waves. The obtained complex signals are mixed for each of polarized waves with the combining circuit 322 as polarization diversity. Further, the mixed signal is demodulated through the synchronous circuit 323, the equalizer 324, and the demodulator 325, and then the demodulated signals are output.

DOCUMENTS OF THE PRIOR ART

Patent Documents

Patent Document 1: United States Patent Document No. 5327511.

Non-Patent Documents

Non-Patent Document 1: H. Masuda, et. al., "13.5-Tb/s(135× 111-Gb/s/ch)No-Guard-Interval Coherent OFDM Transmission over 6,248 km using SNR Maximized Second-order DRA in the Extended L-band," OSA/OFC/NFOEC 2009, PDPBS.

Non-Patent Document 2: Jianjun Yu, et. al., "17 Tb/s(161× 114 Gb/s)PolMux-RZ-8PSK transmission over 662 km of ultra-low loss fiber using C-band EDFA amplification and digital coherent detection," ECOC 2008, Th.3.E.2, Brussels, Belgium, 21-25 Sep. 2008.

Non-Patent Document 3: L. Liu, et al., "Initial Tap Setup of Constant Modulus Algorithm for Polarization De-multiplexing in Optical Coherent Receivers," OSA/OFC/NFOEC 2009, OMT2.

DISCLOSURE OF INVENTION

Problems to be Solved by the Invention

However, for the polarization scrambler described above, when an optical fiber is arranged on the incident light side of the polarization scrambler, the incident angle of signal light introduced to the polarization scrambler needs to be adjusted at 45 degrees to the axis of the optical waveguide cross-section. This is a problem because the productivity is low.

Furthermore, another problem is that there is no way to be done when the characteristics of the polarization scrambler are degraded due to the aging of optical parts because the incident angle of signal light cannot be adjusted once the optical fiber is placed with the polarization scrambler.

As the polarization scrambler brings polarization variations to not only known signals but also the whole data, the number of taps of a filter for wave distortion at a receiving end needs to be tracked to the state of polarization. In addition, if the cycle of a known signal is high, the cycle of the polarization scrambler has to be high too. When the cycle is not high enough, then the error rate increases. For scrambling optical polarization, the variations are mechanically given in general, and which causes problems of long-term stability and the increase in failure probability.

The present invention is made to take into consideration the issues described above, and its object is to provide a transmission method, a reception method, a transmitter apparatus, and a receiver apparatus that are capable of varying the polarization state of transmission signals with a high speed by digital signals in response to the speed of a symbol rate without using optical parts such as a polarization scrambler or the like, and preventing the degradation of polarization scramble characteristics caused by the adjustment of the incident angle as manufactured or the aging of optical parts without maintenance.

Moreover, an object of the present invention is to a transmission method, a reception method, a transmitter apparatus, and a receiver apparatus that are capable of increasing the diversity effect, improving the estimation accuracy even if only a single polarization component is used to estimate coefficients of a dispersion compensation filter and an adaptive equalizer filter, simplifying a receiver circuit and reducing power consumption.

Means for Solving the Problem

In order to solve the problem described above, a transmission method in accordance with the present invention includes, a step of generating a first signal series and a second signal series, a step of modulating a first polarized wave using the first signal series and a second polarized wave orthogonal to the first polarized wave using the second signal series, and a step of performing polarization multiplexing of the modulated first polarized wave and the modulated second polarized wave, wherein the step of generating includes a switching step that selects at least two steps from a first step that generates the second signal series in which a signal identical to an in-phase component of the first signal series is determined as an in-phase component of the second signal series and a signal identical to a quadrature-phase component of the first signal series is determined as a quadrature-phase component of the second signal series, a second step that generates the second signal series in which a signal identical to the orthogonal component of the first signal series is determined as an in-phase component of the second signal series and a signal caused by performing logical inversion of an in-phase component of the first signal series is determined as a quadrature-phase component of the second signal series, a third step that generates the second signal series in which a signal caused by performing logical inversion of an in-phase component of the first signal series is determined as an in-phase component of the second signal series and a signal caused by performing logical inversion of a quadrature-phase component of the first signal series is determined as a quadrature-phase component of the second signal series, and a fourth step that generates the second signal series in which a signal caused by performing logical inversion of a quadrature-phase component of the first signal series is determined as an in-phase component of the second signal series and a signal identical to an in-phase component of the first signal series is determined as a quadrature-phase component of the second signal series, and the switching step applies said at least two steps to at least part of each period being divided by a predetermined length by alternately switching every each period.

In accordance with another embodiment of the present invention with respect to the transmission method, at least two steps may be applied to part of symbols of a transmission frame.

In accordance with another embodiment of the present invention with respect to the transmission method, an identical step out of said at least two steps may be applied within one transmission frame, and the identical step to be applied to may be alternately switched in every frame.

In accordance with another embodiment of the present invention with respect to the transmission method, the period may includes a known signal and a transmission data series, and the known signal in the second signal series may be generated by alternately switching at least two steps among the first step through the fourth step.

In accordance with another embodiment of the present invention with respect to the transmission method, the known signal may include a special symbol pattern, and most parts of signal components of the special symbol pattern are in two or more predetermined frequency bands.

In accordance with another embodiment of the present invention with respect to the transmission method, the special symbol pattern may be an alternating signal which a phase reverses for each symbol.

In order to solve the problem described above, in accordance with one embodiment of the present invention, a receiving method of a receiver apparatus that receives and demodulates modulation signals caused by performing polarization multiplexing for a first and a second polarized waves being orthogonal each other may includes a step of dividing a modulation signal into a first and a second polarized waves, each of periods of the modulation signal being divided by a predetermined length, a polarization state of at least part of said each of periods being changed by every said each of periods, and a step of mixing at least one of the first and the second polarized waves and a local oscillator light and dividing into at least one of an in-phase component and a quadrature-phase component of at least one of the first and the second polarized waves.

In accordance with another embodiment of the present invention, the receiving method may further includes a step of estimating a transmission line parameter by use of at least one of the first and the second polarized waves, and a step of performing a time-averaging process for the estimated transmission line parameter.

In accordance with another embodiment of the present invention with respect to the receiving method, the step of estimating may include a first estimating step that estimates a first transmission line parameter by use of the divided first polarized wave; and a second estimating step that estimates a second transmission line parameter by use of the divided second polarized wave, wherein the step of the time-averaging process includes a first time-averaging step that performs the time-averaging process of the first transmission line parameter with respect to time, a second time-averaging step that performs the time-averaging process of the second transmission line parameter with respect to time, and an averaging-output step that averages between a value of the averaged first transmission line parameter and a value of the averaged second transmission line parameter and outputs an averaged value.

In accordance with another embodiment of the present invention with respect to the receiving method, the step of dividing may include a mixing-dividing step that mixes received signal light and local oscillator light and divides into an in-phase component and a quadrature-phase component of at least one of the first and the second polarized waves, and the step of estimating the transmission line parameter estimates a transmission line parameter by use of the in-phase component and the orthogonal component of at least one of the divided first and the second polarized waves.

In accordance with another embodiment of the present invention with respect to the receiving method, the first estimating step and the second estimating step may further include a reversing time detecting step that detects a reversing timing of the known signal.

In accordance with another embodiment of the present invention, the receiving method may further include a polarized wave receiving step that receives the modulation signal as a single polarized wave, an accumulating step that accumulates a reception signal of the single polarized wave for a predetermined accumulation time period, and a combining step that combines the reception signal of the signal polarized wave before being accumulated in the accumulating step and the reception signal of the single polarized wave after being accumulated in the accumulating step.

In accordance with another embodiment of the present invention with respect to the receiving method, the accumulating step may include a delaying step that delays the reception signal of the single polarized wave for a predetermined delay time, and the combining step combines the reception signal before being delayed and the reception signal after being delayed.

In accordance with another embodiment of the present invention with respect to the receiving method, the receiving step may receive the modulation signal as two polarized waves being orthogonal each other, in which the accumulating step includes a first accumulation step that accumulates a reception signal of an X-polarized wave for a predetermined first accumulation time period, a second accumulation step that accumulate a reception signal of a Y-polarized wave for a predetermined second accumulation time period, and the combining step includes a first combining step that combines the signal before being accumulated in the first accumulation step and the signal after being accumulated in the first accumulation step, a second combining step that combines the signal before being accumulated in the second accumulation step and the signal after being accumulated in the second accumulation step, and a third combining step that combines a first synthesized signal synthesized in the first combining step and a second synthesized signal synthesized in the second combining step.

In order to solve the problem described above, in accordance with one embodiment of the present invention, a transmission apparatus includes a signal series generation unit configured to generate a first signal series and a second signal series, a modulation unit configured to modulate a first polarized wave based on the first signal series and modulate a second polarized wave being orthogonal to the first polarized wave based on the second signal series, a polarization multiplexing unit configured to perform polarization multiplexing of the modulated first polarized wave and the modulated second polarized wave, wherein the signal series generation unit includes at least two units selected from a first unit that generates the second signal series in which a signal identical to an in-phase component of the first signal series is determined as an identical component of the second signal series and a signal identical to a quadrature-phase component of the first signal series is determined as a quadrature-phase component of the second signal series, a second unit that generates the second signal series in which a signal identical to the orthogonal component of the first signal series is determined as an identical component of the second signal series and a signal caused by performing logical inversion of an identical component of the first signal series is determined as a quadrature-phase component of the second signal series, a third unit that generates the second signal series in which a signal caused by performing logical inversion of an identical component of the first signal series is determined as an identical component of the second signal series and a signal caused by performing logical inversion of a quadrature-phase component of the first signal series is determined as a quadrature-phase component of the second signal series, and a fourth unit that generates the second signal series in which a signal caused by performing logical inversion of a quadrature-phase component of the first signal series is determined as an identical component of the second signal series and a signal identical to an identical component of the first signal series is determined as a quadrature-phase component of the second signal series, and a switching unit that applies said at least two units to at least part of each period being divided by a predetermined length by alternately switching every period.

In accordance with another embodiment of the present invention with respect to the transmission apparatus, the switching unit may apply said at least two units to part of a symbol of a transmission frame.

In accordance with another embodiment of the present invention with respect to the transmission apparatus, the switching unit may apply an identical unit out of said at least two units within a single frame of a transmission frame, and a unit of said at least two units to be applied is alternately switched every frame.

In accordance with another embodiment of the present invention with respect to the transmission apparatus, each period may include a known signal and a transmission data series, and the known signal in the second signal series may be generated by switching at least two units among the first through fourth units.

In accordance with another embodiment of the present invention with respect to the transmission apparatus, the known signal may include a special symbol pattern having most signal components that are included in two or more than two predetermined frequency bands.

In accordance with another embodiment of the present invention with respect to the transmission apparatus, the special pattern may be an alternating signal that reverses a phase every symbol.

In order to solve the problem described above, in accordance with the present invention, a receiver apparatus that receives and demodulates modulation signals caused by performing polarization multiplexing of a first polarized wave and a second polarized wave being orthogonal each other includes a polarized wave dividing unit configured to divide a modulation signal into a first and a second polarized waves, each of periods of the modulation signal being divided by a predetermined length, a polarization state of at least part of said each of periods being changed every period, and a divider circuit configured to mix at least one of the first and the second polarized waves divided by the polarized wave dividing unit and local oscillator light and to divide an in-phase component and a quadrature-phase component of at least one of the first and the second polarized waves.

In accordance with another embodiment of the present invention, the receiver apparatus may further include a channel estimation circuit configured to estimate a transmission line parameter by use of at least one of the first and the second polarized waves divided by the divider circuit, and a time averaging unit configured to perform a time-averaging process for an output value from the transmission line.

In accordance with another embodiment of the present invention with respect the receiver apparatus, the channel estimation unit may include a first channel estimation unit configured to estimate a first transmission line parameter by use of the first polarized wave divided by the divider circuit and a second channel estimation unit configured to estimate a second transmission line parameter by use of the second polarized wave divided by the divider circuit, in which the time-averaging unit includes a first time-averaging unit that performs a time-averaging process for a first output value from the first channel estimation circuit, a second time-averaging unit that performs a time-averaging process for a second output value from the second channel estimation circuit, and an output averaging unit that averages a first averaged output value from the first time-averaging unit and a second averaged output value from the second time-averaging unit.

In accordance with another embodiment of the present invention with respect to the receiver apparatus, the divider circuit may mix received signal light and local oscillator light and divide into an identical component and a quadrature-phase component of at least one of the first polarized wave and the second polarized wave, and the channel estimation circuit may estimate a transmission line parameter by use of the identical component and the orthogonal component of at least one of the first polarized wave and the second polarized wave.

In accordance with another embodiment of the present invention, the receiver apparatus may further include a phase inversion detection circuit configured to detect a reverse timing of a known signal and provide information of the reverse timing to the channel estimation circuit.

In accordance with another embodiment of the present invention, the receiver apparatus may further include a receiving unit that receives the modulation signal as a single polarized wave, a buffer unit that accumulates a reception signal of the single polarized wave received by the receiving unit for a predetermined time period, and a combining unit that combines the reception signal before being accumulated in the buffer unit and the reception signal after being accumulated in the buffer unit.

In accordance with another embodiment of the present invention with respect to the receiver apparatus, the buffer unit may be a delay circuit that delays the reception signal of the single polarized signal received by the receiving unit for a predetermined time period, and the combining unit combines the reception signal before being delayed by the delay circuit and the reception signal after being delayed by the delay circuit.

In accordance with another embodiment of the present invention with respect to the receiver apparatus, the receiving unit may receive the modulation signal as two polarized waves being orthogonal each other, the buffer unit includes a first buffer unit that accumulates a reception signal of an X-polarized wave received by the receiving unit for a first predetermined time, and a second buffer unit that accumulates a reception signal of an Y-polarized wave received by the receiving unit for a second predetermined time, the synthesizer unit includes a first combining unit that combines a signal before being accumulated in the first accumulation unit and a signal after being accumulated in the first accumulation unit, a second combining unit that combines a signal before being accumulated in the second accumulation unit and a signal before being accumulated in the second accumulation unit, and a third combining unit that combines a first synthesized signal synthesized by the first combining unit and a second synthesized signal synthesized by the second combining unit.

Effect of the Invention

In accordance with the present invention, the polarization state of a transmission signal can be changed at high speed based on a symbol rate by use of digital signals without using optical parts such as a polarization scrambler or the like. Thereby, it is possible to avoid taking measures for the degradation of polarization scramble characteristics due to the adjustment of incident angles at manufacturing process and aging of optical parts.

Further, in accordance with the present invention, it is possible to improve the diversity effect. Even if the coefficients of a dispersion compensation filter and an adaptable equalizer filter are estimated by use of only one of polarization components, the estimation accuracy can be improved, and simplifying a receiver circuit and reducing power consumption can be achieved.

BRIEF DESCRIPTION OF THE DRAWINGS

FIG. 2 is a conceptual drawing that illustrates a configuration of a transmission frame in accordance with the first embodiment;

FIG. 28 is a block diagram that illustrates an example of the configuration of an optical communication transmitter/receiver apparatus having a polarization scrambler in accordance with prior art.

EMBODIMENTS FOR CARRYING OUT THE INVENTION

In the following, the first embodiment in accordance with the present invention will be described with reference to the drawings.

A. First Embodiment

Descriptions will be given in the following with respect to the first embodiment in accordance with the present invention.

A-1. Configurations of the First Embodiment

Figure 1:
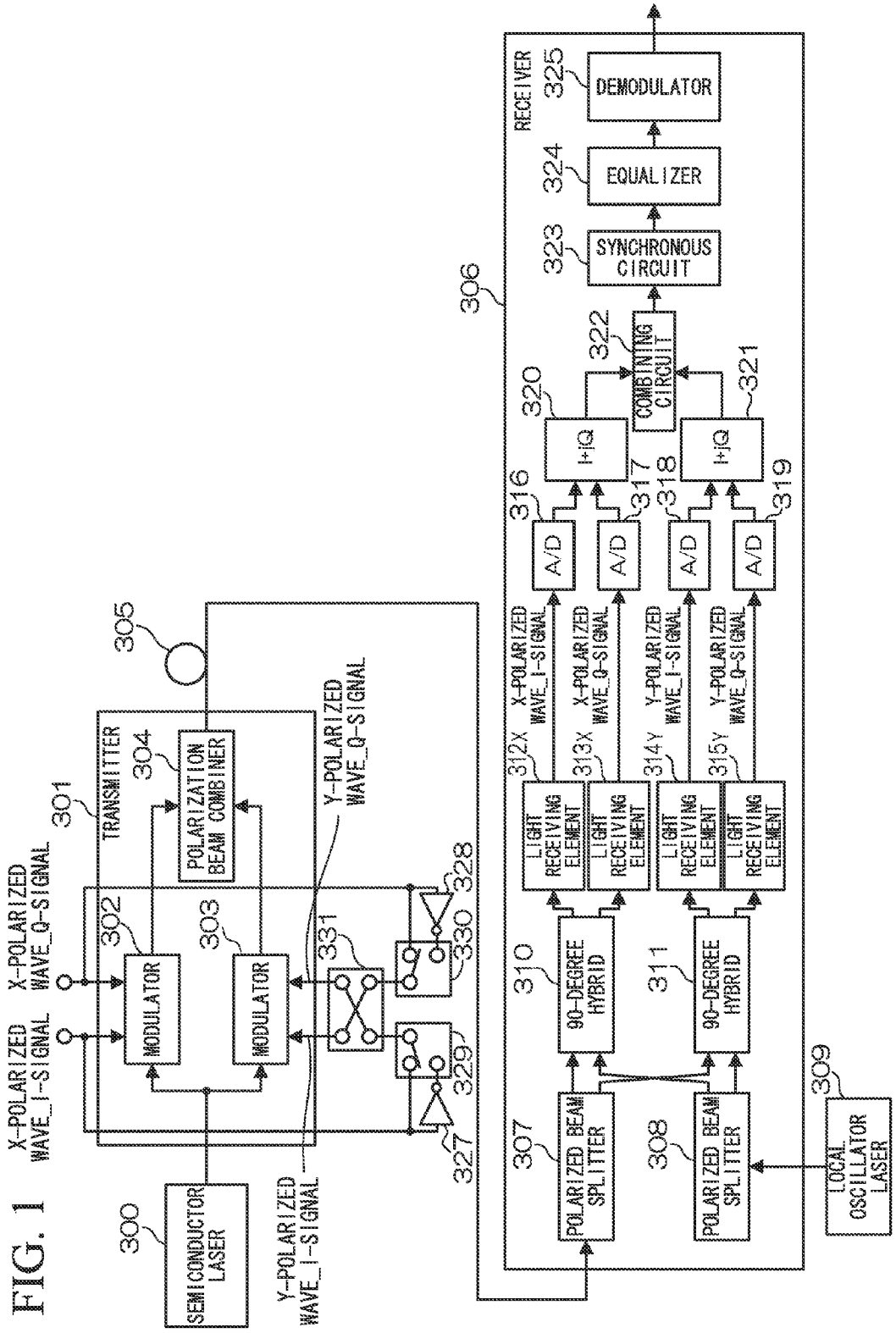
FIG. 1 is a block diagram that illustrates an example configuration of a transmitter/receiver apparatus in accordance with a first embodiment of the present invention.

FIG. 1 is a block diagram that illustrates an example of configurations of a transmission/receiver apparatus in accordance with the first embodiment of the present invention.

With respect to parts in FIG. 1 corresponding to those in FIG. 28, symbols identical to those in FIG. 28 are used and the explanations will be omitted. FIG. 1 shows a semiconductor laser 300, a transmitter 301, an optical fiber 305, a receiver 306, a local oscillator laser 309, a first inverter 327, a second inverter 328, a first switch 329, a second switch 330, and a third switch 331.

In the transmitter 301, the first switch 329, the second switch 330, and the third switch 331 are switched so that a signal identical to an X-polarized wave_I-signal or a signal caused by performing logical inversion for the X-polarized wave_I-signal via the first inverter 327 is input to the second modulator 303 as a Y-polarized wave_I-signal, in which the X-polarized wave_I-signal is the signal to be input to the first modulator 302. Further, the first switch 329, the second switch 330, and the third switch 331 are switched so that a signal identical an X-polarized wave_Q-signal or a signal caused by performing logical inversion for the X-polarized wave_Q-signal via the second inverter 328 is input to the second modulator 303 as a Y-polarized wave_I-signal, in which the X-polarized wave_Q-signal is the signal to be input to the first modulator 302.

Further, the first switch 329, the second switch 330, and the third switch 331 are switched so that a signal identical to the X-polarized wave_I-signal, or a signal caused by performing logical inversion for the X-polarized wave_I-signal via the first inverter 327 is input to the second modulator 303 as a Y-polarized wave_Q-signal. Further, the first switch 329, the second switch 330, and the third switch 331 are switched so that a signal identical to the X-polarized wave_Q-signal or a signal caused by performing logical inversion for the X-polarized wave_Q-signal is input to the second modulator 303 as a Y-polarized wave_Q-signal, in which the X-polarized wave_Q-signal is input to the first modulator 302.

Based on the configurations above, the polarization states of transmission signals can be varied at high speed based on a symbol rate without using optical parts such as polarization scramblers or the like. More specific operations will be described below.

A-2. Transmission Frame in Accordance with First Embodiment

FIG. 2 is a conceptual drawing that illustrates the configuration of a transmission frame in accordance with a first embodiment. In FIG. 2, tag numbers 101 through 112 are information symbols. In a time period (1), a Y-polarized wave_I-signal is a signal identical to an X-polarized wave_I-signal (a first information symbol 101), and a Y-polarized wave_Q-signal is a signal identical to an X-polarized wave_Q-signal (a fifth information symbol 105). Further, in a time period (2), a Y-polarized wave_I-signal is a signal identical to an X-polarized wave_Q-signal (a sixth information symbol 106), and a Y-polarized wave_Q-signal (an eleventh information symbol 111) is obtained by logically inverting an X-polarized wave_I symbol (a second information symbol 102).

In a time period (3), a Y-polarized wave_I-signal (a ninth information symbol 109) is a reverse logic signal that is obtained by logically inverting an X-polarized wave_I-signal (a third information symbol 103), and a Y-polarized wave_Q-signal (a twelfth information symbol 112) is obtained by logically inverting an X-polarized wave_Q-signal (a seventh information symbol 107). Further, in a time period (4), a Y-polarized wave_I-signal (a tenth information symbol 110) is a signal caused by performing logical inversion for an X-polarized wave_Q-signal (an eighth information symbol 108), and an Y-polarized wave_Q-signal is identical to an X-polarized wave_I-signal (a fourth information symbol 104).

The operations for the transmission frames illustrated in FIG. 2 are described with reference to FIGS. 3A-3E, FIGS. 4A-4E and FIGS. 6A-6E.

Figure 3A:
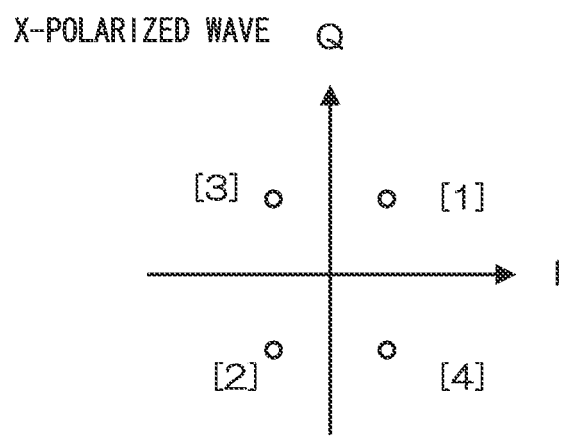
FIG. 3A is a conceptual drawing that illustrates the operations when the transmission frame in accordance with the first embodiment is used.
Figure 3B:
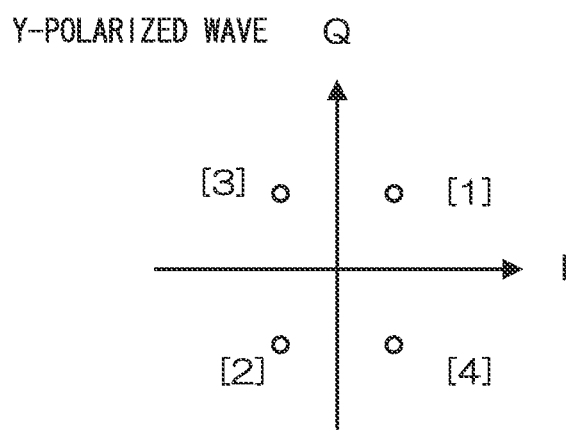
FIG. 3B is a conceptual drawing that illustrates the operations when the transmission frame in accordance with the first embodiment is used.

In the time period (1) in FIG. 2, the Y-polarized wave_I-signals are identical to the X-polarized wave_I-signals, and the Y-polarized_Q signals are identical to the X-polarized wave_Q-signals. Thus, the signal points on an I-Q plane of an X-polarized wave in FIG. 3A and the signal points on an I-Q plane of a Y-polarized wave are located on identical positions. In FIGS. 3A and 3B, if numbers indicated in brackets IF are identical for the X-polarized wave and the Y-polarized wave, then it indicates that the signal positions are located at identical time.

Figure 3C:
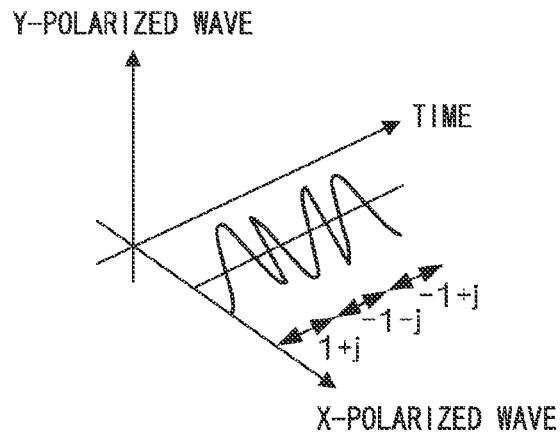
FIG. 3C is a conceptual drawing that illustrates the operations when the transmission frame in accordance with the first embodiment is used.
Figure 3D:
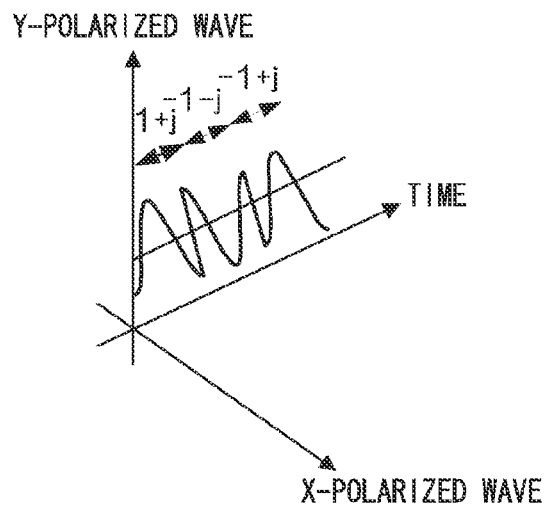
FIG. 3D is a conceptual drawing that illustrates the operations when the transmission frame in accordance with the first embodiment is used.

FIGS. 3C and 3D show time-dependent waves of modulated signals of light that are formed by PSK (Phase Shift Keying) modulation based on variation of base band signals. For example, when the base band signal is in a period of "1+j," the modulated signal has a 45-degree phase difference compared to a carrier wave, and when the base band signal is in a period of "−1−j," the modulated signal has a 225-degree phase difference compared to the carrier wave.

In FIGS. 3C and 3D, when assuming that a modulated signal on the X-polarized plane is Ex, a modulated signal on the Y-polarized plane is Ey, and a propagating direction of waves is indicated by a Z axis, then the phase difference between Ex and Ey becomes zero, and the relations can be expressed in equations (1) and (2).

$$Ex = A\sin(\omega t - kz) \quad (1)$$

$$Ey = B\sin(\omega t - kz) \quad (2)$$

where, A and B indicate the amplitude of modulated signals of light, ω is an angular frequency, t indicates time, and k is a propagation constant.

When the amplitude A and B are equal, the modulated signals Ex and Ey are expressed in equation (3).

$$Ex = Ey \quad (3)$$

Figure 3E:
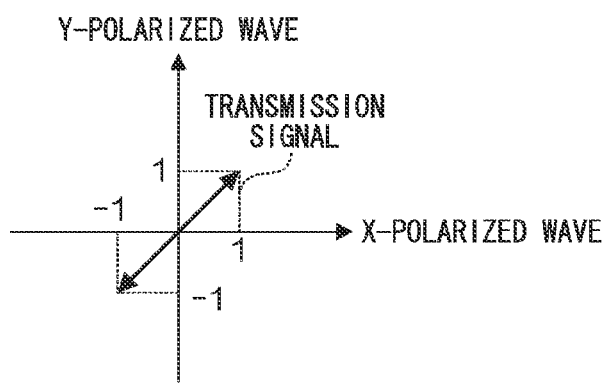
FIG. 3E is a conceptual drawing that illustrates the operations when the transmission frame in accordance with the first embodiment is used.

A signal that is formed by synthesizing vectors of the modulated signals on two polarized planes can be illustrated in FIG. 3E. Thus the signal is linearly polarized light which propagates along the Z axis vibrating with the angular frequency ω on a polarized wave plane that forms an angle of +45 degrees to the X polarized plane. The polarized wave plane is in between the X polarized plane and Y polarized plane.

In the time period (2) shown in FIG. 2, the Y-polarized wave_I-signal is identical to an X-polarized wave_Q-signal, and the Y-polarized wave_Q-signal is a logic inversion of an X-polarized wave_I-signal. Thus, a point that is obtained by rotating a signal point on the IQ plane of an X-polarized wave in FIG. 4A clockwise by 90 degrees corresponds to a signal point of the Y-polarized wave on the I-Q plane in FIG. 4B. When numbers in brackets "[ ]" in the figure are identical between X-polarized waves and Y-polarized waves, it indicates that the signal points are at an identical point in time.

Figure 4A:
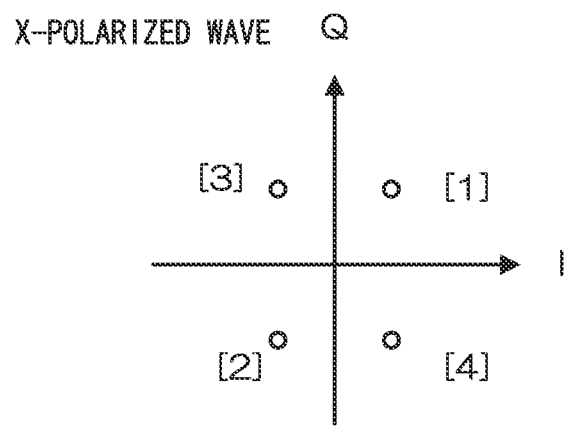
FIG. 4A is a conceptual drawing that illustrates the operations when the transmission frame in accordance with the first embodiment is used.
Figure 4B:
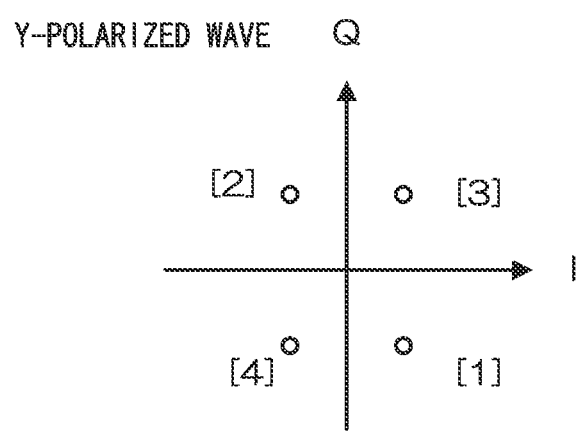
FIG. 4B is a conceptual drawing that illustrates the operations when the transmission frame in accordance with the first embodiment is used.
Figure 4C:
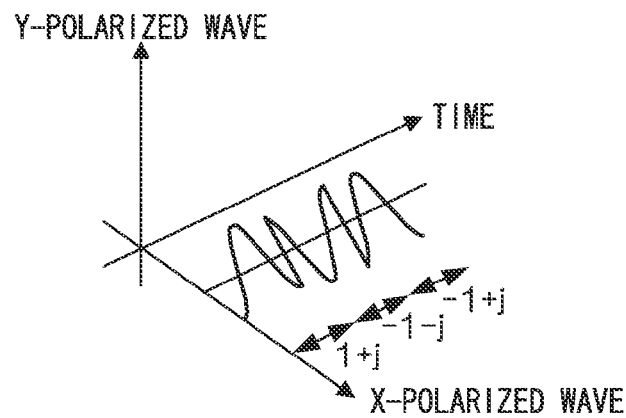
FIG. 4C is a conceptual drawing that illustrates the operations when the transmission frame in accordance with the first embodiment is used.
Figure 4D:
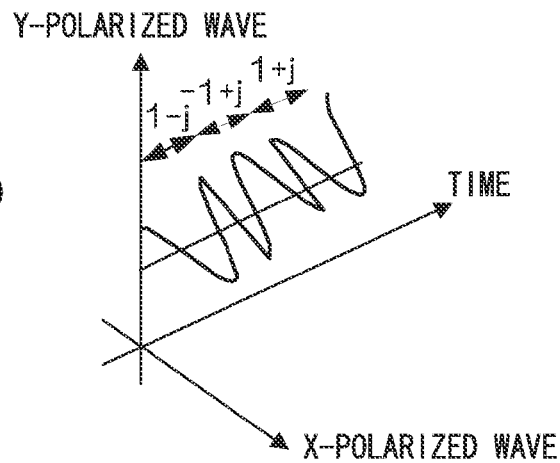
FIG. 4D is a conceptual drawing that illustrates the operations when the transmission frame in accordance with the first embodiment is used.

In FIGS. 4C and 4D, when assuming that a modulated signal on the X-polarized wave plane is indicated by Ex, a modulated signal on the Y-polarized wave plane is indicated by Ey, and the propagation direction of waves corresponds to the Z axis, then the phase of Ey is behind Ex by 90 degrees. Ex and Ey can be written as equations (4) and (5).

$$Ex = A\sin(\omega t - kz) \quad (4)$$

$$Ey = -B\cos(\omega t - kz) \quad (5)$$

When the amplitude A and B are the same, Ex and Ey can be written in equation (6) as follows.

$$Ex^2 + Ey^2 = A^2 \quad (6)$$

Figure 4E:
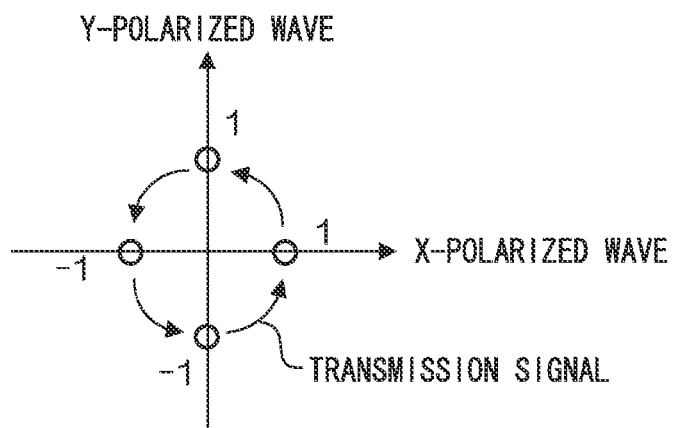
FIG. 4E is a conceptual drawing that illustrates the operations when the transmission frame in accordance with the first embodiment is used.

The signal obtained by synthesizing two modulated wave signals on a polarized plane draws a circle on the Y-X polarized wave plane as shown in FIG. 4E. Based on the relationship of phases between equations (4) and (5), the signal of synthesized vectors becomes circularly polarized light and propagates in the Z direction with rotating counterclockwise at an angular frequency w.

Figure 5A:
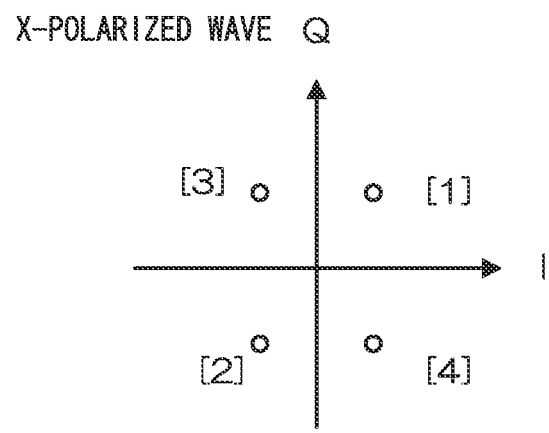
FIG. 5A is a conceptual drawing that illustrates the operations when the transmission frame in accordance with the first embodiment is used.
Figure 5B:
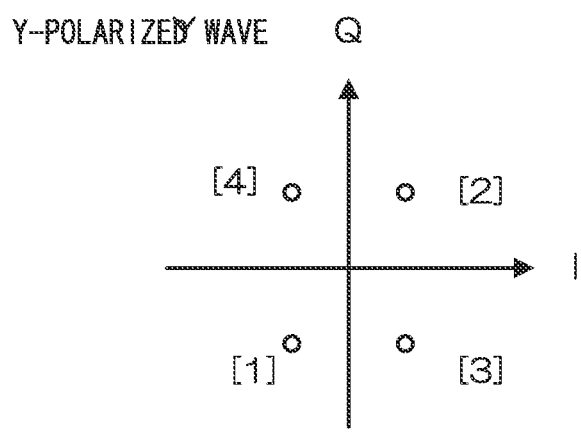
FIG. 5B is a conceptual drawing that illustrates the operations when the transmission frame in accordance with the first embodiment is used.

In the time period (3) in FIG. 2, the Y-polarized wave_I-signal is a signal obtained by logically inverting the X-polarized wave_I-signal, and the Y-polarized wave_Q-signal is a signal obtained by logically inverting the X-polarized wave_Q signal. Thus a signal point of an X-polarized wave indicated in FIG. 5A and a point of the Y-polarized wave indicated in FIG. 5B become central symmetry with respect to the origin on the I-Q plane. When numbers in brackets "[ ]" in the figure are identical between X-polarized waves and Y-polarized waves, it indicates that the signal points are at an identical point in time.

Figure 5C:
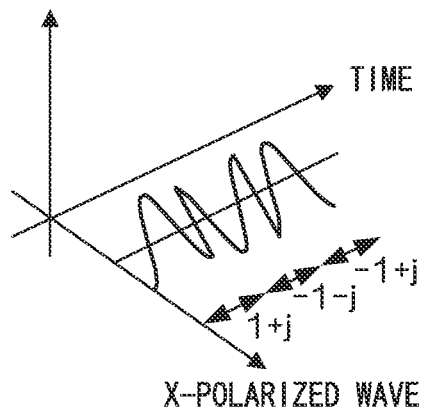
FIG. 5C is a conceptual drawing that illustrates the operations when the transmission frame in accordance with the first embodiment is used.
Figure 5D:
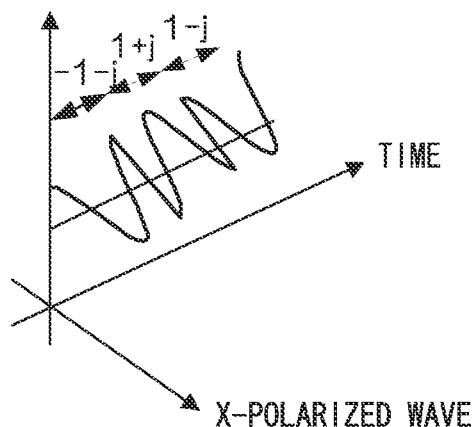
FIG. 5D is a conceptual drawing that illustrates the operations when the transmission frame in accordance with the first embodiment is used.

In FIGS. 5C and 5D, when assuming that a modulated signal on the X-polarized wave plane is indicated by Ex, a modulated signal on the Y-polarized wave plane is indicated by Ey and the propagation direction of waves corresponds to the Z axis, then the phase difference between Ey and Ex is 180 degrees. Ex and Ey can be written as equations (7) and (8).

$$Ex = A\sin(\omega t - kz) \quad (7)$$

$$Ey = -B\sin(\omega t - kz) \quad (8)$$

When the amplitude A and B are equal, Ex and Ey can be expressed as follows.

$$Ex = -Ey \quad (9)$$

Figure 5E:
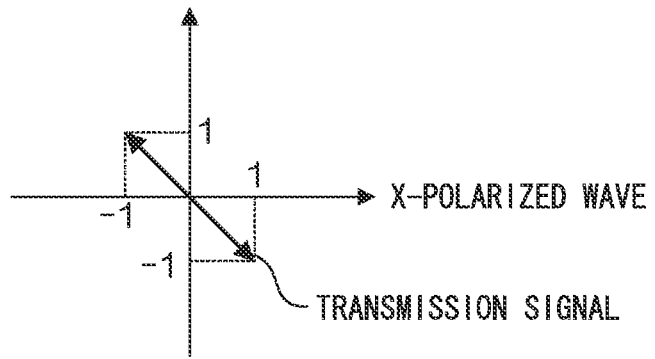
FIG. 5E is a conceptual drawing that illustrates the operations when the transmission frame in accordance with the first embodiment is used.

A signal that is formed by synthesizing vectors of the modulated signals on two polarized planes can be illustrated in FIG. 5E. Thus the signal is linearly polarized light which propagates along the Z axis vibrating with the angular frequency ω on a polarized wave plane that forms an angle of −45 degrees to the X polarized plane. The polarized wave plane is in between the X polarized plane and Y polarized plane.

In the time period (4) in FIG. 2, the Y-polarized wave_I-signal is a signal obtained by logically inverting the X-polarized wave_Q-signal, and the Y-polarized wave_Q-signal is the same signal as the X-polarized wave_I-signal. Thus, a point that is obtained by rotating a signal point on the IQ plane of an X-polarized wave in FIG. 6A counterclockwise by 90 degrees corresponds to a signal point of the Y-polarized wave on the I-Q plane in FIG. 6B. When numbers in brackets "[ ]" in the figure are identical between X-polarized waves and Y-polarized waves, it indicates that the signal points are at an identical point in time.

Figure 6A:
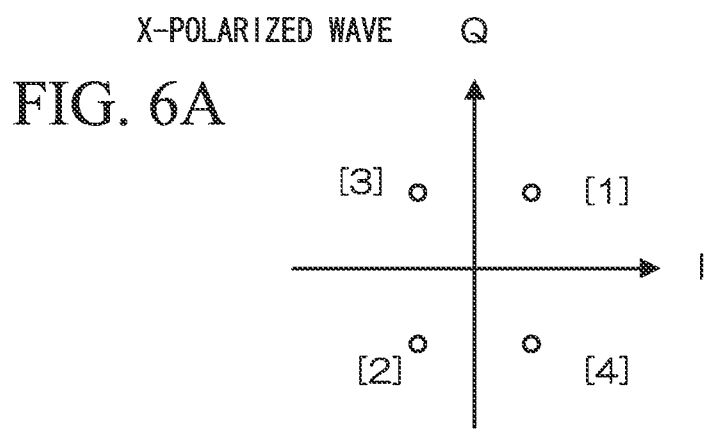
FIG. 6A is a conceptual drawing that illustrates the operations when the transmission frame in accordance with the first embodiment is used.
Figure 6B:
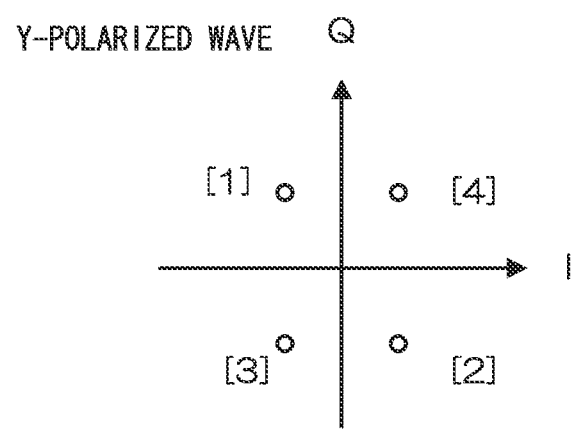
FIG. 6B is a conceptual drawing that illustrates the operations when the transmission frame in accordance with the first embodiment is used.
Figure 6C:
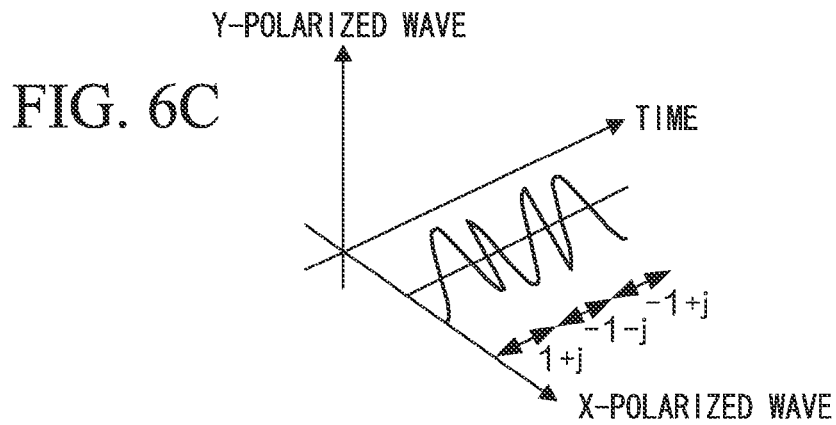
FIG. 6C is a conceptual drawing that illustrates the operations when the transmission frame in accordance with the first embodiment is used.
Figure 6D:
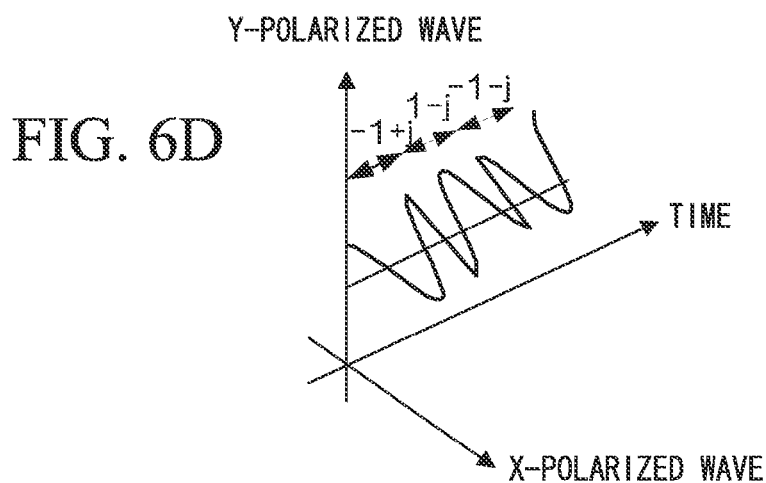
FIG. 6D is a conceptual drawing that illustrates the operations when the transmission frame in accordance with the first embodiment is used.

In FIGS. 6C and 6D, when assuming that a modulated signal on the X-polarized wave plane is indicated by Ex, a modulated signal on the Y-polarized wave plane is indicated by Ey and the propagation direction of waves corresponds to the Z axis, then the phase of Ey progresses in advance of Ex by 90 degrees. Ex and Ey can be written as equations (10) and (11).

$$Ex = A\sin(\omega t - kz) \quad (10)$$

$$Ey = B\cos(\omega t - kz) \quad (11)$$

When the amplitude A and B are equal then Ex and Ey can be expressed in equation (12) as follows.

$$Ex^2 + Ey^2 = A^2 \quad (12)$$

Figure 6E:
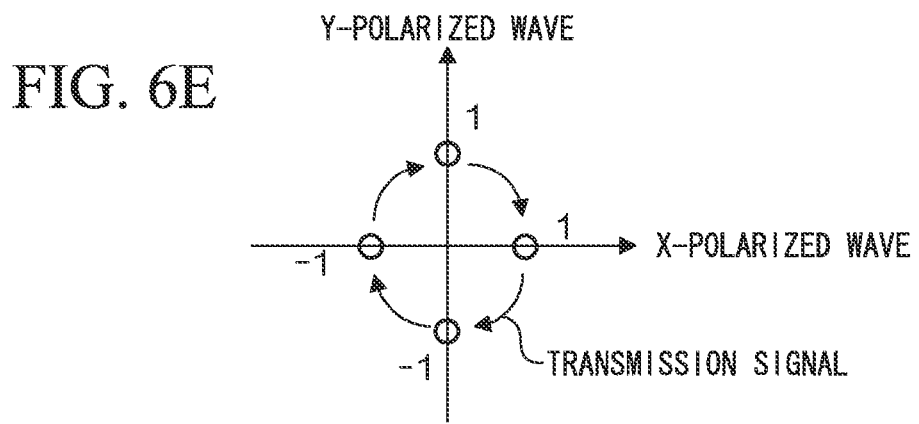
FIG. 6E is a conceptual drawing that illustrates the operations when the transmission frame in accordance with the first embodiment is used.

The signal obtained by synthesizing two modulated wave signals on a polarized plane draws a circle on the Y-X polarized wave plane as shown in FIG. 6E. Based on the relation of phases between equations (10) and (11), the signal of synthesized vectors becomes circularly polarized light and propagates in the Z direction with rotating clockwise at an angular frequency ω.

Figure 7:
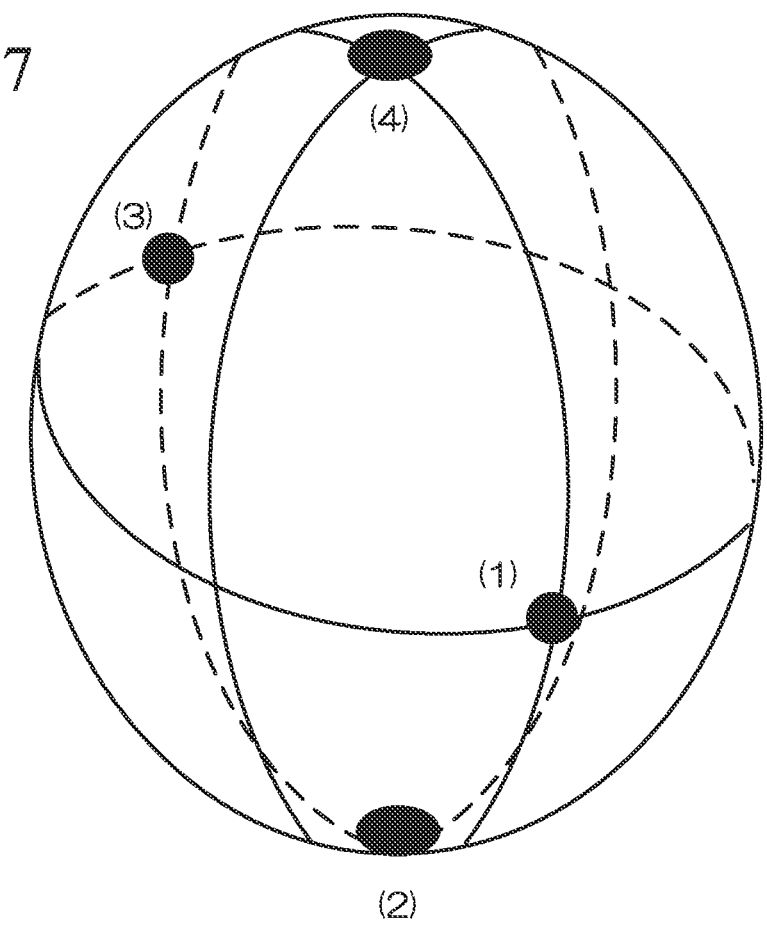
FIG. 7 is a drawing that illustrates changes in a polarization state in accordance with the first embodiment.

Each of polarization states described above is shown in the lowest row in FIG. 2. Further, a Poincaré sphere, which illustrates polarization states, on which the polarization states in accordance with the first embodiment are drawn, is shown in FIG. 7. The numbers 1 through 4 in the brackets correspond to the time periods (1) through (4). On the Poincare sphere, the polarization states in accordance with the first embodiment can be expressed as four points, in which two points are on the equator as point-symmetry with respect to the origin and one is on the north pole and the other one is on the south pole. Thus, the polarization states of a modulated signal that is a transmission signal can be varied in four ways for each symbol.

The variation of polarization states is performed only based on the digital signal processing without using optical parts such as a polarization scrambler or the like. There is no need to limit the four polarization states to be changed in the order predetermined for each symbol. The polarization states may be changed for a set of symbols, or the order of changing the polarization states may be random. Further, the polarization states may be changed by use of only two or three states out of four states.

According to the first embodiment described above, for a modulation format (QPSK, 16QAM, etc.) that has two modulation signals with a phase difference of 90 degrees, the components I and Q of the Y-polarized wave are pre-coded by properly changing with four patterns based on the components I and Q of the X-polarized wave, and the X-polarized wave and the Y-polarized wave are synthesized and transmitted. This makes it possible to electrically change the polarization states of output signal light at high speed, so that the influence of polarization hole burning can be reduced. Further, since optical parts such as polarization scramblers are not employed, there is no degradation of characteristics due to aging of optical parts.

B. Second Embodiment

Descriptions will be given with respect to the second embodiment in accordance with the present embodiment next.

B-1. Configurations of Second Embodiment

Figure 8:
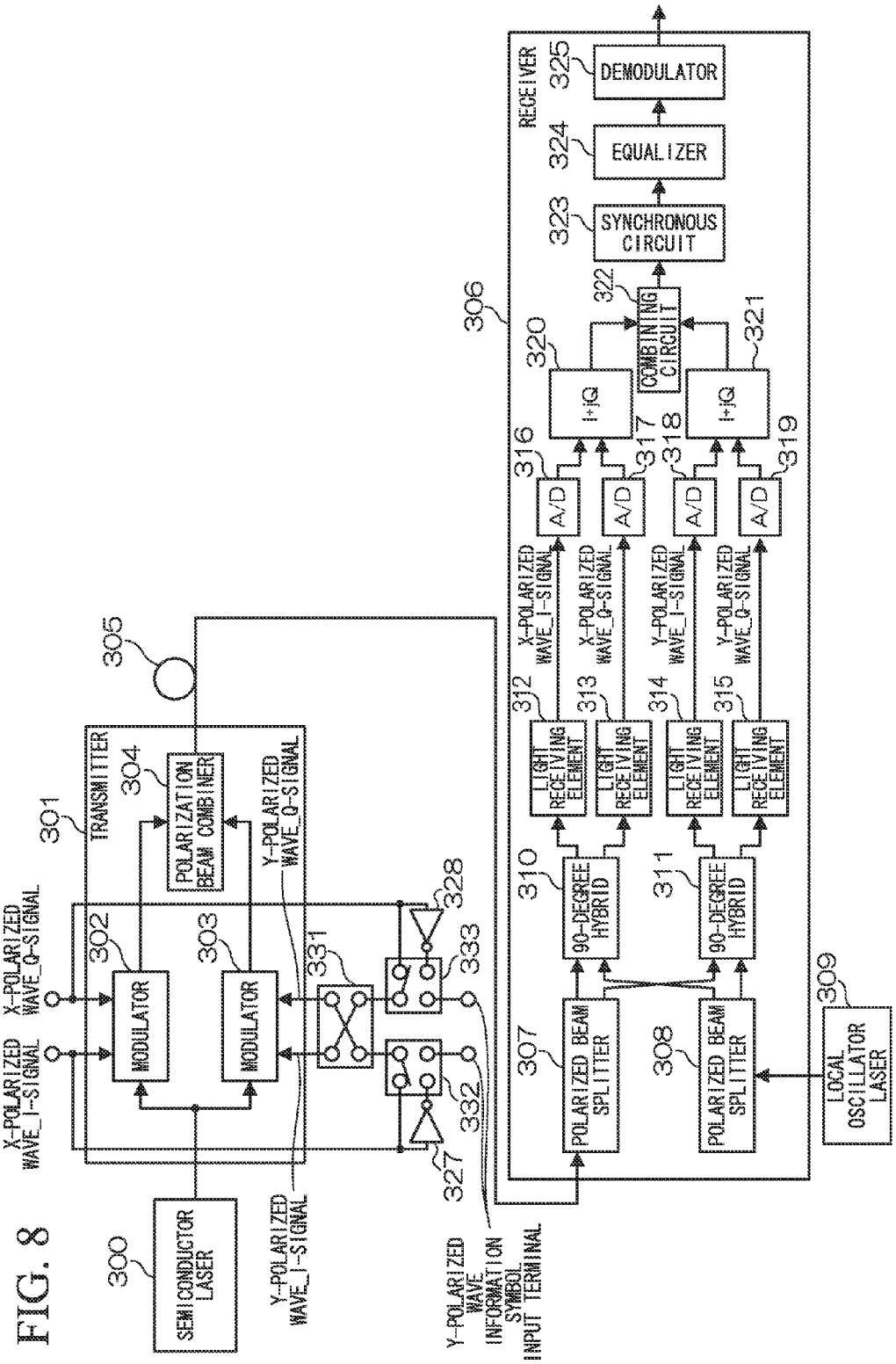
FIG. 8 is a block diagram that illustrates an example configuration of the transmitter/receiver apparatus in accordance with a second embodiment of the present invention.

FIG. 8 is a block diagram that illustrates an example of configurations of a transmission/receiver apparatus in accordance with the second embodiment of the present invention. Parts indicated in FIG. 8 corresponding to those in FIG. 1 are assigned by identical symbols and the descriptions will be omitted. FIG. 8 shows a fourth switch 332 and a fifth switch 333. The difference between FIG. 8 and the configurations of the transmission/receiver apparatus in FIG. 1 in accordance with the first embodiment is that external input terminals are provided for the fourth switch 332 and the fifth switch 333 to input a Y-polarized wave_information symbol through the terminals. Thus a base band signal that is independent from X-polarized wave_input signal can be input to the second modulator 303.

With respect to information symbols, a certain degree of polarization scramble can be performed based the principle of the present invention by preliminary making quasi-noise of transmission data (data scramble). On the other hand, synchronization signals and training signals are formed based on specific symbol patterns. Identical symbol patterns are generally used repeatedly for different frames.

Accordingly, in the configuration in accordance with the second embodiment, the polarization scramble using digital signals based on the present invention is applied to synchronization signals or training signals, while the polarization scramble is not applied to information symbols and independent signals for the X-polarized wave and the Y-polarized wave are transmitted. In this manner, both high speed data transmission based on polarization multiplexing and polarization scramble are performed.

As synchronization signals, there are a bit synchronization signal and a frame synchronization signal. The bit synchronization signal is used to synchronize the timing of a data signal and a clock signal. The frame synchronization signal is used to identify the start point of a frame. Further, a training signal is used to initially introduce the propagation characteristic estimation process of a transmission line of the receiver 306. For such signals, codes formed by alternately arranging "1" and "0" or pseudo noise (PN) codes.

With respect to these synchronization signals and training signals, when Y-polarized wave signals are varied by synchronizing with X-polarized wave signals, Y-polarized wave signals may become to have symbol patterns that have frequency components different from those of X-polarized wave signals. For example, when it is supposed that an X-polarized wave_I-signal is "(1010 . . . )," an X-polarized wave_Q-signal is "(1010 . . . )," and the polarization states of the signals are to be varied for a single symbol according to polarization states (1), (2), (3) and (4) in FIG. 2, the Y-polarized wave_I-signal becomes "(1001 . . . )" and the Y-polarized wave_Q signal becomes "(1100 . . . )." As a result, the Y-polarized signal becomes a symbol pattern that has a frequency component different from that of the X-polarized signal.

When such symbol patterns are not allowed, the polarization states of the synchronization signals and training signals may be varied for a single frame. By making the polarization states of the synchronization signals or the polarization states of the training signals be constant in a single frame and making the polarization states of the synchronization signals or the polarization states of the training signals be varied between frames, the X-polarized wave and Y-polarized wave become symbol patterns that have an identical frequency component. As a result, the polarization states are randomized for a time period over several frames.

For FIG. 8, in a time period of the synchronization signals or the training signals, the third switch 331, the fourth switch 332 and the fifth switch 333 are switched so that a signal identical to the signal input to the first modulator 302 or a signal obtained by inverting a signal input to the first modulator 302 is input to the second modulator 303. Further, in a time period with respect to information series, the third switch 331, the fourth switch 332 and the fifth switch 333 are switched so that the information symbol of a Y-polarized wave that is input externally is input to the second modulator 303.

B-2. Transmission Frame Based on Second Embodiment

Specific operations based on the second embodiment will be described below.

Figure 9:
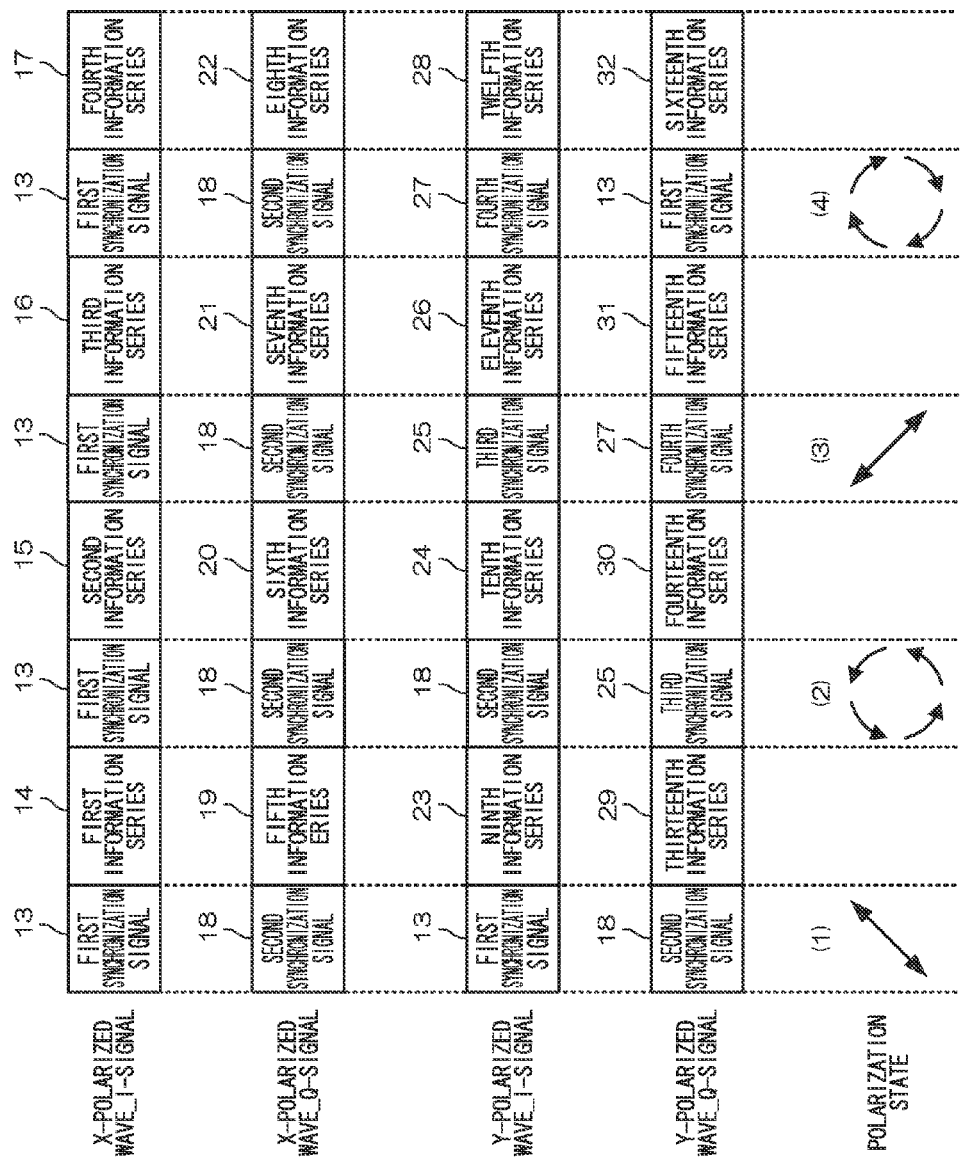
FIG. 9 is a conceptual drawing that illustrates a configuration of a transmission frame in accordance with the second embodiment.

FIG. 9 is a conceptual drawing that illustrates the configuration of a transmission frame in accordance with the second embodiment. FIG. 9 shows synchronization signals 13, 18, 25, and 27, which are composed of symbols and have predetermined symbol patterns. Further, information series are numbered as 14, 15, 16, 17, 19, 20, 21, 22, 23, 24, 26, 28, 29, 30, 31, and 32, which are composed of information symbols.

With respect to synchronization signals, the X-polarized wave_I-signals and the X-polarized wave_Q-signals, identical symbol patterns are repeated for each frame. On the other hand, the Y-polarized wave_I-signals and the Y-polarized wave_Q-signals are signals that are identical to the X-polarized wave_I-signals and the X-polarized wave_Q-signals or that are obtained by logically inverting the X-polarized wave_I-signals and the X-polarized wave_Q-signals.

At the time period (1) of the synchronization signal, the Y-polarized wave_I-signal is a signal identical to the X-polarized wave_I-signal (the first synchronization signal 13), and the Y-polarized wave_Q-signal is a signal identical to the X-polarized wave_Q-signal (the second synchronization signal 18). Further, in the time period (2), the Y-polarized wave_I-signal is a signal identical to the X-polarized wave_Q-signal (the second synchronization signal 18), and the Y polarized_Q-signal (the third synchronization signal 25) is a signal caused by performing logical inversion for the X-polarized wave_I-signal (the first synchronization signal 13).

Further, in the time period (3), the Y-polarized wave_I-signal (the third synchronization signal 25) is a signal obtained by logically inverting the X-polarized wave_I-signal (the first synchronization signal 13), and the Y-polarized wave_Q-signal (the fourth synchronization signal 27) is a signal obtained by logically inverting the X-polarized wave_Q-signal (the second synchronization signal 18). In the time period (4), the Y-polarized wave_I-signal (the fourth synchronization signal 27) is a signal obtained by logically inverting the X-polarized wave_Q-signal (the second synchronization signal 18), and the Y-polarized wave_Q-signal (the first synchronization signal 13) is a signal identical to the X-polarized wave_I-signal.

Accordingly, the polarization state of a synchronization signal varies in a manner similar to the information symbols in FIGS. 3A through 3E, FIGS. 4A through 4E, FIGS. 5A through 5E, and FIGS. 6A through 6E. The variation of the polarization state is indicated in the lower side of FIG. 9. Namely, among transmission signals, the polarization state of a synchronization signal can be varied for each frame.

For example, when a synchronization signal of the X-polarized wave_I-signal is "(1010 . . . )" and a synchronization signal of the X-polarized wave_Q-signal is "(1010 . . . )," the Y-polarized wave_I-signal becomes "(1010 . . . )" and the Y-polarized wave_Q-signal becomes "(1010 . . . )" in the time period (1) of FIG. 9, the Y-polarized wave_I-signal becomes "(1010 . . . )" and the Y-polarized wave_Q-signal becomes "(0101 . . . )" in the time period (2), the Y-polarized wave_I-signal becomes "(0101 . . . )" and the Y-polarized wave_Q-signal becomes "(0101 . . . )" in the time period (3), and the Y-polarized wave_I-signal becomes "(0101 . . . )" and the Y-polarized wave_Q-signal becomes "(1010 . . . )" in the time period (4). Thus, the Y-polarized wave signal becomes a symbol pattern having a frequency component identical to that of the X-polarized wave signal, and the polarization states are different between frames.

The variation of polarization states is performed based on only digital processing without optical parts such as polarization scramblers. The synchronization signal may be a training signal. Further, the four polarization states are not limited to be varied for each frame according to an predetermined order, the polarization states may be varied for multiple frames, and further, the variation of polarization states may be in random order. Further, only two out of four polarization states or only three out of four polarization states may be employed.

Figure 10A:
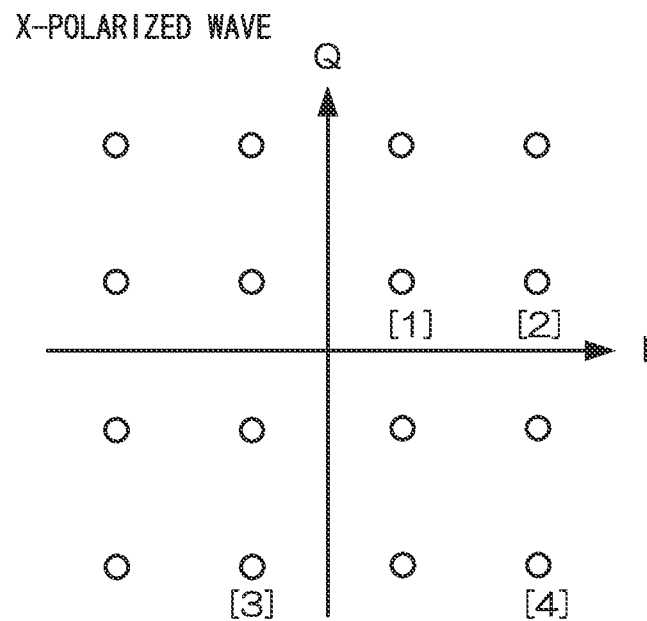
FIG. 10A is a drawing that illustrates operations in which the transmission frame in accordance with the second embodiment is applied to another modulation method.
Figure 10B:
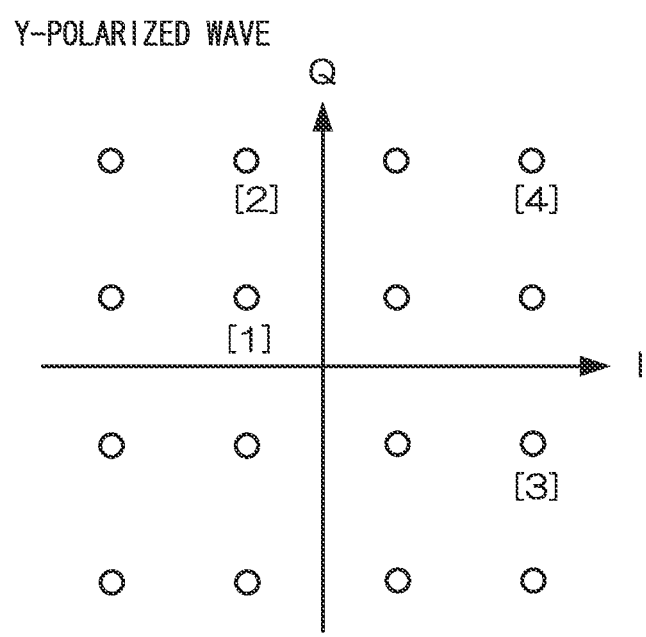
FIG. 10B is a drawing that illustrates operations in which the transmission frame in accordance with the second embodiment is applied to another modulation method.

The modulation method is not limited to PSK (Phase Shift Keying) as long as it has signal point with 90-degree phase differences such as QAM (Quadrature Amplitude Modulation). FIGS. 10A and 10B show an example of a modulation method based on a 16 QAM. The signal point rotated counterclockwise by 90 degrees on the IQ plane of the X-polarized wave in FIG. 1 y0A corresponds to the signal point on the I-Q plane of the Y-polarized wave in FIG. 10B. When the numbers in brackets "[ ]" X-polarized wave and the Y-polarized wave indicate the same between the X-polarized wave and the Y-polarized wave, then it indicates that their signal points are at an identical point in time.

This is the phase relation identical to the time period (4) shown in FIGS. 2 and 9; the Y-polarized wave_I-signal is a signal obtained by logically inverting the X-polarized wave_Q-signal; the Y-polarized wave_Q-signal is a signal identical to the X-polarized wave_I-signal. Thereby, similarly to the case of PSK modulation, the signal obtained by synthesizing modulated wave signals of the X-polarized wave and the Y-polarized wave on two polarized wave planes becomes a circular polarization that propagates toward the Z-direction rotating clockwise against the propagating direction at an angular frequency ω. The other three polarization states can be formed similarly to the time periods (1) through (3) shown in FIGS. 2 and 9.

In accordance with the second embodiment describe above, with respect to the modulation format having 90-degree phase difference (QPSK, 16QAM or the like), the polarization states of output signal light can be varied electronically at high speed by pre-coding with four kind patterns and outputting with synthesizing the X-polarized wave and the Y-polarized wave. Accordingly it is possible to reduce the influence on polarization hole burning effect. Moreover, since there is no need to use optical parts such as polarization scramblers, no degradation occurs due to aging of the optical parts such as polarization scramblers. Also, with respect to synchronization signals or part of training patterns, identical frequency components can be obtained within the same frame for the X-polarized wave and Y-polarized wave by properly changing the pattern of a pre-code for each of frames In the following, regarding the third through the eleventh embodiments in accordance with the present invention, descriptions will be given referring to figures. Now, the principle of the present invention will be described with respect to the embodiments.

C. Principle of Present Invention

With respect to methods of generating signal light modulated by multilevel modulation, there is a method in which each of signal light components of an in-phase component and a quadrature-phase component is generated beforehand by use of an amplitude modulator that modulates intensities of in-phase components of optical carrier wave (carrier) and a modulator that modulates intensities of orthogonal components of the carrier. Then, the in-phase components and the orthogonal components of the carrier are synthesized to achieve the multilevel modulation signal light. In some cases, a modulator includes the two modulators described above as an integrated modulator. In other cases, such as four level phase modulation signals or eight level phase modulation signals, as the signals have identical amplitude level, it is possible to generate multilevel modulation signal light by only using a phase modulator. Now, a generation method of multilevel modulation signal light will be described for a case where in-phase components and orthogonal components are modulated.

There is a polarization multiplexing system that transmits two polarized waves and each of which carries individual data. When different transmission data series are carried on the X-polarized wave and the Y-polarized wave respectively, the X-polarized wave and Y-polarized wave are independently modulated by multilevel modulation, and which are synthesized by a polarization multiplexer for generating polarized wave multilevel signal light.

When a known signal is inserted in a transmission data series to estimate wave distortion parameters in a transmission line, the known signal repeatedly uses an identical pattern. For operating polarization states of part of known signal, the principle of which will be described below.

As discussed above, it is assumed that four intensity modulators, which are modulators of modulate X-polarized wave_I-component, X-polarized wave_I-component, Y-polarized wave_I-component, and Y-polarized wave_Q-component, are used as configurations that generate polarized multiplex-multilevel modulation signals. For a modulation method of four level phase shift keying, when a transmission digital data pattern of an X-polarized wave_I-component is "0" and "1," the mapping is made to correspond to "−E" and "+E" having the reverse relationship in the optical carrier electric field. Similarly, when a transmission digital data pattern of an X-polarized wave_Q-component is "0" and "1," the mapping is made to correspond to "−E" and "+E."

Accordingly, when output signal light transmitted from modulators XI and XQ are synthesized together based on the orthogonal phase relation, the state becomes one of four states (+E, +E), (+E, −E), (−E, +E), and (−E, −E) on the phasor diagram of optical electric fields. For the polarization multiplexing, with respect to an X-polarized wave, the state indicates one of four states, (+E, +E), (+E, −E), (−E, +E), and (−E, −E).

Figure 11A:
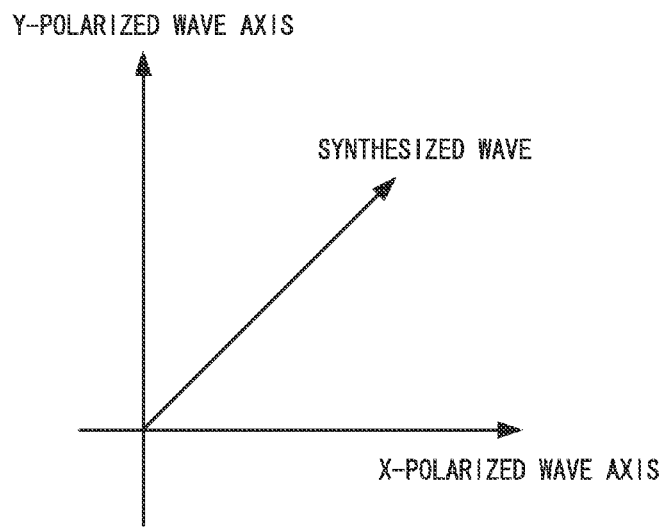
FIG. 11A is a conceptual drawing that illustrates an example of a frequency spectrum of alternating signals used in the present invention.
Figure 11B:
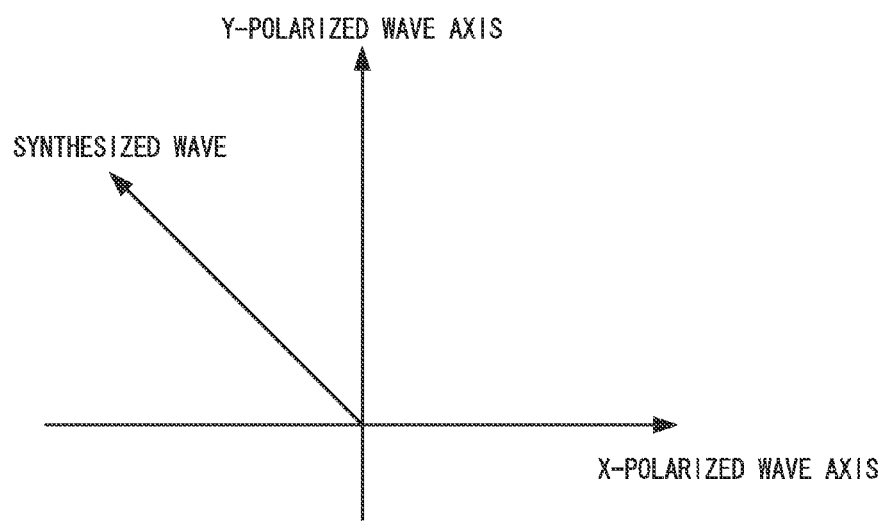
FIG. 11B is a conceptual drawing that illustrates an example of a frequency spectrum of alternating signals used in the present invention.

FIGS. 11A and 11B are conceptual drawings that illustrate an example of frequency spectra of alternate signals. FIG. 11A indicates an in-phase, and FIG. 11B indicates a reverse phase. If X1 corresponds to "1," XQ corresponds to "1," YI corresponds to "1" and YQ corresponds to "1," then the X-polarized wave electric field becomes the state of (+E, +E) and the Y-polarized wave electric filed becomes the state of (+E, +E). Accordingly, with respect to an optical carrier which polarization multiplexing has been performed, the relative phase between a carrier wave phase of an X-polarized wave and a carrier wave phase of a Y-polarized wave is identical, so that the state of a polarized wave shows vibrations along the direction at an angle of +45 degrees from the X-polarized wave axis as shown in FIG. 11A.

On the other hand, when XI is "1,", XQ is "1,"YI is "0," and YQ is "0," the X-polarized wave electric field becomes a state of (+E, +E), and the Y-polarized wave electric field becomes a state of (−E, −E). Thus, the relative phase between the X-polarized wave and the Y-polarized wave becomes a reverse phase, so that the state of a polarized wave shows vibrations along the direction at an angle of −45 degrees as shown in FIG. 11B.

Accordingly, when compared to the case in which XI is "1," XQ is "1," YI is "1," and YQ is "1," the state of the polarized wave rotates 90 degrees. Moreover, when XI is "1," XQ is "1," YI is "1," and YQ is "0," the X-polarized wave electric field becomes a state of (+E, +E), and the Y-polarized wave electric field becomes a state of (+E, −E). In this case, the relative phase relation between the X-polarized wave and the Y-polarized wave shows 90-degree difference, and which results in a circularly polarization state. Namely, the polarization state varies according to transmission data patterns.

D. Third Embodiment

Figure 12:
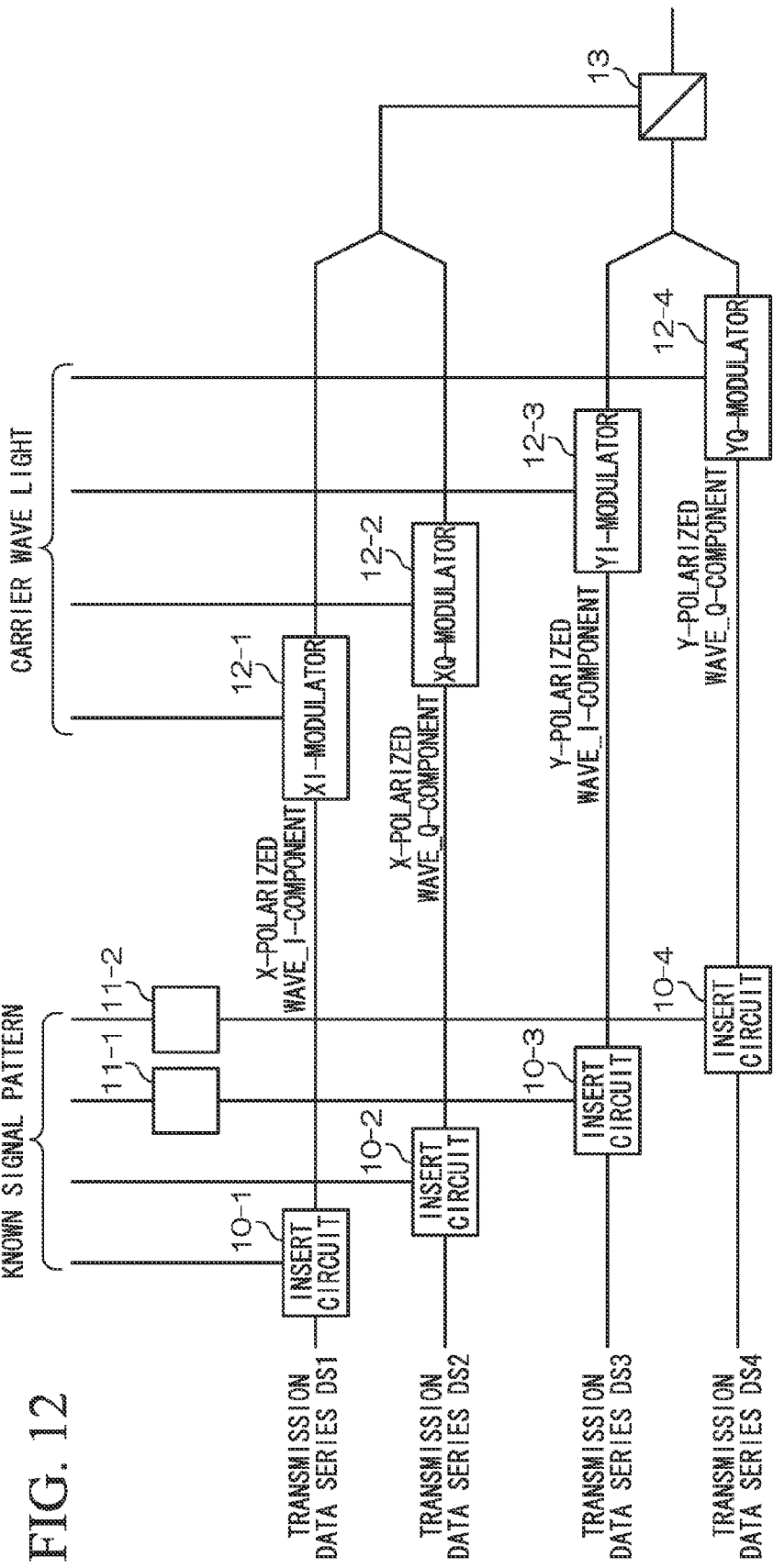
FIG. 12 is a block diagram that illustrates a configuration of a transmitter in accordance with a third embodiment of the present invention.
Figure 13:
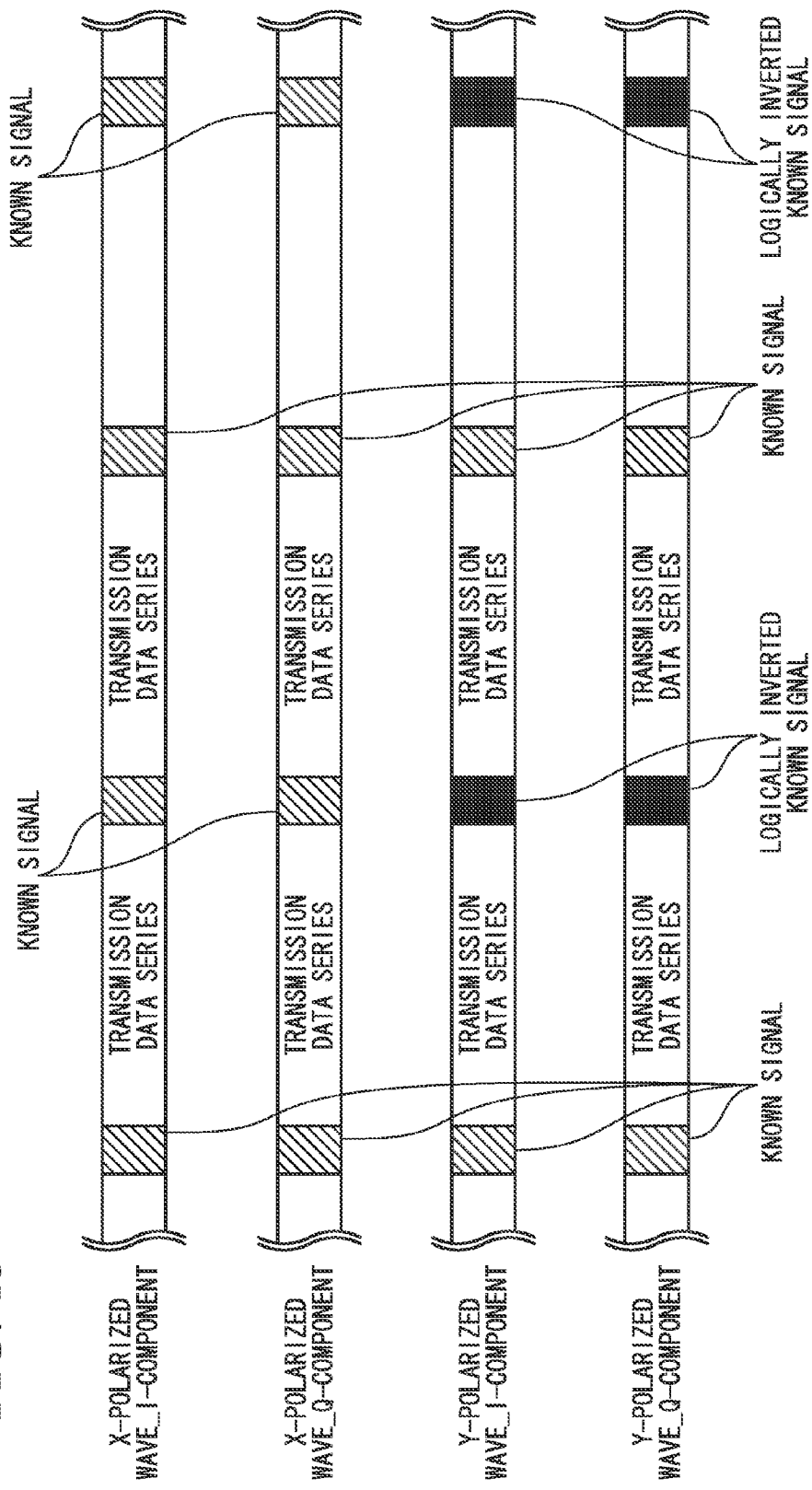
FIG. 13 is a conceptual drawing that illustrates logic inversion operation in accordance with the third embodiment.

FIG. 12 is a block diagram that illustrates configurations of a transmitter apparatus in accordance with the third embodiment. Insert circuits 10-1 through 10-4 are arranged to insert a known signal pattern in the transmission data series DS1 through DS4, in which digital logic inversion circuits 11-1 and 11-2 have been inserted in a predetermined lane of the known signal pattern, and the logic inversion operations are performed by switching ON/OFF according to the transmission cycle of the known signal pattern. Similarly to the know pattern, when transmission of an identical pattern is preformed repeatedly and logic inversion is performed for the Y-polarized wave_I-component and the Y-polarized wave_Q-component by repeating logical inversion operations that reverse "1" to "0" and reverse "0" to "1" to perform ON/OFF in response to the frequency as shown in FIG. 13, the polarization state can be turned by 90 degrees in response to the repeating frequency.

The digital inversion circuits 11-1 and 11-2 may be inserted into any lanes. Further, when ON/OFF of the logical inversion is repeatedly performed for only the Y-polarized wave_Q-component, linear polarization and circular polarization can be alternated according to the frequency. The timing of ON/OFF switching of the digital logic inversion circuits 11-1 and 11-2 can be arbitrary set for the frequency of known pattern transmission. For example, the ON/OFF switching may be performed by every 2 cycles. Moreover, when the ON/OFF timing of the Y-polarized wave_I-component is set by every 2 cycles and the ON/OFF timing of the Y-polarized wave_Q-component is set by one cycle, it becomes possible to switch four states which correspond to linear polarization light with +45 degrees, linear polarization light with −45 degrees, right-handed circular polarization, and left-handed circular polarization.

The XI-modulator 12-1 modulates the X-polarized wave_I-component with carrier wave light. The XQ-modulator 12-2 modulates the X-polarized wave_Q-component with carrier wave light. The YI-modulator 12-3 modulates the Y-polarized wave_I-component with carrier wave light. The YQ-modulator 12-4 modulates the Y-polarized wave_Q-component with carrier wave light. The polarization multiplexer 13 performs multiplexing of modulation waves input from the XI-modulator 12-1, the XQ-modulator 12-2, the YI-modulator 12-3, and the YQ-modulator 12-4.

Further, a regular circular polarization state shown such as in the time period (2) or (4) of FIG. 9 can be provided for arbitrary modulation signals by alternatively exchanging signals given to the digital logic inversion circuit 11-1 and 11-2 at the timing when the digital logic inversion circuit 11-1 or 11-2 turns "ON."

In the above, while the descriptions of an application example have been given for only QPSK modulation method, it can be applied to the binary shift keying (BPSK) method. In the BPSK method, the transmission patterns of an X-polarized wave are mapped by "0" and "1," and the electric fields of carrier light of the X-polarized wave are mapped by "+E" and "−E." Similarly, the transmission patterns of a Y-polarized wave are mapped by "0" and "1," and the electric fields of a light carrier of the Y-polarized wave are mapped by "+E" and "−E." When the X-polarized wave is "1" and the Y-polarized wave is "1," the carrier phase relation between the X-polarized wave and the Y-polarized wave becomes identical phase, so that a linear polarized wave state at +45 degrees is obtained. On the other hand, when the X-polarized wave is "1" and the Y-polarized wave is "0," the carrier phase relation between the X-polarized wave and the Y-polarized wave becomes opposite phase, so that a linear polarized wave state at −45 degrees is obtained. Thus, the polarization state can be controlled by inserting a ON/OFF switchable digital logic inversion circuit into either the X-polarized wave or the Y-polarized wave and performing ON/OFF switching operations in every cycle of transmission of a known signal.

In the above, while it expresses the ON/OFF switching operations, an identical function can be achieved by providing a path that passes through the logic inversion circuit and providing another path that bypasses that path.

At a receiving terminal, in order to compensate the distortion of a wave form due to chromatic dispersion, separate the polarized wave of polarized wave multiple signal light, and perform digital signal processing of polarization mode dispersion compensation, coherent receiving is required, and thus the signal light is divided into an in-phase component and a quadrature-phase component using local light emission and 90-degree hybrid. In this case, the in-phase and the orthogonal phase are defined based on the phase of the local oscillator light.

The light emitted from the 90-degree hybrid is converted to an electrical signal by use of an optical-to-electrical converter. In general, a balanced type photodetector is used as an optical-to-electrical converter, in which unnecessary direct current component included in the signal light output from the 90-degree hybrid can be removed. In some cases, a general photodetector and a direct current remover are used. Thereafter, after the signal is converted to a digital signal through an analogue digital converter (ADC), the converted signal is input to a digital signal processing circuit.

In the digital signal processing circuit, a channel estimation circuit, which estimates the chromatic dispersion of a transmission line by use of a known signal, is provided. For instance, a known signal, which estimates the chromatic dispersion of a transmission line, can includes a specific symbol pattern whose most signal components are in two or more specific frequency bands. For such specific symbol pattern, there is a method that employs an alternating signal whose phase turns over for every symbol. The alternating signal includes two line spectra on a frequency spectrum, and the dispersion estimation is performed by use of received time difference information generated between the two components of the line spectra. This applies a phenomenon, which the chromatic dispersion has a feature that varies group velocity according to frequency and results in that arrival time of the components at the receiver terminal becomes different for frequency components.

E. Fourth Embodiment

Figure 14:
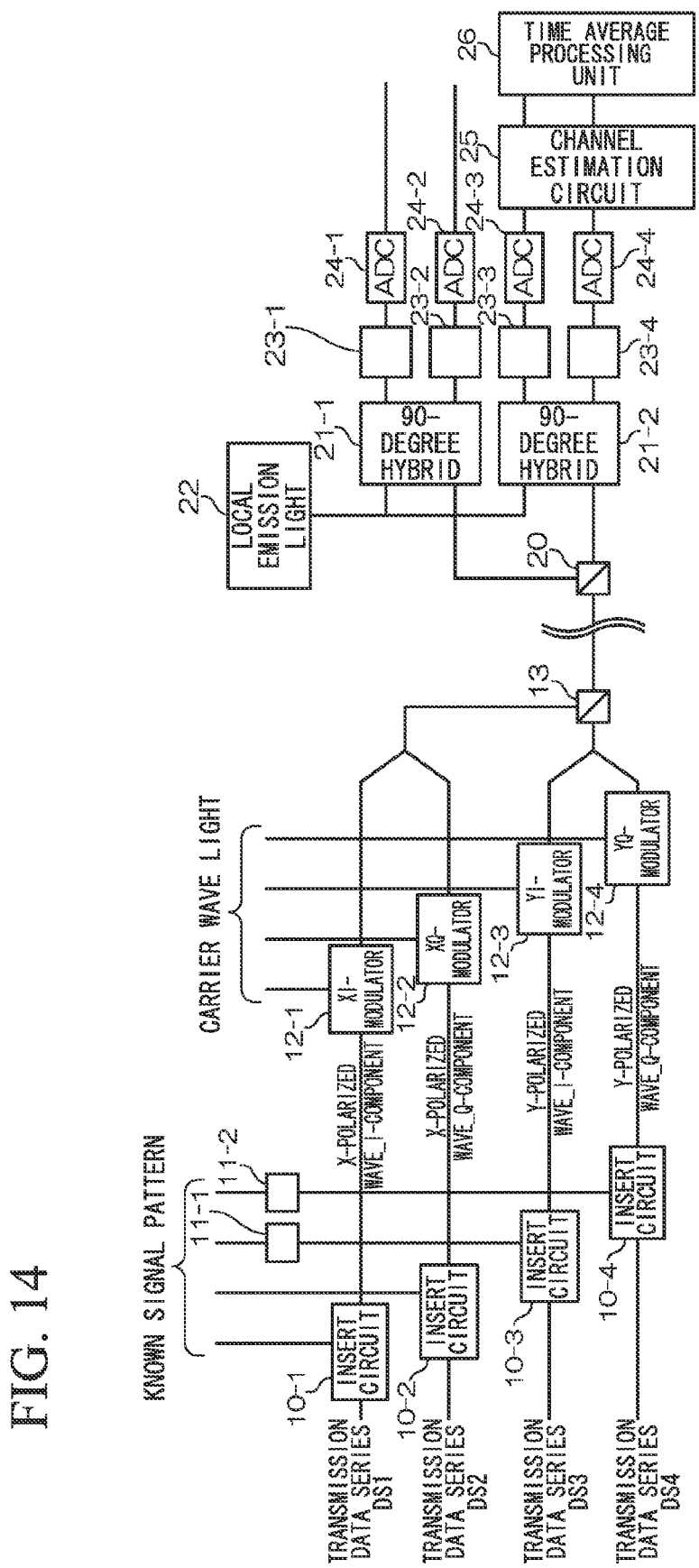
FIG. 14 is a block diagram that illustrates a configuration of a transmitter/receiver apparatus in accordance with a fourth embodiment of the present invention.

FIG. 14 is a block diagram that illustrates configuration of a transmitter/receiver apparatus in accordance with the present fourth embodiment. The parts corresponding to those in FIG. 12 are provided with the identical symbols. In FIG. 14, a polarization beam splitter 20 divides an X-polarized wave and a Y-polarized wave, and a 90-degree hybrids 21-1 and 21-2 divides signal light into an in-phase component and a quadrature-phase component based on local oscillator light. Optical-to-electrical converters 23-1 through 23-4 convert the divided signal light to electrical signals. ADC24-1 through 24-4 convert the electrical signals into digital signals. A channel estimation circuit 25 performs dispersion estimation by use of arrival time difference information caused between two components of an alternating signal having two line spectra on a frequency spectrum. A time average processing unit 26 performs a time averaging process for an output value from the channel estimation circuit 25.

At the receiver terminal, polarization diversity configuration is employed, and the receiver terminal receives an X-polarized wave_I-component, an Z-polarized wave_Q-component, a Y-polarized wave_I-component, and a Y-polarized wave_Q-component, separately. Even in such a case, in order to reduce the circuit scale of the channel estimation circuit 25, only one of polarized components is used to perform the dispersion estimation. In such a case, depending upon the state of a polarized wave of a given signal input to the polarization beam splitter 20 at the receiver terminal, the most power of the known signal flows through the 90-degree hybrid 21-1 located at upper part while only small amount of power is provided through the 90-degree hybrid 21-2 located at lower part. In this case, as the known signal is buried in noise components, the accuracy of the dispersion estimation value is degraded.

Even in such a case, when the configuration is arranged so that the polarization state of a transmitted known signal is alternately switched at the cycle of transmission of the known signal as described above, the polarization state changes with the arrival cycle of the known signal and the most part of the known signal flows through both the 90-degree hybrid 21-1 located upper part and the 90-degree hybrid 21-2 located at lower part, and the accuracy of dispersion estimation can be improved by performing the time average processing.

Furthermore, instead of using the time average processing based on the time average processing unit 26, there is another method that selects an estimation value of timing when high power is provided using the amount of the power of the known signal to be input by providing an estimation value selection circuit without using the time average processing, so that the dispersion estimation can be achieved.

F. Fifth Embodiment

Figure 15:
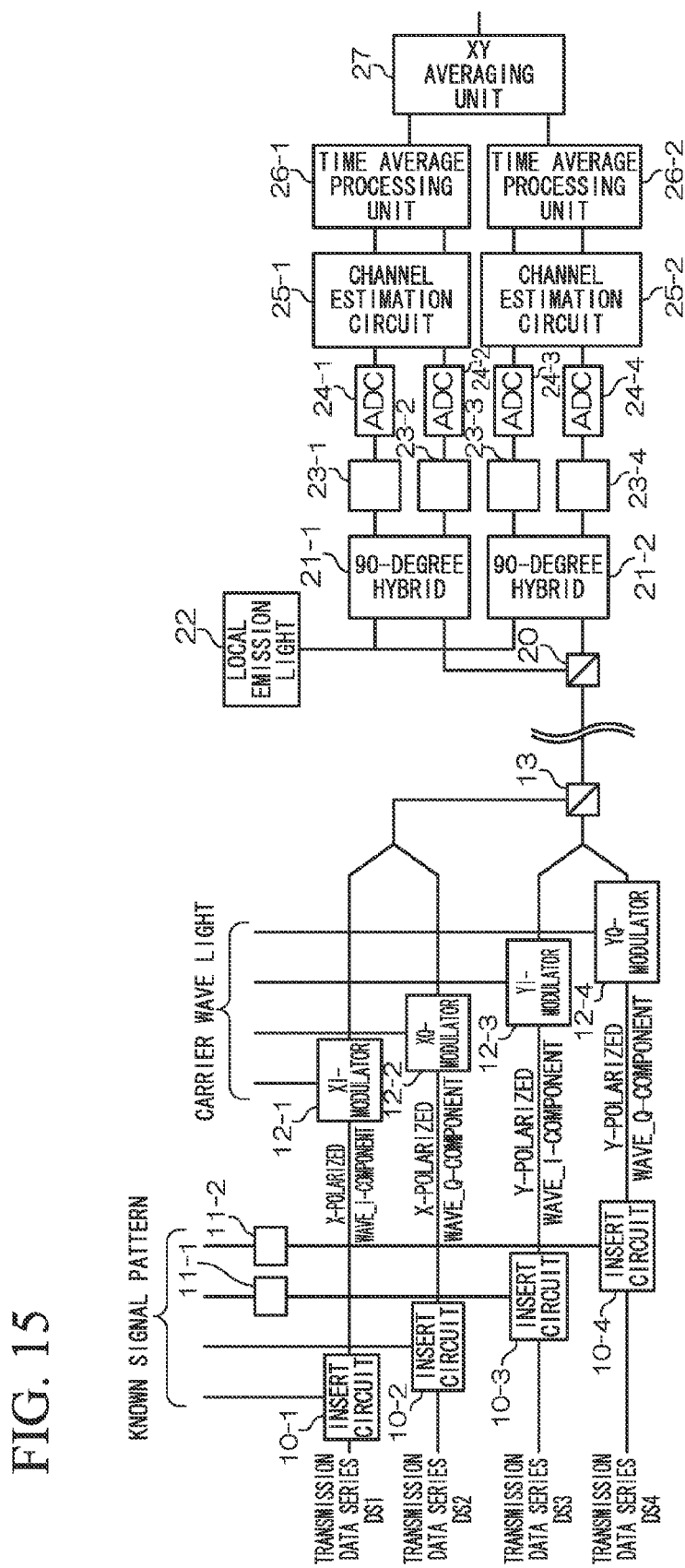
FIG. 15 is a block diagram that illustrates a configuration of a transmitter/receiver apparatus in accordance with a fifth embodiment of the present invention.

FIG. 15 is a block diagram that illustrates the configuration of a transmitter/receiver apparatus in accordance with a fifth embodiment of the present invention. In the figure, the corresponding parts identical to those in FIG. 14 are provided with the identical symbols and their explanations will be omitted. In the fifth embodiment, polarization diversity reception is performed, and then a channel estimation circuits 25-1 and 25-2, and time average processing units 26-1 and 26-2 are provided for respective polarized components as shown in FIG. 15. In this case, although the input power which is input to a 90-degree hybrid 21-1 at upper part and a 90-degree hybrid 21-2 is fluctuated according to the polarization state of a known signal, usually, the estimation accuracy is not remarkably degraded because a large amount of power is provided for either one of two.

In case where there is polarized wave dependence loss (PDL) in a transmission line, the power of a known signal can be decreased under condition where the polarization state of the known signal corresponds to a PDL polarized wave axis of the transmission line. Further, in some cases, wave form degradation such as chromatic dispersion caused at the transmission line may depend on the polarized wave state. In this case, the estimation value of a known signal changes depending on the polarized wave of the known signal. Accordingly, at the receiver terminal, even if the diversity reception is performed for both polarized waves and the channel estimation is performed by the diversity estimation based on both polarized waves, the accuracy of the channel estimation is degraded by the polarized wave dependence of the transmission line PDL and the wave form degradation as long as the polarized wave state of a known signal to be transmitted is constant.

Even in such circumstances, in accordance with the present invention, the estimation accuracy can be improved by periodically changing the polarized wave state of a known signal to be transmitted. In this case, the estimation values of chromatic dispersion vary in response to the timing of known signal arrival at the receiver terminal. Time average processing units 26-1 and 26-2 perform time averaging processes for the estimation values of chromatic dispersion, and thus the estimation accuracy can be finally improved. An XY averaging unit 27 averages the outputs of the time average processing units 26-1 and 26-2 and transmits the averaged result.

There is another method that selects the estimation value of timing when a large amount of power is supplied, based on the amount of the power of a known signal to be input without using the time average processing. In this case, that method can be performed by providing an estimation selection circuit instead of the time average processing.

G. Sixth Embodiment

Figure 16:
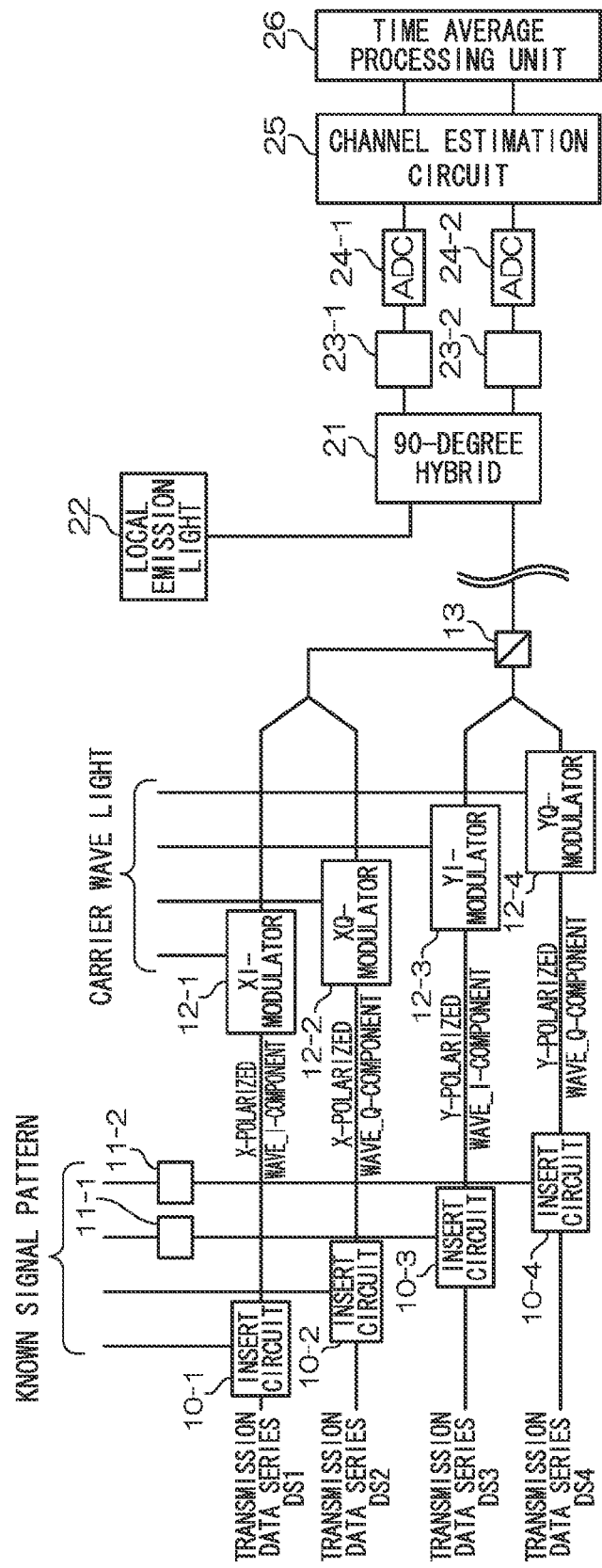
FIG. 16 is a block diagram that illustrates a configuration of a transmitter/receiver apparatus in accordance with a sixth embodiment of the present invention.

FIG. 16 is a block diagram that illustrates the configuration of a transmitter/receiver apparatus in accordance with a sixth embodiment of the present invention. In the descriptions, the corresponding parts identical to those of FIG. 15 are provided with the identical symbols and their explanations will be omitted. In the sixth embodiment, as shown in FIG. 16, the transmission line state is estimated only based on one of polarized components without using the polarization beam splitter 20 at the receiver terminal. In this case, depending upon the polarized wave state of a known signal, the power of the known signal used for channel estimation can be reduced, and thus the estimation accuracy is remarkably reduced. However, by utilizing a mechanism that switches the polarized wave state at a transmission terminal and by performing time average processing for an estimated value with the time average processing unit 26 at the receiver terminal, it is possible to improve the estimation accuracy.

In a case where a constant of an adaptive equalizer filter is estimated by use of a known pattern, and when the value of the pattern is used, it is required that the digital logic inversion performed at the transmission terminal is recovered into initial condition or the pattern value is used taking into consideration of the inversion condition.

H. Seventh Embodiment

Figure 17:
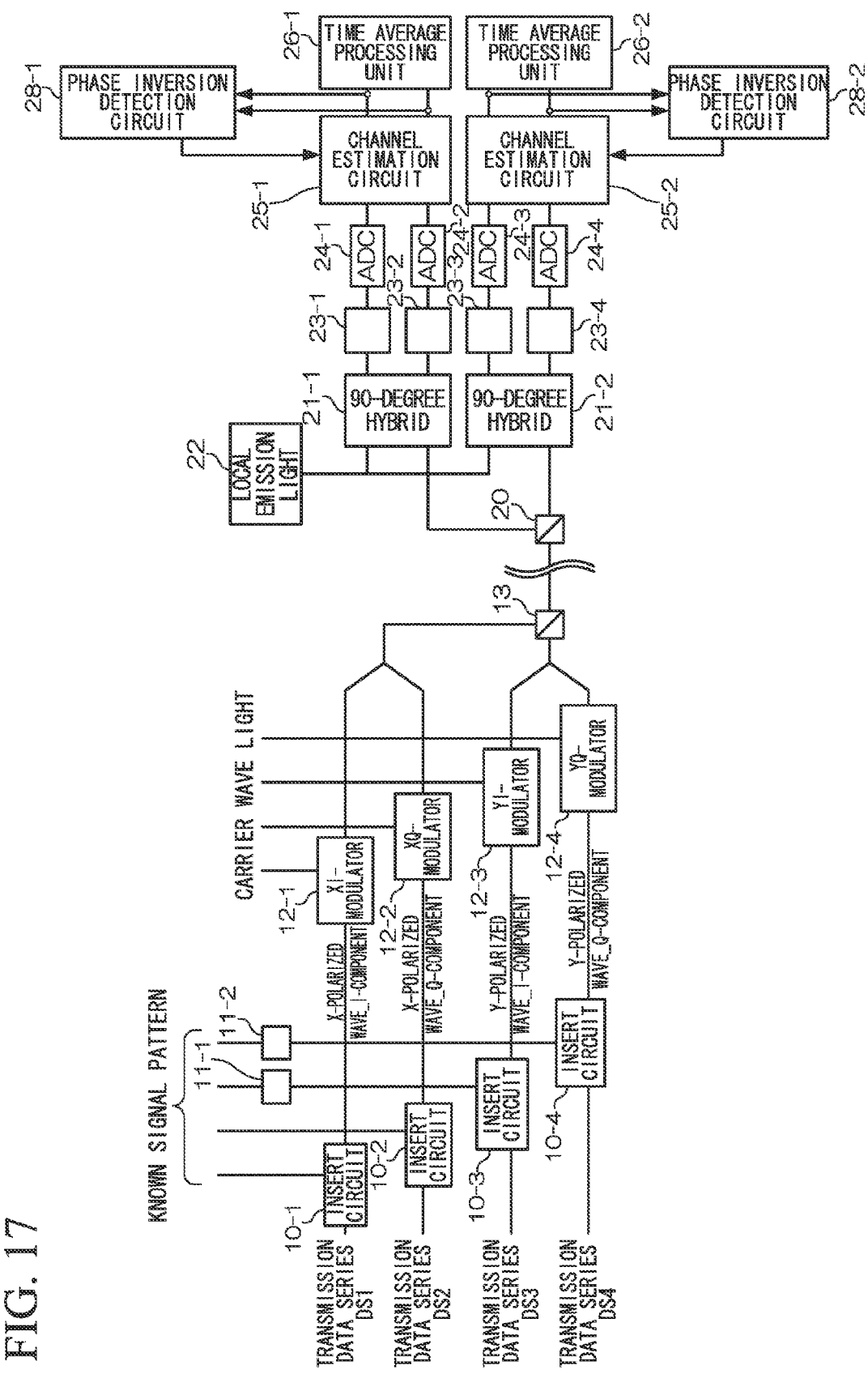
FIG. 17 is a block diagram that illustrates a configuration of a transmitter/receiver apparatus in accordance with a seventh embodiment of the present invention.

FIG. 17 is a block diagram that illustrate another configuration of a transmitter/receiver apparatus in accordance with a seventh embodiment of the present invention. Here, the corresponding parts identical to those of FIG. 15 are provided with the identical symbols and their explanation will be omitted. In the seventh embodiment, there are phase inversion detection circuits 28-1 and 28-2 which are provided after the channel estimation circuits 25-1 and 25-2 to detect timing when logic inversion is performed, as shown in FIG. 17. The phase inversion detection circuits 28-1 and 28-2 detect timing when the reverse operation is performed for a known signal and give the reverse timing information to the channel estimation circuits 25-1 and 25-2 that actually use the known signal.

To detect timing of logic inversion, a known signal that corresponds to a signal detected when logic inversion does not take place is prepared as an expected value. When the timing of arrival of the expected value is detected, logic inversion timing can be recognized. When the expected value and an arrival pattern are compared, XOR (exclusive OR) operation is performed for respective symbols of a known pattern and an arrival pattern with respect to the series symbols of known pattern symbol number used for detection. If the all operation results become zero, or mostly zero, then the timing can be recognized as the arrival timing of a known symbol pattern which logic inversion is not performed. In contrast, if the known symbol pattern is not logic inversion, the operation results become "1" for all symbols, and thus the timing can be recognized as timing of arrival of a reversed known pattern.

For making certain achievement, both a known signal with no logic reverse and a known signal with logic inversion may be prepared as expected values, and thereby timing and cycles of each of the signals can be detected.

At the channel estimation circuits 25-1 and 25-2, operations corresponding to logic inversion are performed for part of arrived known signal pattern. The arrival pattern is digital signals, but in some times, the digital signals are multiple value digital signals using multiple bit widths. In this case, operations corresponding to logical inversion may be performed for the arrival patterns by inverting the symbols.

For known signal patterns stored as reference signals of arrival known signals, operations similar to the logic inversion operated at the transmission side may be performed for the known signal patterns of reference in response to the reverse timing information provided from the phase inversion detection units 28-1 and 28-2. Namely, it is a method that employs a known pattern predicted to perform logical operations at the transmission side with respect to arrival known patterns.

In accordance with the third through seventh embodiments, the polarization state of a transmission signal can be modified at high speed by digital signals without using optical parts such as a polarization controller or the like. Thereby, there is no need to separately receive transmission signals by two orthogonal polarized wave planes, and therefore the power consumption of a receiver can be reduced.

Further, when the third through seventh embodiments are applied to a system that separately receives transmission signals by two orthogonal polarized wave planes, there is an advantage that improves diversity effect compared to general systems, while there is no power consumption reduction effect.

I. Eighth Embodiment

Next, a transmission frame in accordance with an eighth embodiment of the present invention is described.

Figure 18:
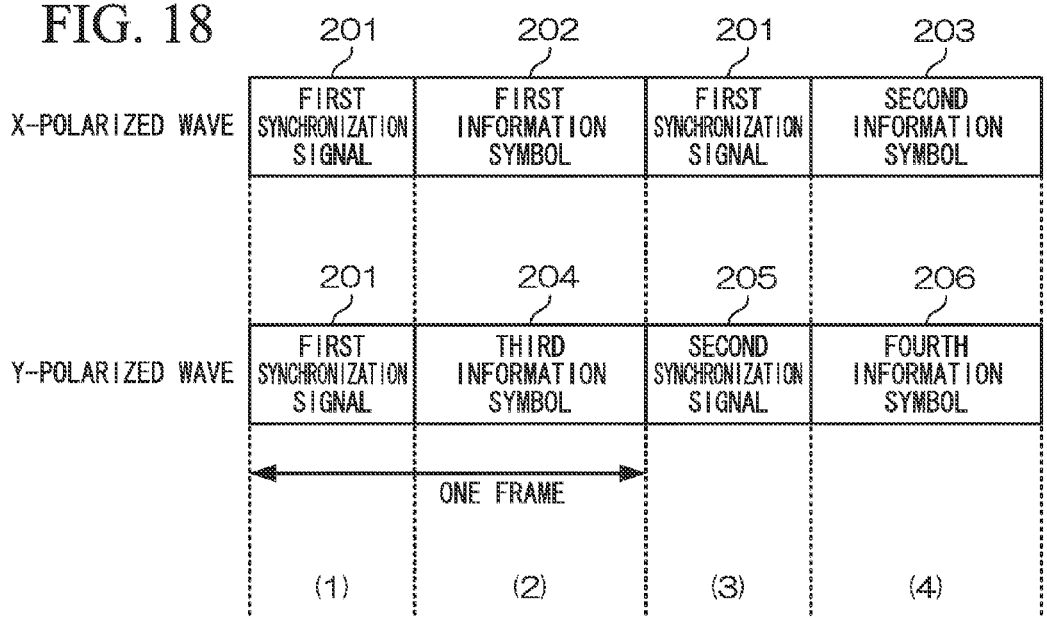
FIG. 18 is a conceptual drawing that illustrates a configuration of a transmission frame in accordance with an eighth embodiment of the present invention.

FIG. 18 is a conceptual drawing that illustrate transmission frame configuration in accordance with the eighth embodiment. In FIG. 18, a label 201 is a first synchronization signal, a label 202 is a first information symbol, a label 203 is a second information symbol, a label 204 is a third information symbol, a label 205 is a second synchronization signal, a label 206 is a fourth information symbol. Synchronization signals and information symbols are expressed by complex numbers. The second synchronization signal 205 is a signal obtained by performing logic inversion for the first synchronization signal 201.

Figure 19:
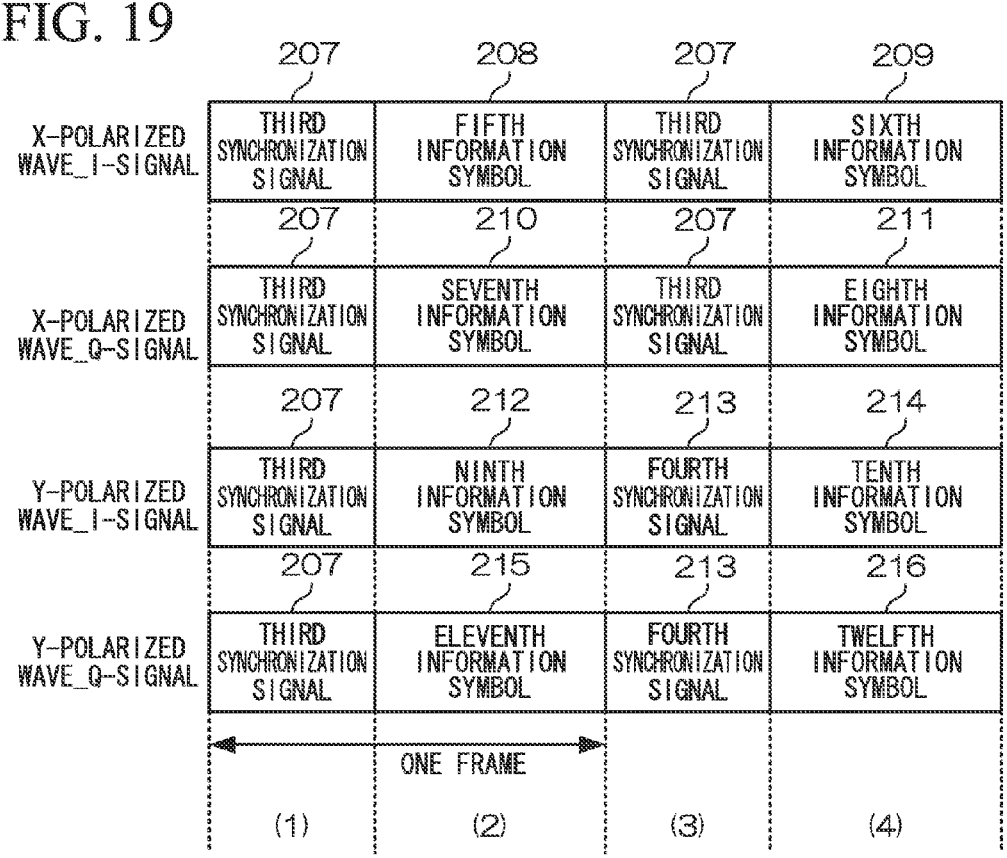
FIG. 19 is a conceptual drawing that illustrates a configuration in which a signal expressed by a complex number is separated into I and Q to express it by a real number, as a detailed example configuration of the transmission frame in accordance with the eighth embodiment.

FIG. 19 is a conceptual drawing as an example of a detailed configuration of a transmission frame in accordance with the eighth embodiment, in which a signal expressed by a complex number is divided into signals I and Q and expressed by real numbers. In FIG. 19, a label 207 is a third synchronization signal, a label 208 is a fifth information symbol, a label 209 is a sixth information symbol, a label 210 is a seventh information symbol, a label 211 is an eighth information symbol, a label 212 is a ninth information symbol, a label 213 is a fourth synchronization signal, a label 214 is a tenth information symbol, a label 215 is an eleventh information symbol, and a label 216 is a twelfth information symbol. The fourth synchronization signal 213 is a signal that is logic inversion of the third synchronization signal 207.

The operations by use of the transmission frame will be explained by referring to FIGS. 20-20F, and FIGS. 21A-21F. In a time period (1) in FIG. 19, when the third synchronization signal 207 of an X-polarized wave_I-signal is "1" and the third synchronization signal 207 of an X-polarized wave_Q-signal is "1," then a signal obtained by adding those complex number becomes "1+j." Further, when the third synchronization signal 207 of an X-polarized wave_I-signal is "−1" and the third synchronization signal 207 of an X-polarized wave_Q-signal is "−1," then a signal obtained by adding those complex number becomes "−1−j." A state where those values are alternately taken is indicated on an IQ plane and shown in FIG. 20A. In the figure, the state turns from the open circle to the solid circle as a function of time.

Figure 20A:
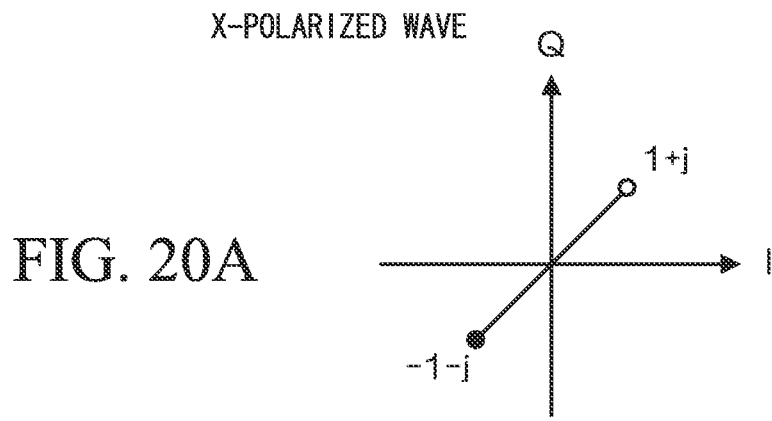
FIG. 20A is a conceptual drawing that illustrates operations when the transmission frame in accordance with the eighth embodiment is used.
Figure 20B:
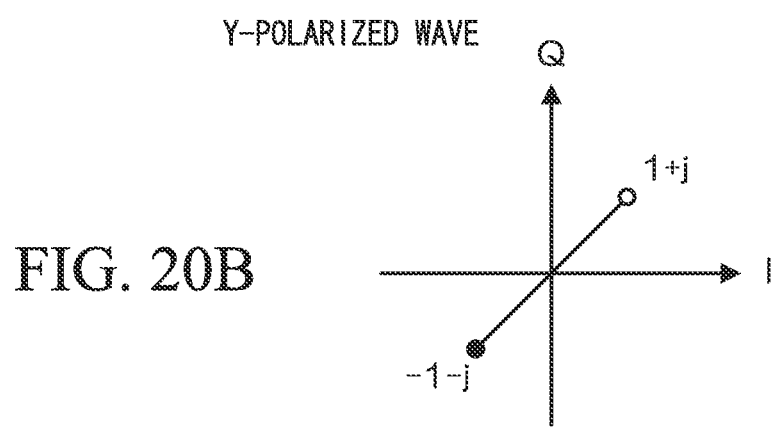
FIG. 20B is a conceptual drawing that illustrates operations when the transmission frame in accordance with the eighth embodiment is used.

Similarly, in the time period (1), when the third synchronization signal of a Y-polarized wave_I-signal 207 is "1" and the third synchronization signal of a Y-polarized wave_Q-signal is "1," then a signal of addition of those complex number becomes "1+j." When the third synchronization signal 207 of a Y-polarized wave_I-signal is "1" and the third synchronization signal 207 of a Y-polarized wave_Q-signal is "−1," then a signal obtained by adding those complex numbers becomes "−1−j." A state where those values are alternately taken is indicated on an IQ plane and shown in FIG. 20B. In the figure, the state turns from the open circle to the solid circle with time.

Time dependent wave forms of a modulated signal, which is modulated based on the PSK modulation method by use of a base band signal varying similarly to those as described above, is shown in FIGS. 20C and 20D. Both of the X-polarized wave and the Y-polarized wave have 45-degree phase difference from a carrier wave when the base band signal is in duration of "1+j," and both of the X-polarized wave and the Y-polarized wave have 45-degree plus 180-degree phase difference from the carrier wave when the base band signal is in duration of "−1−j."

Figure 20C:
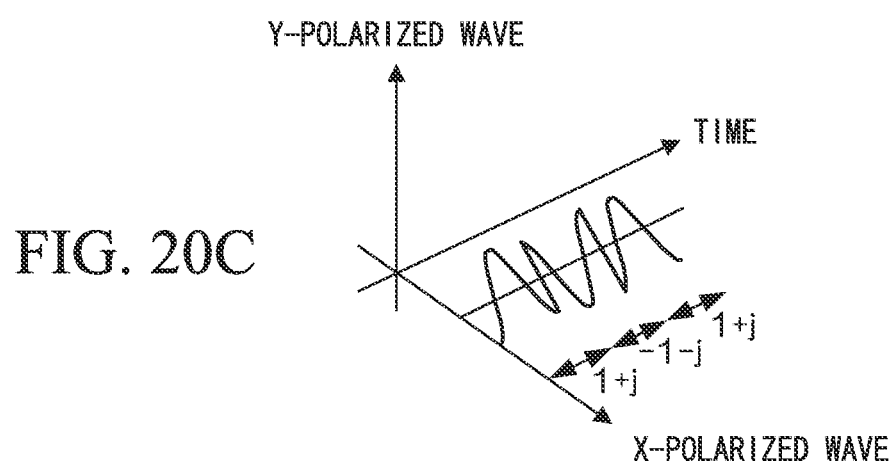
FIG. 20C is a conceptual drawing that illustrates operations when the transmission frame in accordance with the eighth embodiment is used.
Figure 20D:
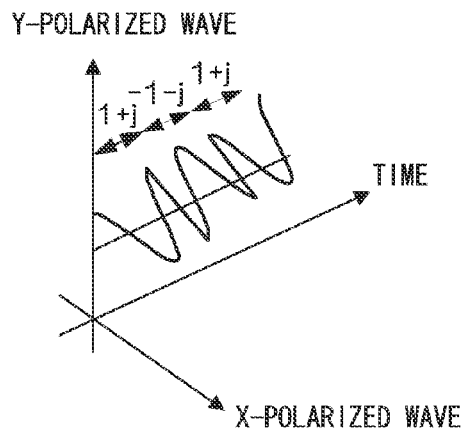
FIG. 20D is a conceptual drawing that illustrates operations when the transmission frame in accordance with the eighth embodiment is used.
Figure 20E:
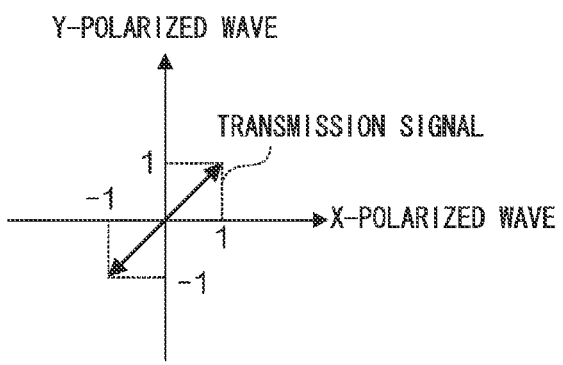
FIG. 20E is a conceptual drawing that illustrates operations when the transmission frame in accordance with the eighth embodiment is used.

In FIGS. 20C and 20D, when a modulated signal on the X-polarized wave plane has an amplitude of "1," the amplitude of a modulated signal on the Y-polarized wave plane becomes "1." When a modulated signal on the X-polarized wave plane has an amplitude "−1," the amplitude of a modulated signal on the Y-polarized wave plane becomes "−1." When the modulated signals on the two polarized wave planes are synthesized as a vector, the synthesized vector can be expressed as shown in FIG. 20E. Namely, the vector is positioned between the X-polarized wave plane and the Y-polarized wave plane, and varies on a polarized wave plane that forms 45-degree angle to the X-polarized wave plane.

Figure 20F:
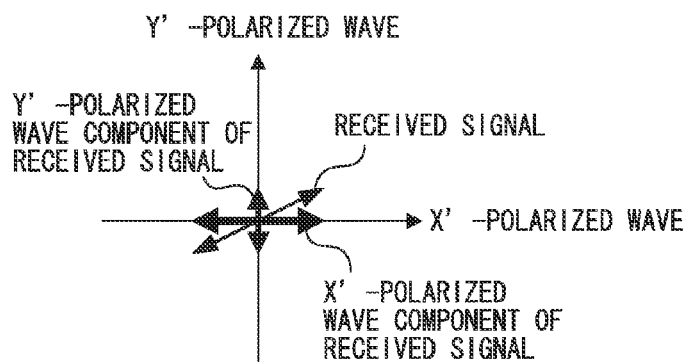
FIG. 20F is a conceptual drawing that illustrates operations when the transmission frame in accordance with the eighth embodiment is used.

A state when a signal is received is shown in FIG. 20F. When a polarized wave plane receiving a signal at a receiver is named as an X'-polarized wave, and a polarized wave plane orthogonal to the X'-polarized wave is named as a Y'-polarized wave, the angles formed between these polarized wave planes and the reception signal are generally different from angles formed between a transmission signal and the transmitter's X-polarized wave and the Y-polarized wave. As a result, the amplitude of a signal on the X'-polarized wave plane and the amplitude of a signal on the Y'-polarized wave plane become different.

Figure 21A:
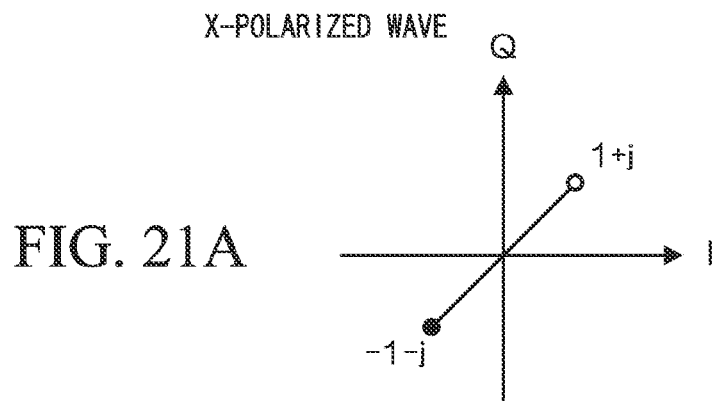
FIG. 21A is a conceptual drawing that illustrates operations when the transmission frame in accordance with the eighth embodiment is used.

Next, in a time period (3) in FIG. 19, when the third synchronization signal 207 of an X-polarized wave_I-signal is "1" and the third synchronization signal 207 of an X-polarized wave_Q-signal is "1," a signal of addition of those complex number becomes "1+j." Further, when the third synchronization signal 207 of an X-polarized wave_I-signal is "−1" and the third synchronization signal 207 of an X-polarized wave_Q-signal is "−1," a signal of addition of those complex number becomes "−1−j." A state where those values are alternately taken is drawn on an IQ plane, and the state is shown in FIG. 21A. In the figure, the state turns from the open circle to the solid circle with time.

Figure 21B:
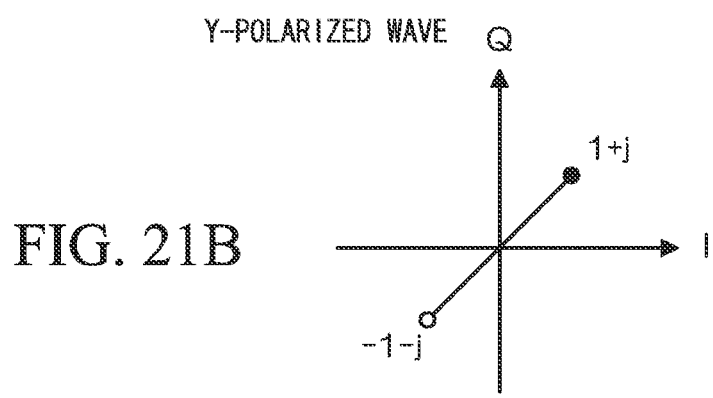
FIG. 21B is a conceptual drawing that illustrates operations when the transmission frame in accordance with the eighth embodiment is used.

The fourth synchronization signal 213 is a signal obtained by performing logical inversion for the third synchronization signal 207. When the fourth synchronization signal 213 of an Y-polarized wave_I-signal is "−1" and the fourth synchronization signal 213 of an Y-polarized wave_Q-signal is "−1," a signal of addition of those complex number becomes "−1−j." When the fourth synchronization signal 213 of a Y-polarized wave_I-signal is "1" and the fourth synchronization signal 213 of an Y-polarized wave_Q-signal is "1," a signal of addition of those complex number becomes "1+j." A state where those values are alternately taken is drawn on an IQ plane, and the state is shown in FIG. 21B. In the figure, the state turns from the open circle to the solid circle with time.

Time dependent wave forms of a modulated signal, which is modulated based on the PSK modulation method by use of a base band signal varying similarly to those as described above, is shown in FIGS. 21C and 21D. Both of the X-polarized wave and the Y-polarized wave have 45-degree phase difference from a carrier wave when the base band signal is in duration of "1+j," and both of the X-polarized wave and the Y-polarized wave have 45-degree plus 180-degree phase difference from the carrier wave when the base band signal is in duration of "−1−j."

Figure 21C:
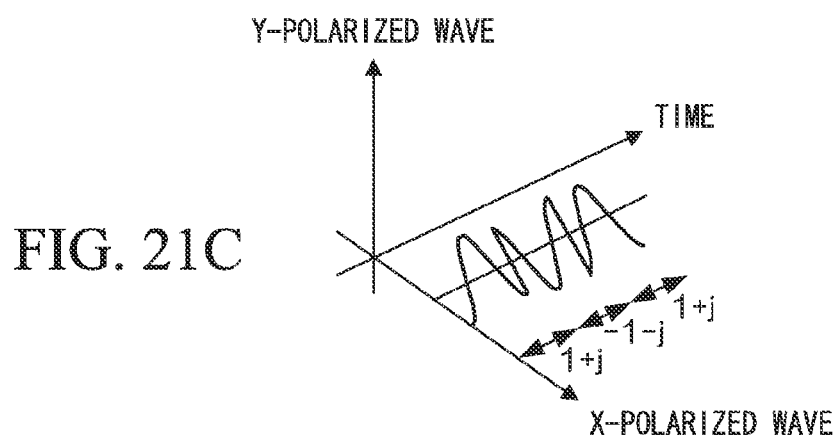
FIG. 21C is a conceptual drawing that illustrates operations when the transmission frame in accordance with the eighth embodiment is used.
Figure 21D:
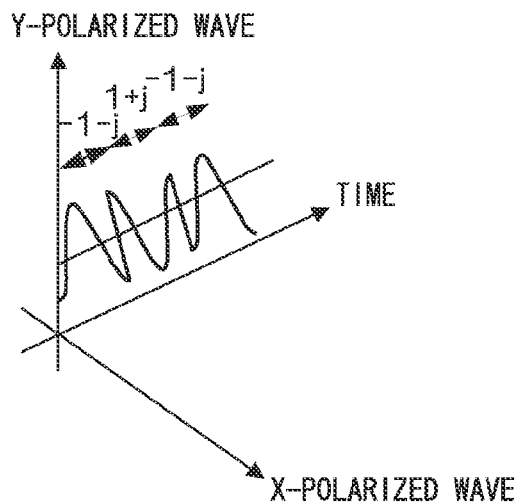
FIG. 21D is a conceptual drawing that illustrates operations when the transmission frame in accordance with the eighth embodiment is used.
Figure 21E:
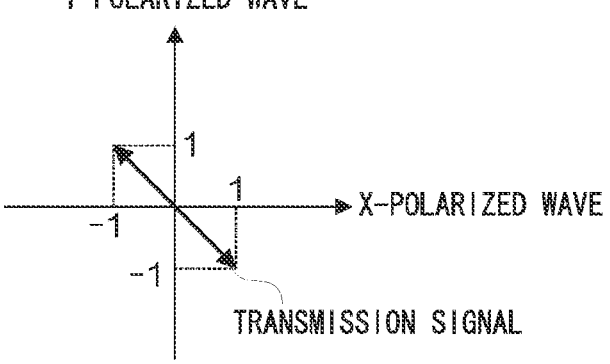
FIG. 21E is a conceptual drawing that illustrates operations when the transmission frame in accordance with the eighth embodiment is used.

In FIGS. 21C and 21D, when a modulated signal on the X-polarized wave plane has an amplitude "1," the amplitude of a modulated signal on the Y-polarized wave plane becomes "−1." When a modulated signal on the X-polarized wave plane has an amplitude "−1," the amplitude of a modulated signal on the Y-polarized wave plane becomes "1." When the modulated signals on the two polarized wave planes are synthesized as a vector, the synthesized vector can be expressed as shown in FIG. 21E. Namely, the synthesized vector is orthogonal to the polarized wave plane shown in FIG. 20E, and varies with time on the polarized plane having 90-degree angle. This modification of the polarization state is performed by only digital signals without using optical parts such as a polarization controller or the like.

Figure 21F:
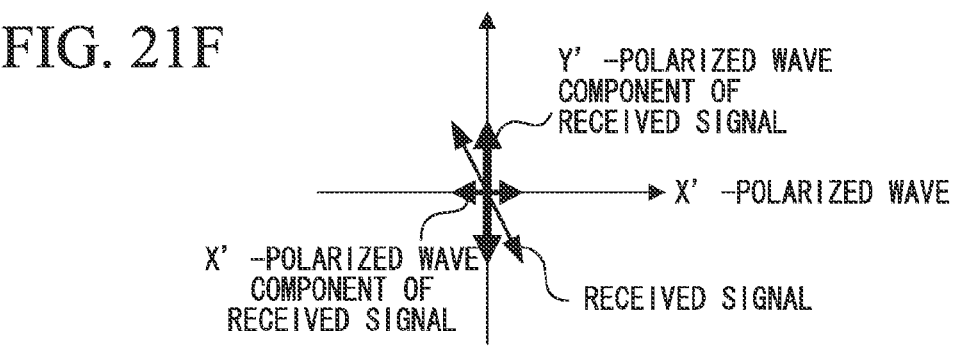
FIG. 21F is a conceptual drawing that illustrates operations when the transmission frame in accordance with the eighth embodiment is used.

A state when the signal is received is shown in FIG. 21F. A large and small relationship between the amplitudes of a signal on the X' polarized wave plane and a signal on the Y' polarized wave plane becomes opposite to the case of FIG. 20F. Thus, with respect to the signal of FIG. 20F and the signal of FIG. 21F, by receiving only the polarized wave signal X' in separate time and by combining them, polarization diversity effect, which is equal to that obtained in the case where usual polarized signal X' and usual polarized signal Y' are separately received in the same time, can be obtained.

The polarization diversity when usual frame configuration is used is obtained by combining the polarized wave signal X' and the polarized wave signal Y' in FIG. 20F. Also, the polarization diversity when the frame configuration in accordance with the eighth embodiment is obtained by combining the polarized wave signal X' of FIG. 20F and the polarized wave signal X' of FIG. 21F. As a combining method, there are a selection combining method and a maximal ratio combining method. The selection combining method selects a signal that has higher reception level. The maximal ratio combining method estimates a transmission line characteristic, adjusts the phase and amplitude of reception signals according to the transmission line characteristic and then combines the signals.

Accordingly, when the frame configuration in accordance with the eighth embodiment is employed, there is no need to operate a circuit that receives the polarized wave signal Y', and therefore the power consumption of the receiver can be reduced.

Further, in the description above, although the polarization state is turned by 90 degrees every time for each frame, the cycle that varies the polarization state may be set to two frames or more.

J. Ninth Embodiment

Descriptions will be given for a transmission frame in accordance with a ninth embodiment of the present invention.

Figure 22:
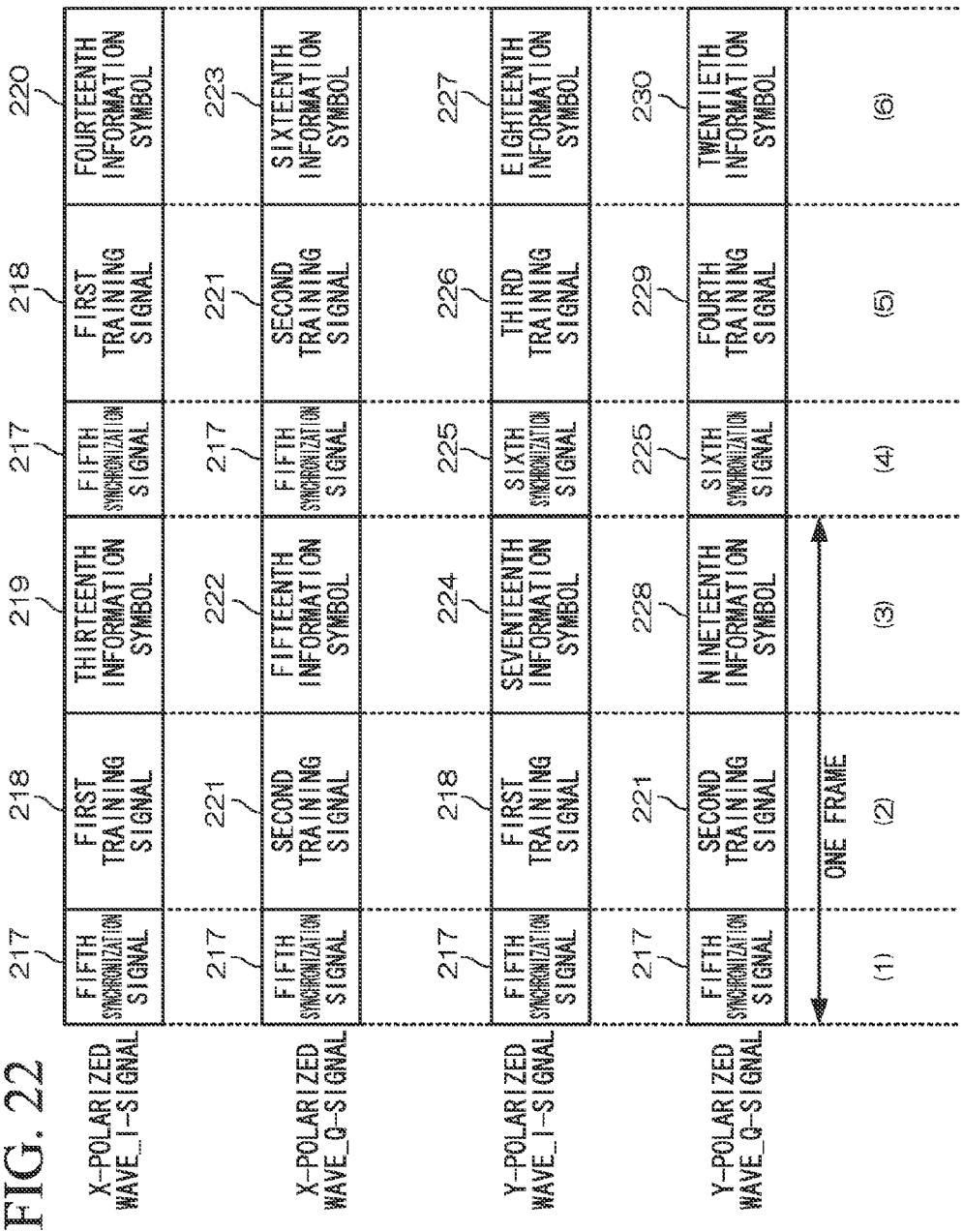
FIG. 22 is a drawing that illustrates configuration of a transmission frame in accordance with a ninth embodiment of the present invention.

FIG. 22 is a drawing that illustrates a transmission frame in accordance with a ninth embodiment of the present invention. In FIG. 22, a label 217 is a fifth synchronization signal, a label 218 is a first training signal, a label 219 is a thirteenth information symbol, a label 220 is a fourteenth information symbol, a label 221 is a second training signal, a label 222 is a fifteenth information symbol, a label 223 is a sixteenth information symbol, a label 224 is a seventeenth information symbol, a label 225 is a sixth synchronization signal, a label 226 is a third training signal, a label 227 is an eighteenth information symbol, a label 228 is a nineteenth information symbol, a label 229 is a fourth training signal, and a label 230 is a twentieth information symbol.

The sixth synchronization signal 225 is obtained by performing logical inversion for the fifth synchronization signal 217. The third training signal 226 is obtained by performing logical inversion for the first training signal 218. The fourth training signal 229 is obtained by performing logical inversion for the second training signal 221. Namely, in time periods (1) and (2) each of which is part of one frame, a signal of Y-polarized wave is identical to a signal of X-polarized wave. In time periods (4) and (5), a signal of Y-polarized wave is obtained by performing logical inversion for a signal of X-polarized wave.

The operations when these frames are used will be explained by referring to FIGS. 23A through 23D and FIGS. 24A through 24D. The synchronization signals are identical to those in FIG. 19. To make the training signals take four signal points on an I-Q plane, a signal I and a signal Q are arranged to be different series.

Figure 23A:
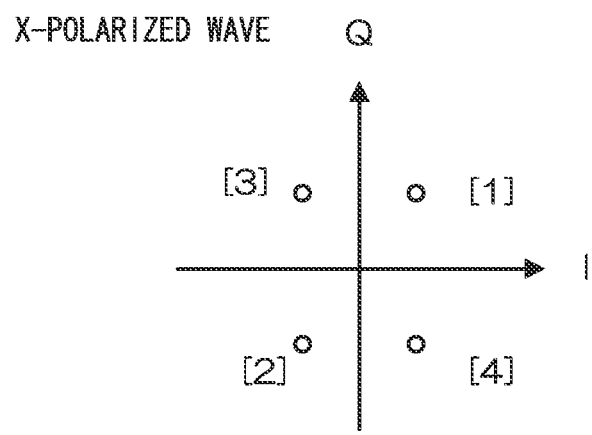
FIG. 23A is a conceptual drawing that illustrates operations when the transmission frame in accordance with the ninth embodiment is used.
Figure 23B:
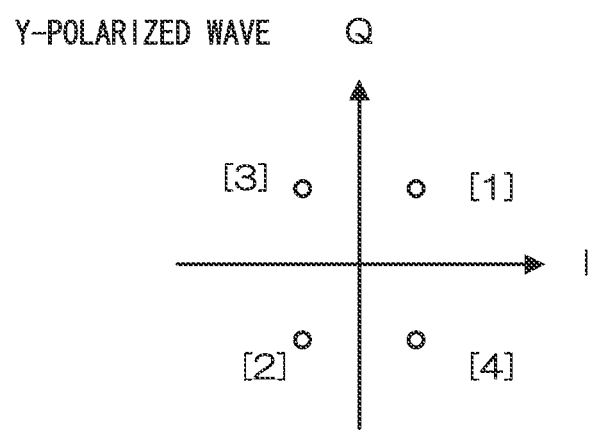
FIG. 23B is a conceptual drawing that illustrates operations when the transmission frame in accordance with the ninth embodiment is used.

In a time period (2) of FIG. 22, an X-polarized wave_I-signal is identical to a Y-polarized wave_I-signal, and an X-polarized wave_Q-signal is identical to a Y-polarized wave_Q-signal. Thus, the positions of signal points on the I-Q plane of the X-polarized wave shown in FIG. 23A are identical to the positions of signal points on the I-Q plane of the Y-polarized wave shown in FIG. 2BA.

Figure 23C:
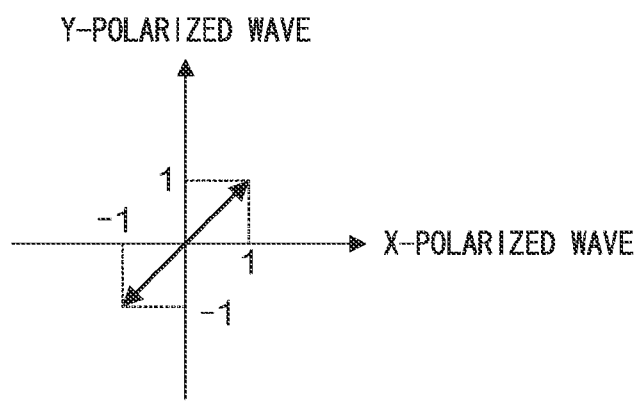
FIG. 23C is a conceptual drawing that illustrates operations when the transmission frame in accordance with the ninth embodiment is used.
Figure 23D:
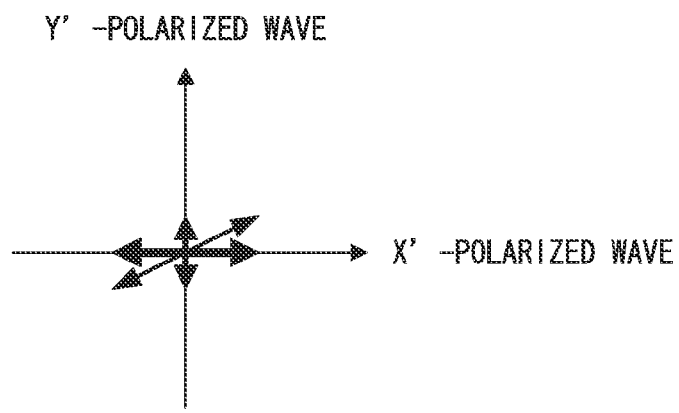
FIG. 23D is a conceptual drawing that illustrates operations when the transmission frame in accordance with the ninth embodiment is used.

Accordingly, a vector-synthesized signal, which is obtained by synthesizing vectors of signals on the two polarized wave planes modulated by the PSK modulation method based on the varying base band signal, can be illustrated on FIG. 23C. Namely, the vector is positioned between the X-polarized wave plane and the Y-polarized wave plane, and varies with time on a polarized wave plane that forms 45-degree angle to the X-polarized wave plane. A state when the signal is received is shown in FIG. 23D. The amplitude of the signal on the polarized wave plane X' and the amplitude of the signal on the polarized wave plane Y' are different.

Next, in a time period (5) in FIG. 22, the X-polarized wave_I-signal and the Y-polarized wave_I-signal are logical inversion, and the X-polarized wave_Q-signal and the Y-polarized wave_Q-signal are logical inversion. Thus, the signal point on the I-Q plane of the X-polarized wave in FIG. 24A takes a position which is point-symmetry to the signal point of the I-Q plane of the Y-polarized wave in FIG. 24B with respect to the origin. The numbers indicated in the brackets "[ ]" show time order.

Figure 24A:
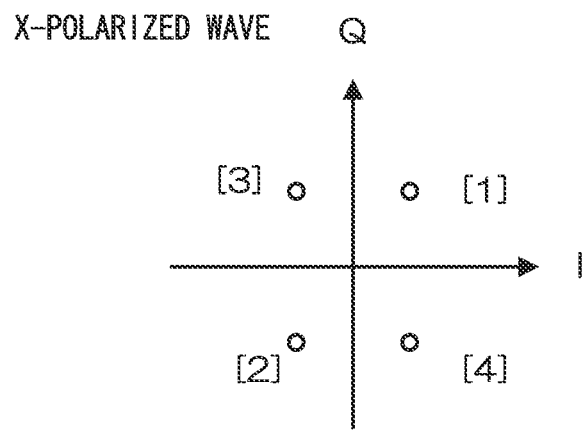
FIG. 24A is a conceptual drawing that illustrates operations when the transmission frame in accordance with the ninth embodiment is used.
Figure 24B:
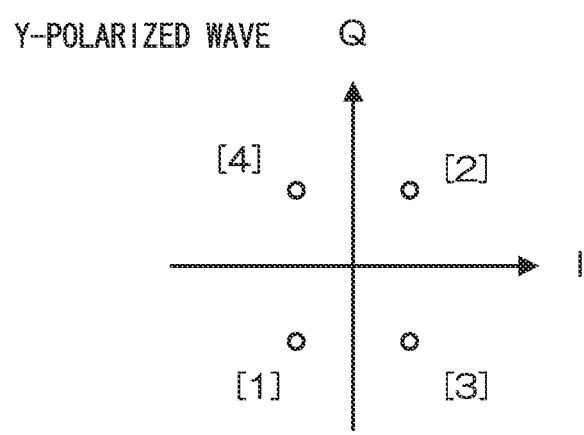
FIG. 24B is a conceptual drawing that illustrates operations when the transmission frame in accordance with the ninth embodiment is used.
Figure 24C:
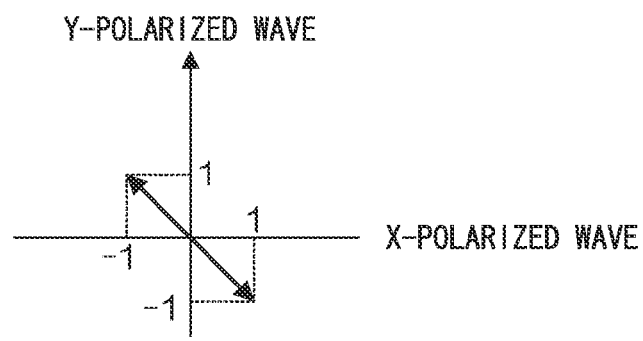
FIG. 24C is a conceptual drawing that illustrates operations when the transmission frame in accordance with the ninth embodiment is used.
Figure 24D:
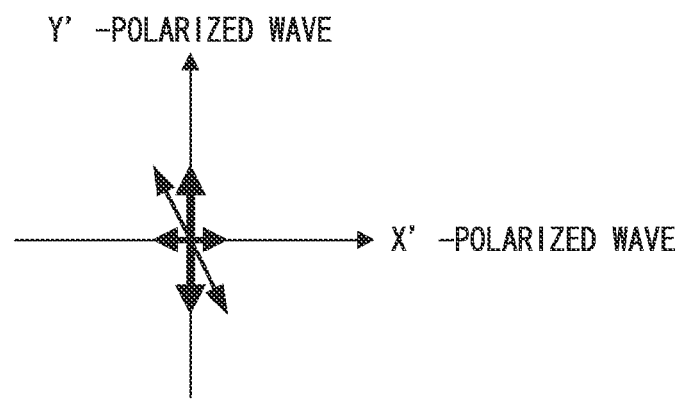
FIG. 24D is a conceptual drawing that illustrates operations when the transmission frame in accordance with the ninth embodiment is used.

Accordingly, a vector-synthesized signal, which is obtained by synthesizing vectors of signals on the two polarized wave planes modulated by the PSK modulation method based on the varying base band signal, can be illustrated on FIG. 24C. Namely, the vector is positioned to be orthogonal to the polarized wave plane shown in FIG. 23C, and varies with time on a polarized wave plane having 90-degree angle. A state when the signal is received is shown in FIG. 23D. The modification of the polarization state is performed by only digital signals without using optical parts such as a polarization controller or the like. A state when the signal is received is shown in FIG. 24D. A large and small relation of the amplitudes of signals on the polarized wave plane X' and the polarized wave plane Y' becomes opposite to that of the case in FIG. 23D.

Accordingly, the signal in FIG. 23D and the signal in FIG. 24D are received at only the polarized wave plane X' in separate time and performed by the maximal ratio combining method or the selection combining method, and thereby, it is possible to obtain a diversity effect identical to that of the case where a signal on the polarized wave plane X' and a signal on the polarized wave plane Y' are separately received in the same time. Thereby, there is no need to operate the circuit that receives Y'-polarized wave signal, and therefore power consumption of the receiver can be reduced.

In the description above, although the polarization state is turned by 90 degrees every single frame cycle, the cycle changing the polarization state may be two frames or more. Although it is assumed that the QPSK modulation is performed, the synchronization signals are signals taking two points on the I-Q plane, and the training signals are signals taking four points on the I-Q plane, the synchronization signals may be signals taking four points. The modulation method may be multiple value modulation method such as 16QAM (QAM: quadrature amplitude modulation), 64QAM or the like.

K. Tenth Embodiment

Figure 25:
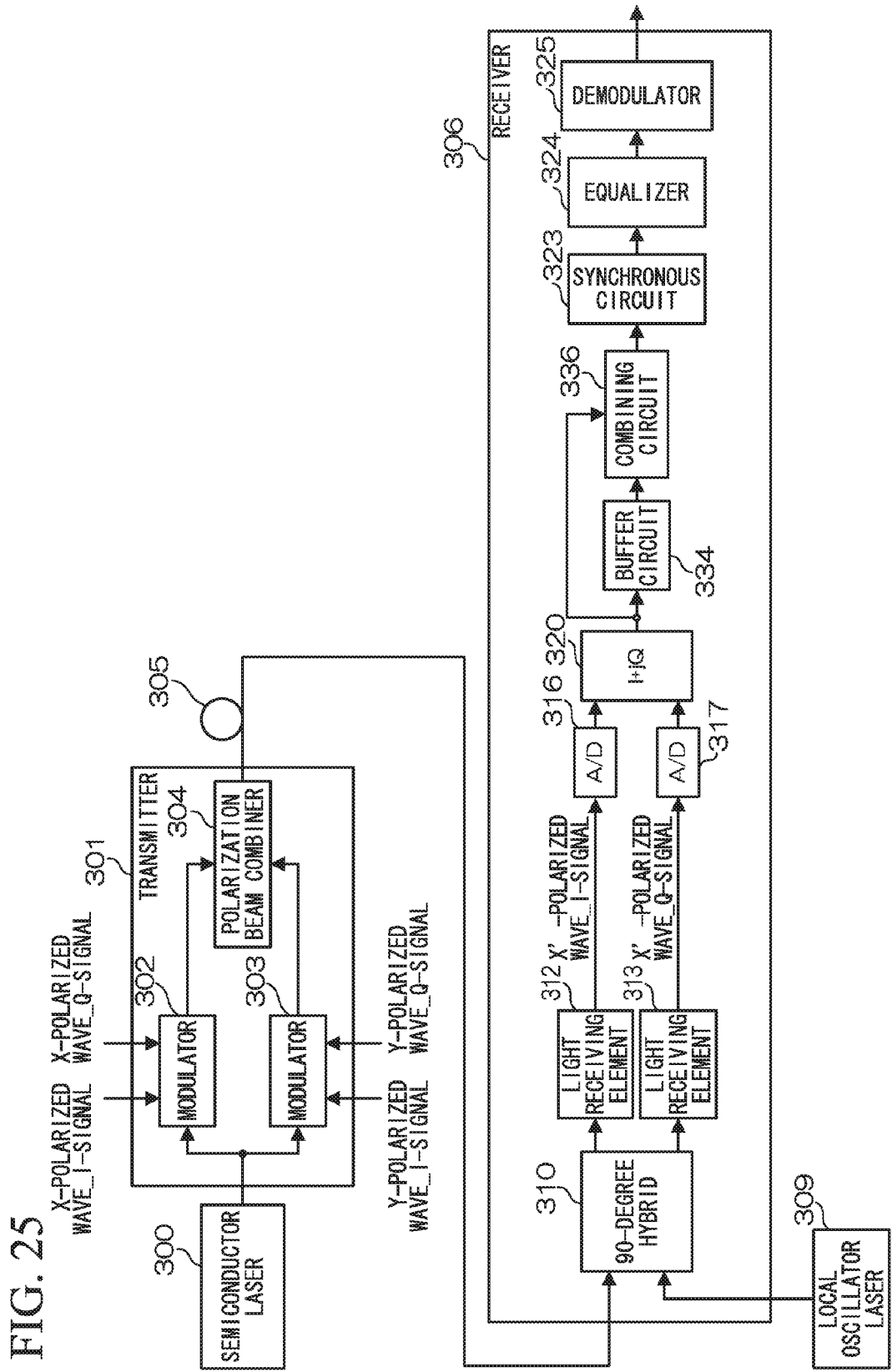
FIG. 25 is a block diagram that illustrates an example of the configuration of a transmitter/receiver apparatus in accordance with the tenth embodiment.

Next, configurations of a transmitter/receiver apparatus that can perform optical communication by use of transmission frames in accordance with the present invention will be explained. FIG. 25 is a block diagram that illustrates an example of configurations of a transmitter/receiver apparatus in accordance with a tenth embodiment. In FIG. 25, a label 300 is a semiconductor laser, a label 301 is a transmitter, a label 302 is a first modulator, a label 303 is a second modulator, a label 304 is a polarization beam combiner, a label 305 is an optical fiber, a label 306 is a receiver, a label 309 is a local oscillation laser, a label 310 is a first 90-degree hybrid, a label 312 is a first light receiving element, a label 313 is a second light receiving element, a label 316 is a first AD converter, a label 317 is a second AD converter, a label 320 is a complex addition circuit, a label 323 is a synchronous circuit, a label 324 is an equalizer, a label 325 is a demodulator, a label 334 is a buffer circuit, and a label 335 is a combining circuit.

In the transmitter 301, an X-polarized wave_I-signal is input to the first modulator 302, and a Y-polarized_I-signal is input to the second modulator 302. The X-polarized wave_I-signal and the Y-polarized wave_I-signal are identical signals or logical inversion signals, and which are alternately switched by time. The X-polarized wave_Q-signal and the Y-polarized wave_Q-signal are identical signals or logical inversion signals, and which are alternately switched by time. Polarization multiplexing is performed for the output signals from the first modulator 302 and the second modulator 303 by the use of the polarization beam combiner 304, and the signals are transmitted to the optical fiber 305.

At the receiver 306, the signal is divided into an I-signal and a Q-signal by the 90-degree hybrid 310. The signals are converted into digital signals by the AD converters 316 and 317 via the light receiving elements 312 and 313. The digital signals are converted into complex signals of I+jQ by the complex addition circuit 320. The obtained complex signals are stored into the buffer circuit 334 in predetermined time period that corresponds to the time required to switch the polarization state of the transmission signals. The signals before being stored and after being stored in the buffer circuit 334 are synthesized at the combining circuit 336. As combining methods, there are the maximal ratio combining method, the selection combining method or the like. The maximal ratio combining method adjusts the phase and amplitude of signals and then combines them. The selection combining method selects only signals that have a higher reception level.

A bit synchronization signal and a frame synchronization signal are employed at the synchronous circuit 323. A training signal is used for the equalizer 324. A demodulated signal is used for the demodulator 325.

Further, the buffer circuit 334 and the combining circuit 336 may be arranged respectively between the AD converter 316 and the complex addition circuit 320 and between the AD convertor 317 and the complex addition circuit 320. The buffer circuit 334 may be a delay circuit that transmits input signals after delaying the input signals in a predetermined time period.

Figure 29:
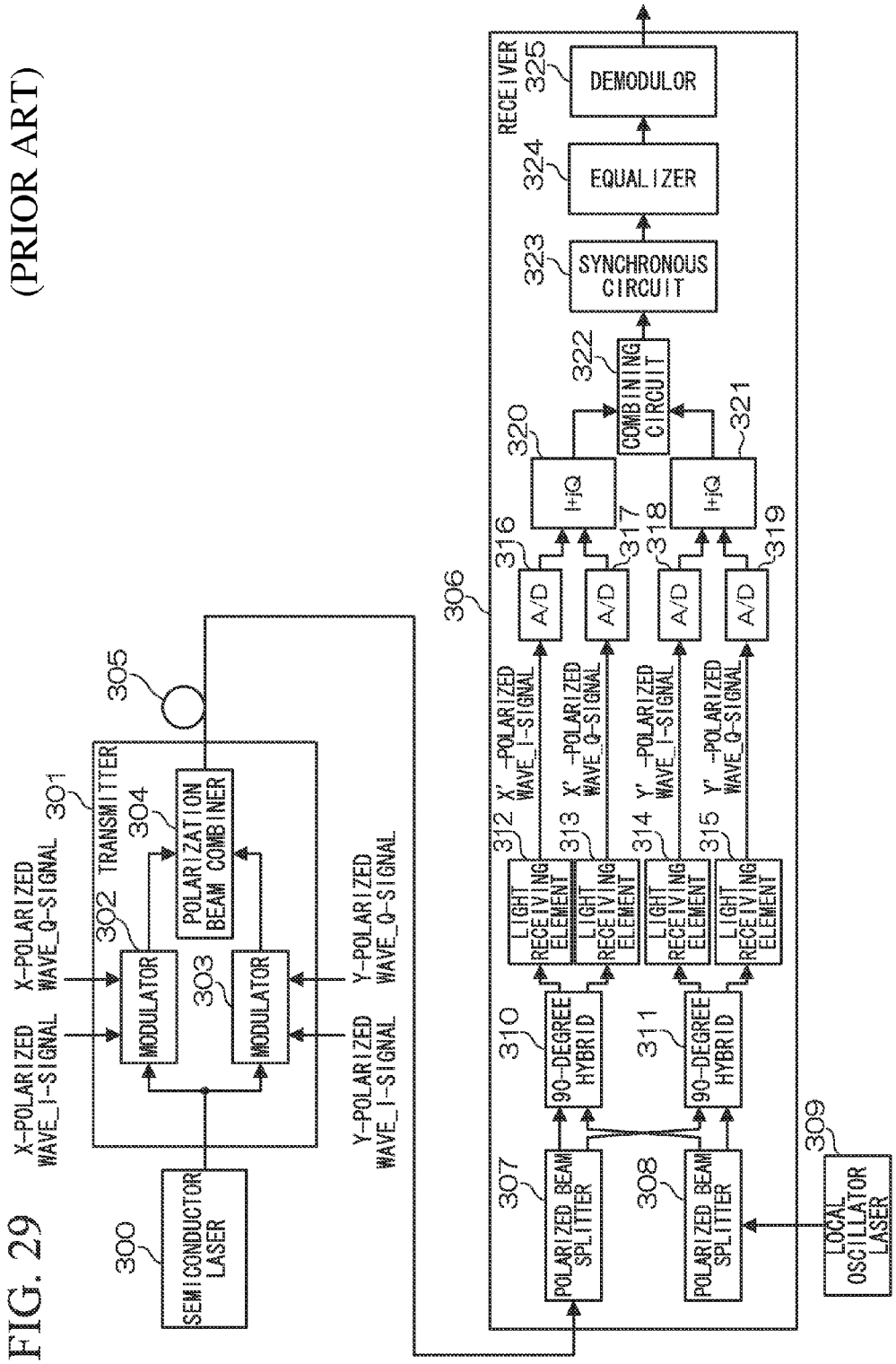
FIG. 29 is a block diagram that illustrates the configuration of a usual transmitter/receiver apparatus.

In accordance with the tenth embodiment describe above, a light receiving element that receives polarized signal Y', AD converters, and a complex addition circuit are reduced compared with a usual transmitter/receiver apparatus shown in FIG. 29, and therefore it is possible to reduce power consumption.

L. Eleventh Embodiment

Figure 26:
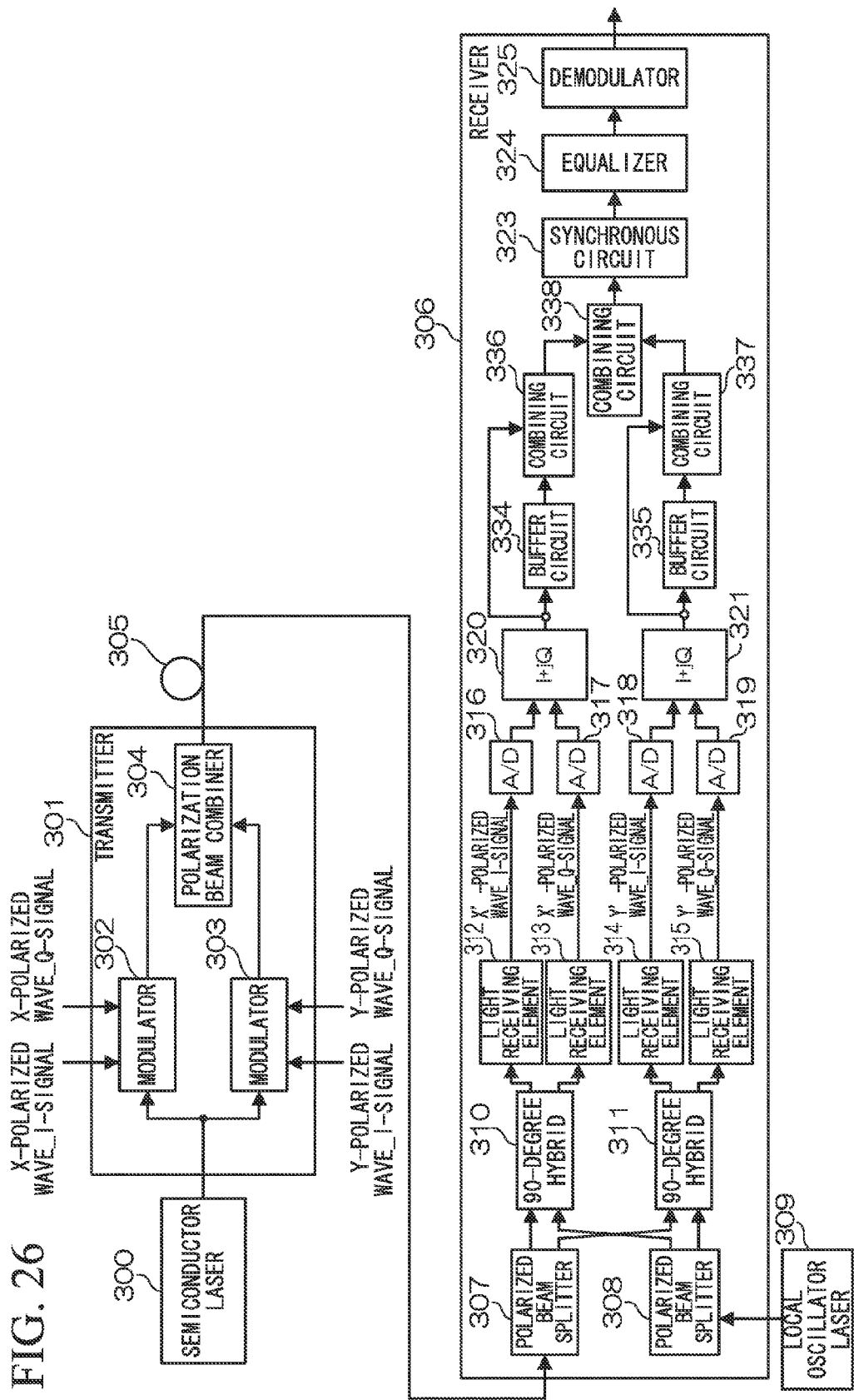
FIG. 26 is a block diagram that illustrates an example of the configuration of a transmitter/receiver apparatus in accordance with the eleventh embodiment.
Figure 27:
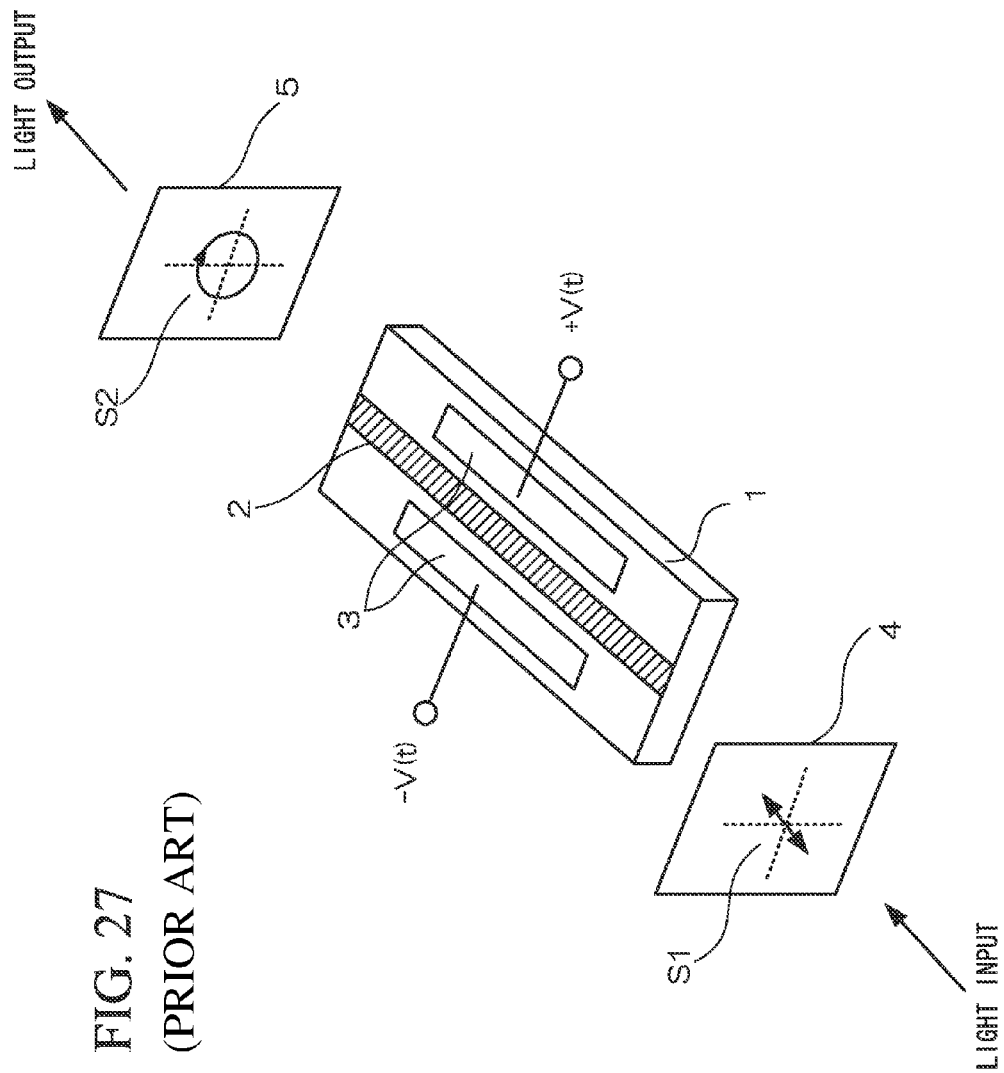
FIG. 27 is a perspective diagram that illustrates an example of the configuration of a usual polarization scrambler.

Now, descriptions will be given for another configuration of a transmitter/receiver apparatus that can perform optical communication by use of transmission frames in accordance with the present invention. FIG. 26 is a block diagram that illustrates an example of configurations of a transmitter/receiver apparatus in accordance with an eleventh embodiment of the present invention. In FIG. 26, reference symbol 300 is a semiconductor laser, reference symbol 301 is a transmitter, reference symbol 302 is a first modulator, reference symbol 303 is a second modulator, reference symbol 304 is a polarization beam combiner, reference symbol 305 is an optical fiber, reference symbol 306 is a receiver, reference symbol 307 is a first polarization beam splitter, reference symbol 308 is a second polarization beam splitter, reference symbol 309 is a local oscillation laser, reference symbol 310 is a first 90-degree hybrid, reference symbol 311 is a second 90-degree hybrid, reference symbol 312 is a first light receiving element, reference symbol 313 is a second light receiving element, reference symbol 314 is a third light receiving element, reference symbol 315 is a fourth light receiving element, reference symbol 316 is a first AD converter, reference symbol 317 is a second AD converter, reference symbol 318 is a third AD converter, reference symbol 319 is a fourth AD converter, reference symbol 320 is a first complex addition circuit, reference symbol 321 is a second complex addition circuit, reference symbol 323 is a synchronous circuit, reference symbol 324 is an equalizer, reference symbol 325 is a demodulator, reference symbol 334 is a first buffer circuit, reference symbol 335 is a second buffer circuit, reference symbol 336 is a first combining circuit, reference symbol 337 is a second combining circuit, and reference symbol 338 is a third combining circuit.

In the transmitter 301, an X-polarized wave_I-signal is input to the first modulator 302, and a Y-polarized_I-signal is input to the second modulator 302. The X-polarized wave_I-signal and the Y-polarized wave_I-signal are identical signals or logical inversion signals, and which are alternately switched according to time. The X-polarized wave_Q-signal and the Y-polarized wave_Q-signal are identical signals or logical inversion signals, and which are alternately switched as a function of time. Polarization multiplexing is performed for the output signals from the first modulator 302 and the second modulator 303 by the use of the polarization beam combiner 304, and the signals are transmitted to the optical fiber 305.

At the receiver 306, the signal is divided into two polarized waves, which are an I-signal and a Q-signal being orthogonal each other, by use of the polarized wave splitters 307 and 308 and the 90-degree hybrids 310 and 311. The signals are converted into digital signals by the AD converters 316, 317, 318 and 319 via the light receiving elements 312 through 315. The digital signals are converted into complex signals of I+jQ for each of polarized waves by use of the complex addition circuits 320 and 321. The obtained complex signals for each polarized wave are stored into the buffer circuits 334 and 335 in a predetermined time period that corresponds to the time required to switch the polarization state of the transmission signals. The signals before being stored and after being stored in the buffer circuits are synthesized at the combining circuits 336 and 337. The synthesized complex signals of each polarized wave are further synthesized by the combining circuit 338. As combining methods, there are the maximal ratio combining method, the selection combining method or the like. The maximal ratio combining method adjusts the phase and amplitude of signals, and then combines them. The selection combining method selects only signals that have a higher reception level.

The configurations of a usual transmitter/receiver apparatus shown in FIG. 29 combines the polarized wave signal X' and the polarized wave signal Y' shown in FIG. 20F. The configurations of the transmitter/receiver apparatus of FIG. 25 in accordance with the tenth embodiment combines the polarized wave signal X' shown in FIG. 20F and the polarized wave signal Y' shown in FIG. 21F. On the other hand, the configurations of the transmitter/receiver apparatus in accordance with the eleventh embodiment combines all four signals of the polarized wave signal X' and the polarized wave signal Y' shown in FIG. 20F and the polarized wave signal X' and the polarized wave signal Y' shown in FIG. 21F. Although the configurations of the transmitter/receiver apparatus in accordance with the eleventh embodiment has less effect with respect to the power consumption reduction compared to those of the transmitter/receiver apparatus in accordance with the tenth embodiment, the configurations of the transmitter/receiver apparatus of the eleventh embodiment has an advantages in which the diversity effect can be increased and high quality signals can be received compared to the configurations of the usual transmitter/receiver apparatus and the transmitter/receiver apparatus in accordance with the tenth embodiment.

INDUSTRIAL APPLICABILITY

As described above, in accordance with the present invention, the polarization state of a transmission signal can be changed at a high speed based on a symbol rate by use of digital signals without using optical parts such as polarization scrambler or the like. Thereby, it is possible to avoid taking measures for the degradation of polarization scramble characteristics due to the adjustment of incident angles at manufacturing process and aging of optical parts.

In accordance with the present invention, the digital logic inversion circuit is used at the transmission side, and the time average process circuit is used at the receiver side for estimating the transmission line, and thereby the polarization dependence on wave form distortion at the optical fiber transmission line can be averaged. For example, with respect to chromatic dispersion, the estimation accuracy of wave form distortion in the optical fiber transmission line can be improved.

In accordance with the present invention, the polarization state of a transmission signal can be changed at high speed by use of digital signals without using optical parts such as a polarization controller or the like. Thereby, there is no need to detect transmission signals separately at two polarization planes which are orthogonal each other, so that the power consumption of a receiver can be reduced.

Furthermore, when the present invention is applied to a system that receives each of two orthogonal polarization planes separately, there is an advantage in which the diversity effect can be improved.

DESCRIPTION OF REFERENCE SYMBOLS 10-1~10-4 insert circuit
11-1, 11-2 digital logic inverter circuit
12-1 XI-modulator
12-2 XQ-modulator
12-3 YI-modulator
12-4 YQ-modulator
13 polarization multiplexer
20 polarization beam splitter
21, 21-1, 21-2 90-degree hybrid
23-1~23-4 optical-to-electrical converter
24-1~24-4 ADC
25, 25-1, 25-2 channel estimation circuit
26, 26-1, 26-2 time average processing unit
27 XY averaging unit
28-1, 28-2 phase inversion detection circuit
26, 26-1, 26-2 time average processing unit
27 XY averaging unit
28-1, 28-2 phase inversion detection unit
22 local oscillator light
300 semiconductor laser
301 transmitter
302 first modulator
303 second modulator
304 polarization beam combiner
305 optical fiber
306 receiver
307 first polarization beam splitter
308 second polarization beam splitter
309 local oscillator laser
310 first 90-degree hybrid
311 second 90-degree hybrid
312 first receiving light element
313 second receiving light element
314 third receiving light element
315 fourth receiving light element
316 first AD convertor
317 second AD convertor
318 third AD convertor
319 fourth AD convertor
320 first complex addition circuit
321 second complex addition circuit
322 combining circuit
323 synchronous circuit
324 equalizer
325 demodulator
326 polarization scrambler
327 first inverter
328 second inverter
329 first switch
330 second switch
331 third switch
332 fourth switch
333 fifth switch
334, 335 buffer circuit
336, 337, 338 combining circuit

The invention claimed is:
1. A transmission method comprising:
a step of generating a first signal series and a second signal series;
a step of modulating a first polarized wave using the first signal series and a second polarized wave orthogonal to the first polarized wave using the second signal series; and
a step of performing polarization multiplexing of the modulated first polarized wave and the modulated second polarized wave,
wherein the step of generating includes a switching step that selects at least two steps from
a first step that generates the second signal series in which a signal identical to an in-phase component of the first signal series is determined as an in-phase component of the second signal series and a signal identical to a quadrature-phase component of the first signal series is determined as a quadrature-phase component of the second signal series,
a second step that generates the second signal series in which a signal identical to the quadrature-phase component of the first signal series is determined as an in-phase component of the second signal series and a signal caused by performing logical inversion of an in-phase component of the first signal series is determined as a quadrature-phase component of the second signal series,
a third step that generates the second signal series in which a signal caused by performing logical inversion of an in-phase component of the first signal series is determined as an in-phase component of the second signal series and a signal caused by performing logical inversion of a quadrature-phase component of the first signal series is determined as a quadrature-phase component of the second signal series, and
a fourth step that generates the second signal series in which a signal caused by performing logical inversion of a quadrature-phase component of the first signal series is determined as an in-phase component of the second signal series and a signal identical to an in-phase com- ponent of the first signal series is determined as a quadrature-phase component of the second signal series, and the switching step applies said at least two steps to at least part of each period being divided by a predetermined length by alternately switching every each period.

2. The transmission method as claimed in claim 1, wherein said at least two steps are applied to part of symbols of a transmission frame.

3. The transmission method as claimed in claim 1, wherein an identical step out of said at least two steps is applied within one transmission frame, and the identical step to be applied to is alternately switched in every frame.

4. The transmission method as claimed in claim 1, wherein the period includes a known signal and a transmission data series, and the known signal in the second signal series is generated by alternately switching at least two steps among the first step through the fourth step.

5. The transmission method as claimed in claim 4, wherein the known signal includes a special symbol pattern, and most parts of signal components of the special symbol pattern are in two or more predetermined frequency bands.

6. The transmission method as claimed in claim 5, wherein the special symbol pattern is an alternating signal which a phase reverses for each symbol.

7. A receiving method of a receiver apparatus that receives and demodulates modulation signals caused by performing polarization multiplexing for a first and a second polarized waves being orthogonal each other, the receiving method comprising:
a step of dividing a modulation signal into a first and a second polarized waves, each of periods of the modulation signal being divided by a predetermined length, a polarization state of at least part of said each of periods being changed by every said each of periods;
a step of mixing at least one of the first and the second polarized waves and a local oscillator light and dividing into at least one of an in-phase component and a quadrature-phase component of at least one of the first and the second polarized waves;
a step of estimating a transmission line parameter by use of at least one of the first and the second polarized waves; and
a step of performing a time-averaging process for the estimated transmission line parameter,
wherein the step of estimating comprises:
a first estimating step that estimates a first transmission line parameter by use of the divided first polarized wave; and
a second estimating step that estimates a second transmission line parameter by use of the divided second polarized wave,
wherein the step of the time-averaging process includes:
a first time-averaging step that performs the time-averaging process of the first transmission line parameter with respect to time,
a second time-averaging step that performs the time-averaging process of the second transmission line parameter with respect to time, and
an averaging-output step that averages between a value of the averaged first transmission line parameter and a value of the averaged second transmission line parameter and outputs an averaged value,
wherein the first estimating step and the second estimating step further include a reversing time detecting step that detects a reversing timing of the known signal.

8. The receiving method as claimed in claim 7, wherein the step of dividing includes
a mixing-dividing step that mixes received signal light and local oscillator light and divides into an in-phase component and a quadrature-phase component of at least one of the first and the second polarized waves, and
the step of estimating the transmission line parameter estimates a transmission line parameter by use of the in-phase component and the quadrature-phase component of at least one of the divided first and the second polarized waves.

9. The receiving method as claimed in claim 7, further comprising:
a polarized wave receiving step that receives the modulation signal as a single polarized wave;
an accumulating step that accumulates a reception signal of the single polarized wave for a predetermined accumulation time period; and
a combining step that combines the reception signal of the signal polarized wave before being accumulated in the accumulating step and the reception signal of the single polarized wave after being accumulated in the accumulating step.

10. The receiving method as claimed in claim 9, wherein
the accumulating step includes a delaying step that delays the reception signal of the single polarized wave for a predetermined delay time; and
the combining step combines the reception signal before being delayed and the reception signal after being delayed.

11. The receiving method as claimed in claim 9, wherein
the receiving step receives the modulation signal as two polarized waves being orthogonal each other,
the accumulating step includes
a first accumulation step that accumulates a reception signal of an X-polarized wave for a predetermined first accumulation time period,
a second accumulation step that accumulates a reception signal of a Y-polarized wave for a predetermined second accumulation time period, and
the combining step includes
a first combining step that combines the signal before being accumulated in the first accumulation step and the signal after being accumulated in the first accumulation step,
a second combining step that combines the signal before being accumulated in the second accumulation step and the signal after being accumulated in the second accumulation step, and
a third combining step that combines a first synthesized signal synthesized in the first combining step and a second synthesized signal synthesized in the second combining step.

12. A transmission apparatus comprising:
a signal series generation unit configured to generate a first signal series and a second signal series;
a modulation unit configured to modulate a first polarized wave based on the first signal series and modulate a second polarized wave being orthogonal to the first polarized wave based on the second signal series;
a polarization multiplexing unit configured to perform polarization multiplexing of the modulated first polarized wave and the modulated second polarized wave;
wherein the signal series generation unit includes at least two units selected from
a first unit that generates the second signal series in which a signal identical to an in-phase component of the first signal series is determined as an in-phase component of the second signal series and a signal identical to a quadrature-phase component of the first signal series is determined as a quadrature-phase component of the second signal series,
a second unit that generates the second signal series in which a signal identical to the quadrature-phase component of the first signal series is determined as an in-phase component of the second signal series and a signal caused by performing logical inversion of an in-phase component of the first signal series is determined as a quadrature-phase component of the second signal series, a third unit that generates the second signal series in which a signal caused by performing logical inversion of an in-phase component of the first signal series is determined as an in-phase component of the second signal series and a signal caused by performing logical inversion of a quadrature-phase component of the first signal series is determined as a quadrature-phase component of the second signal series, and a fourth unit that generates the second signal series in which a signal caused by performing logical inversion of a quadrature-phase component of the first signal series is determined as an in-phase component of the second signal series and a signal identical to an in-phase component of the first signal series is determined as a quadrature-phase component of the second signal series, and a switching unit that applies said at least two units to at least part of each period being divided by a predetermined length by alternately switching every period.

13. The transmission apparatus as claimed in claim 12, wherein
the switching unit applies said at least two units to part of a symbol of a transmission frame.

14. The transmission apparatus as claimed in claim 12, wherein the switching unit applies an identical unit out of said at least two units within a single frame of a transmission frame, and a unit of said at least two units to be applied is alternately switched every frame.

15. The transmission apparatus as claimed in 12, wherein said each period includes a known signal and a transmission data series, and
the known signal in the second signal series is generated by switching at least two units among the first through fourth units.

16. The transmission apparatus as claimed in 15, wherein the known signal includes a special symbol pattern having most signal components that are included in two or more than two predetermined frequency bands.

17. The transmission apparatus as claimed in claim 16, wherein the special pattern is an alternating signal that reverses a phase every symbol.

18. A receiver apparatus that receives and demodulates modulation signals caused by performing polarization multiplexing of a first polarized wave and a second polarized wave being orthogonal each other, the receiver apparatus comprising:
a polarized wave dividing unit configured to divide a modulation signal into a first and a second polarized waves, each of periods of the modulation signal being divided by a predetermined length, a polarization state of at least part of said each of periods being changed every period;
a divider circuit configured to mix at least one of the first and the second polarized waves divided by the polarized wave dividing unit and local oscillator light and to divide an in-phase component and a quadrature-phase component of at least one of the first and the second polarized waves; and
a channel estimation circuit configured to estimate a transmission line parameter by use of at least one of the first and the second polarized waves divided by the divider circuit; and
a time-averaging unit configured to perform a time-averaging process for an output value from the transmission line, wherein the channel estimation unit comprises:
a first channel estimation unit configured to estimate a first transmission line parameter by use of the first polarized wave divided by the divider circuit; and
a second channel estimation unit configured to estimate a second transmission line parameter by use of the second polarized wave divided by the divider circuit,
wherein the time-averaging unit comprises:
a first time-averaging unit that performs a time-averaging process for a first output value from the first channel estimation circuit,
a second time-averaging unit that performs a time-averaging process for a second output value from the second channel estimation circuit,
an output averaging unit that averages a first averaged output value from the first time-averaging unit and a second averaged output value from the second time-averaging unit, and
a phase inversion detection circuit configured to detect a reverse timing of a known signal and provide information of the reverse timing to the channel estimation circuit.

19. The receiver apparatus as claimed in claim 18, wherein the divider circuit mixes received signal light and local oscillator light and divides into an in-phase component and a quadrature-phase component of at least one of the first polarized wave and the second polarized wave, and
the channel estimation circuit estimates a transmission line parameter by use of the in-phase component and the quadrature-phase component of at least one of the first polarized wave and the second polarized wave.

20. The receiver apparatus as claimed in claim 18, further comprising:
a receiving unit that receives the modulation signal as a single polarized wave;
a buffer unit that accumulates a reception signal of the single polarized wave received by the receiving unit for a predetermined time period; and
a combining unit that combines the reception signal before being accumulated in the buffer unit and the reception signal after being accumulated in the buffer unit.

21. The receiver apparatus as claimed in claim 20, wherein the buffer unit is a delay circuit that delays the reception signal of the single polarized signal received by the receiving unit for a predetermined time period, and
the combining unit combines the reception signal before being delayed by the delay circuit and the reception signal after being delayed by the delay circuit.

22. The receiver apparatus as claimed in claim 20, wherein the receiving unit receives the modulation signal as two polarized waves being orthogonal each other,
the buffer unit comprises:
a first buffer unit that accumulates a reception signal of an X-polarized wave received by the receiving unit for a first predetermined time; and
a second buffer unit that accumulates a reception signal of an Y-polarized wave received by the receiving unit for a second predetermined time;
the synthesizer unit comprises:
a first combining unit that combines a signal before being accumulated in the first accumulation unit and a signal after being accumulated in the first accumulation unit;
a second combining unit that combines a signal before being accumulated in the second accumulation unit and a signal before being accumulated in the second accumulation unit; and
a third combining unit that combines a first synthesized signal synthesized by the first combining unit and a second synthesized signal synthesized by the second combining unit.

* * * * *